US011283279B2

(12) United States Patent
Katase et al.

(10) Patent No.: US 11,283,279 B2
(45) Date of Patent: Mar. 22, 2022

(54) CHARGING CONTROL DEVICE AND CHARGING UNIT

(71) Applicant: MURATA MANUFACTURING CO., LTD., Kyoto (JP)

(72) Inventors: Natsuko Katase, Kyoto (JP); Jusuke Shimura, Kyoto (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 234 days.

(21) Appl. No.: 16/600,750

(22) Filed: Oct. 14, 2019

(65) Prior Publication Data

US 2020/0044473 A1 Feb. 6, 2020

Related U.S. Application Data

(63) Continuation of application No. PCT/JP2018/015317, filed on Apr. 12, 2018.

(30) Foreign Application Priority Data

Apr. 14, 2017 (JP) .............................. JP2017-080638

(51) Int. Cl.
*H02J 7/00* (2006.01)
*H02J 7/14* (2006.01)

(52) U.S. Cl.
CPC ........ *H02J 7/00718* (2020.01); *H02J 7/0091* (2013.01); *H02J 7/1407* (2013.01); *H02J 7/00304* (2020.01)

(58) Field of Classification Search
USPC ......................................... 320/159, 134–136
See application file for complete search history.

(56) References Cited

U.S. PATENT DOCUMENTS

| 5,869,949 A * | 2/1999 | Nishikawa .......... H02J 7/00047 320/101 |
| 2008/0191666 A1 | 8/2008 | Kernahan et al. |
| 2009/0027005 A1* | 1/2009 | Osswald ............... H02J 7/0042 320/112 |

(Continued)

FOREIGN PATENT DOCUMENTS

| JP | 11273749 | * 10/1999 |
| JP | H11273749 A | 10/1999 |
| JP | 2008021417 A | 1/2008 |

(Continued)

OTHER PUBLICATIONS

International Search Report for Application No. PCT/JP2018/015317, dated May 15, 2018.

*Primary Examiner* — Samuel Berhanu
(74) *Attorney, Agent, or Firm* — K&L Gates LLP

(57) ABSTRACT

Provided is a charging control device including a current detector, an abnormal current determination circuit, and a charging stop circuit. The current detector is configured to detect a charging current, the abnormal current determination circuit is configured to determine whether the charging current is attenuated and/or increased in a constant voltage charging region, and to determine whether a value of the charging current per unit time is increased, and the charging stop circuit is configured to stop a constant voltage charging when the value of the charging current per unit time is increased.

19 Claims, 27 Drawing Sheets

(56) References Cited

U.S. PATENT DOCUMENTS

2009/0220825 A1* 9/2009 Nakashima ......... H01M 10/482
  429/7
2015/0375621 A1* 12/2015 Ono ................... B60L 50/16
  307/10.1

FOREIGN PATENT DOCUMENTS

| JP | 2010518805 A | 5/2010 |
| JP | 2010259240 A | 11/2010 |
| JP | 2012105433 A | 5/2012 |

* cited by examiner

※ DEFINITION OF DIFFERENCE IS $\Delta I_n = I_n - I_{(n-1)}$.

※ $ma(d\log(I_n)/dt)$ AND $ma(d\log(I_{(n-1)})/dt)$ OBTAINED BY APPLYING MOVING AVERAGE MAY BE USED AS $d\log(I_n)/dt$ AND $d\log(I_{(n-1)})/dt$.

※1 $Ima_n$ AND $Ima_{(n-1)}$ OBTAINED BY APPLYING MOVING AVERAGE MAY BE USED AS $I_n$ AND $I_{(n-1)}$.
※2 $v_{max}$ IS MAXIMUM VALUE OF RATE OF TEMPERATURE INCREASE DURING CONSTANT CURRENT
(CC) CHARGING MEASURED AT ROOM TEMPERATURE UNDER ADIABATIC CONDITIONS.

※1 DEFINITION OF DIFFERENCE IS $\Delta I_n = I_n - I_{(n-1)}$.
※2 $v_{max}$ IS MAXIMUM VALUE OF RATE OF TEMPERATURE INCREASE DURING CONSTANT CURRENT (CC) CHARGING MEASURED AT ROOM TEMPERATURE UNDER ADIABATIC CONDITIONS.

※1 DEFINITION OF RATIO IS $r = I_n/I_{(n-1)}$.
※2 $v_{max}$ IS MAXIMUM VALUE OF RATE OF TEMPERATURE INCREASE DURING CONSTANT CURRENT (CC) CHARGING MEASURED AT ROOM TEMPERATURE UNDER ADIABATIC CONDITIONS.

※1 DEFINITION OF DIFFERENCE IS $\Delta(d\log(I_n)/dt) = d\log(I_n)/dt - d\log(I_{(n-1)})/dt$.
※2 $v_{max}$ IS MAXIMUM VALUE OF RATE OF TEMPERATURE INCREASE DURING CONSTANT CURRENT (CC) CHARGING MEASURED AT ROOM TEMPERATURE UNDER ADIABATIC CONDITIONS.

※1 DEFINITION OF RATIO IS $r(d\log(I_n)/dt) = d\log(I_n)/dt/d\log(I_{(n-1)})/dt$.
※2 $v_{max}$ IS MAXIMUM VALUE OF RATE OF TEMPERATURE INCREASE DURING CONSTANT CURRENT (CC) CHARGING MEASURED AT ROOM TEMPERATURE UNDER ADIABATIC CONDITIONS.

CHARGING CONTROL DEVICE AND CHARGING UNIT

CROSS REFERENCE TO RELATED APPLICATIONS

The present application is a continuation of PCT patent application no. PCT/JP2018/015317, filed on Apr. 12, 2018, which claims priority to Japanese patent application no. JP2017-080638 filed on Apr. 14, 2017, the entire contents of which are being incorporated herein by reference.

BACKGROUND

The present technology generally relates to a charging control device and a charging unit, and more particularly to a charging control device, a charging unit, a vehicle, a power storage system, an electric power tool, and an electronic device.

In recent years, in the technical fields of electronic devices such as a personal computer (PC), and a portable communication terminal, automobiles such as an electric car, and new energy systems such as a wind power generation, demand for batteries, particularly secondary batteries that can be repeatedly charged and discharged is expanding rapidly.

For example, a protection circuit connected between a secondary battery and a load and protecting the secondary battery is offered in which the protection circuit includes a temperature detection element for detecting the temperature of the secondary battery, a switch unit provided in wiring connecting the negative electrode of the secondary battery and the negative electrode of the load, a first protection circuit that controls on/off of the switch unit based on the temperature of the secondary battery detected by the temperature detection element and the battery voltage of the secondary battery, a fuse provided in wiring connecting the positive electrode of the secondary battery and the positive electrode of the load, and a second protection circuit that detects overcharge of the secondary battery based on the temperature of the secondary battery detected by the temperature detection element and the battery voltage of the secondary battery and controls the blow of the fuse.

Also, for example, offered is a battery pack including one or more secondary batteries, a measurement unit for measuring the voltage of the secondary battery every specified time; a control unit that calculates the amount of voltage fluctuation within a specified time based on the above voltage and controls charging and discharging of the secondary battery based on the amount of voltage fluctuation, and a storage unit for storing a specified amount of voltage fluctuation with respect to the amount of voltage fluctuation and an upper limit number indicating an upper limit of the number of times the amount of voltage fluctuation exceeds the specified amount of voltage fluctuation, wherein the control unit compares the amount of voltage fluctuation with the specified amount of voltage fluctuation every specified time, and when the amount of voltage fluctuation exceeds the specified amount of voltage fluctuation, increments the value of the counter provided in advance in the storage unit, and when the counter value is equal to or greater than the upper limit number, determines that the battery pack is abnormal.

SUMMARY

The present technology generally relates to a charging control device and a charging unit, and more particularly to a charging control device, a charging unit, a vehicle, a power storage system, an electric power tool, and an electronic device.

However, the conventional technology may not be able to further improve the reliability. Therefore, the charging control device and the charging unit which improve the reliability further are desired.

Therefore, the present technology has been made in view of such a situation, and an object of the present invention is to provide a charging control device and a charging unit having excellent reliability, a vehicle, a power storage system, an electric power tool, and an electronic device which include the charging unit.

As a result of intensive studies in order to solve the above-mentioned object, the present technology discloses a charging control device and a charging unit having excellent reliability.

According to an embodiment of the present disclosure, a charging control device is provided. The charging control device includes a current detector, an abnormal current determination circuit, and a charging stop circuit, wherein the current detector is configured to detect a charging current, wherein the abnormal current determination circuit is configured to determine whether the charging current is attenuated and/or increased in a constant voltage charging region, and to determine whether a value of the charging current per unit time is increased, and wherein the charging stop circuit is configured to stop a constant voltage charging when the value of the charging current per unit time is increased.

According to an embodiment of the present disclosure, a charging control device may further include a battery temperature detector and an abnormal temperature determination circuit, wherein the battery temperature detector may detect a battery temperature, wherein the abnormal temperature determination circuit may determine whether the battery temperature in a constant voltage region is 45° C. or higher, and wherein the charging stop circuit may stop constant voltage charging when the battery temperature is 45° C. or higher.

According to an embodiment of the present disclosure, a charging control device may further include a battery temperature detector and an abnormal temperature determination circuit, wherein the battery temperature detector may detect a battery temperature, wherein the abnormal temperature determination circuit may determine whether the battery temperature in a constant voltage region is higher than the battery temperature at a start of constant voltage charging and may determine whether a rate of increase in the battery temperature in the constant voltage region is greater than a maximum value of a rate of increase in the battery temperature in a constant current charging region, and wherein the charging stop circuit may stop constant voltage charging when the battery temperature in a constant voltage region is higher than the battery temperature at a start of constant voltage charging, and the rate of increase in the battery temperature in the constant voltage region is greater than the maximum value of the rate of increase in the battery temperature in the constant current charging region.

According to an embodiment of the present disclosure, a charging control device may further include a battery temperature detector, an outside air temperature detector, and an abnormal temperature determination circuit, wherein the battery temperature detector may detect a battery temperature, wherein the outside air temperature detector may detect an outside air temperature, wherein the abnormal temperature determination circuit may determine whether a rate of increase in the battery temperature in a constant voltage region is greater than a rate of increase in an outside air temperature, and wherein the charging stop circuit may stop constant voltage charging when the rate of increase in the battery temperature in the constant voltage region is greater than the rate of increase in the outside air temperature.

In the charging control device according to an embodiment of the present technology, the current detector may detect a charging current value smoothed by a moving average method.

The moving average method may be an exponential moving average method according to an embodiment of the present disclosure.

In the charging control device according to an embodiment of the present technology, the current detector may detect a difference $(I_n-I_{(n-1)})$ between $I_n$ and $I_{(n-1)}$, which are at least two consecutive charging current values at a specified time interval, and wherein the abnormal current determination circuit may determine that the difference $(I_n-I_{(n-1)})$ changes from a negative value to a positive value.

In the charging control device according to an embodiment of the present technology, the current detector may detect a difference $(Ima_n-Ima_{(n-1)})$ between $Ima_n$ obtained by applying a moving average to at least two consecutive charging current values at a specified time interval, and $Ima_{(n-1)}$ obtained by applying a moving average to at least two further consecutive charging current values at a specified time interval, and wherein the abnormal current determination circuit may determine that the difference $(Ima_n-Ima_{(n-1)})$ changes from a negative value to a positive value.

In the charging control device according to an embodiment of the present technology, the current detector may detect a first difference $(Ia_n-Ia_{(n-1)})$ between $Ia_n$ and $Ia_{(n-1)}$, which are at least two consecutive charging current values at a specified time interval, may further detect a second difference $(Ib_n-Ib_{(n-1)})$ between $Ib_n$ and $Ib_{(n-1)}$, which are at least two consecutive charging current values at a specified time interval, and may detect a third difference $(ma(\Delta I_n))$ obtained by applying a moving average to at least the first difference $(Ia_n-Ia_{(n-1)})$ and the second difference $(Ib_n-Ib_{(n-1)})$, and wherein the abnormal current determination circuit may determine that the third difference $(ma(\Delta I_n))$ obtained by applying the moving average changes from a negative value to a positive value.

In the charging control device according to an embodiment of the present technology, the current detector may detect a ratio $(I_n/I_{(n-1)})$ between $I_n$ and $I_{(n-1)}$, which are at least two consecutive charging current values at a specified time interval, and wherein the abnormal current determination circuit may determine that the ratio $(I_n/I_{(n-1)})$ changes from a value of 1 or less to a value of more than 1.

In the charging control device according to an embodiment of the present technology, the current detector may detect a ratio $(Ima_n/Ima_{(n-1)})$ between $Ima_n$ obtained by applying a moving average to at least two consecutive charging current values at a specified time interval, and $Ima_{(n-1)}$ obtained by applying a moving average to at least two further consecutive charging current values at a specified time interval, and wherein the abnormal current determination circuit may determine that the ratio $(Ima_n/Ima_{(n-1)})$ changes from a value of 1 or less to a value of more than 1.

In the charging control device according to an embodiment of the present technology, the current detector may detect a first ratio $(Ia_n/Ia_{(n-1)})$ between $Ia_n$ and $Ia_{(n-1)}$, which are at least two consecutive charging current values at a specified time interval, may further detect a second ratio $(Ib_n/Ib_{(n-1)})$ between $Ib_n$ and $Ib_{(n-1)}$, which are at least two consecutive charging current values at a specified time interval, and may detect a third ratio $(ma(r))$ obtained by applying a moving average to at least the first ratio $(Ia_n/Ia_{(n-1)})$ and the second ratio $(Ib_n/Ib_{(n-1)})$, and wherein the abnormal current determination circuit may determine that the third ratio $(ma(r))$ obtained by applying the moving average changes from a value of 1 or less to a value of more than 1.

In the charging control device according to an embodiment of the present technology, the current detector may detect a difference $(d\ \log(I_n)/dt - d\ \log(I_{(n-1)})/dt)$ between $d\ \log(I_n)/dt$ and $d\ \log(I_{(n-1)})/dt$, which are log values per unit time of at least two consecutive charging currents at a specified time interval, and wherein the abnormal current determination circuit may determine that the difference $(d\ \log(I_n)/dt - d\ \log(I_{(n-1)})/dt)$ changes from a negative value to a positive value.

In the charging control device according to an embodiment of the present technology, the current detector may detect a difference $(ma(d\ \log(I_n)/dt))-ma(d\ \log(I_{(n-1)})/dt))$ between $ma(d\ \log(I_n)/dt)$ obtained by applying a moving average to log values per unit time of at least two consecutive charging currents at a specified time interval, and $ma(d\ \log(I_{(n-1)})/dt)$ obtained by applying a moving average to values of at least two further consecutive charging currents at a specified time interval, and wherein the abnormal current determination circuit may determine that the difference $(ma(d\ \log(I_n)/dt))-ma(d\ \log(I_{(n-1)})/dt))$ changes from a negative value to a positive value.

In the charging control device according to an embodiment of the present technology, the current detector may detect a first difference $(d\ \log(Ia_n)/dt - d\ \log(Ia_{(n-1)})/dt)$ between $d\ \log(Ia_n)/dt$ and $d\ \log(Ia_{(n-1)})/dt$, which are log values per unit time of at least two consecutive charging currents at a specified time interval, may further detect a second difference $(d\ \log(Ib_n)/dt - d\ \log(Ib_{(n-1)})/dt)$ between $d\ \log(Ib_n)/dt$ and $d\ \log(Ib_{(n-1)})/dt$, which are log values per unit time of at least two consecutive charging currents at a specified time interval, and may detect a third difference $(ma(\Delta)(d\ \log(I_n)/dt))$ obtained by applying a moving average to at least the first difference $(d\ \log(Ia_n)/dt - d\ \log(Ia_{(n-1)})/dt)$ and the second difference $(d\ \log(Ib_n)/dt - d\ \log(Ib_{(n-1)})/dt)$, and wherein the abnormal current determination circuit may determine that the third difference $(ma(\Delta)(d\ \log(I_n)/dt))$ obtained by applying the moving average changes from a negative value to a positive value.

In the charging control device according to an embodiment of the present technology, the current detector may detect a ratio $(d\ \log(I_n)/dt/d\ \log(I_{(n-1)})/dt)$ between $d\ \log(I_n)/dt$ and $d\ \log(I_{(n-1)})/dt$, which are log values per unit time of at least two consecutive charging currents at a specified time interval, and wherein the abnormal current determination circuit may determine that the ratio $(d\ \log(I_n)/dt/d\ \log(I_{(n-1)})/dt)$ changes from a value of 1 or more to a value of less than 1.

In the charging control device according to an embodiment of the present technology, the current detector may detect a ratio $(ma(d\ \log(I_n)/dt))/(ma(d\ \log(I_{(n-1)})/dt))$ between $ma(d\ \log(I_n)/dt)$ obtained by applying a moving average to log values per unit time of at least two consecutive charging currents at a specified time interval, and $ma(d\ \log(I_{(n-1)})/dt)$ obtained by applying a moving average to values of at least two further consecutive charging currents at a specified time interval, and wherein the abnormal current determination circuit may determine that the ratio $(ma(d\ \log(I_n)/dt))/(ma(d\ \log(I_{(n-1)})/dt))$ changes from a value of 1 or more to a value of less than 1.

In the charging control device according to an embodiment of the present technology, the current detector may detect a first ratio (d log($Ia_n$)/dt/d log($Ia_{(n-1)}$)/dt) between d log($Ia_n$)/dt and d log($Ia_{(n-1)}$)/dt, which are log values per unit time of at least two consecutive charging currents at a specified time interval, may further detect a second ratio (d log($Ib_n$)/dt/d log($Ib_{(n-1)}$)/dt) between d log($Ib_n$)/dt and d log($Ib_{(n-1)}$)/dt, which are log values per unit time of at least two consecutive charging currents at a specified time interval, and may detect a third difference (ma(r)(d log($I_n$)/dt)) obtained by applying a moving average to at least the first ratio (d log($Ia_n$)/dt/d log($Ia_{(n-1)}$)/dt) and the second ratio (d log($Ib_n$)/dt/d log($Ib_{(n-1)}$)/dt), and wherein the abnormal current determination circuit may determine that the third difference (ma(r)(d log($I_n$)/dt)) obtained by applying the moving average changes from a value of 1 or more to a value of less than 1.

Further, in the present technology, a charging unit including the charging control device according to an embodiment of the present technology as described herein and a battery is provided.

Furthermore, in present technology, provided is a vehicle including the charging unit according to an embodiment of the present technology as described herein, a driving force converter configured to receive supply of electric power from the charging unit and convert the received electric power into a driving force of the vehicle, a driver configured to be driven according to the drive force, and a vehicle control device. Provided is a power storage system including a power storage device having the charging unit according to an embodiment of the present technology as described herein, a power consuming device to which electric power is supplied from the charging unit, a controller configured to control supply of electric power from the charging unit to the power consuming device, and a power generation device configured to charge the charging unit. Provided is an electric power tool including the charging unit according to an embodiment of the present technology as described herein, and a movable unit to which electric power is configured to be supplied from the charging unit. Provided is an electronic device including the charging unit according to an embodiment of the present technology as described herein, wherein the electronic device is configured to receive supply of power from the charging unit.

According to the present technology, reliability can be improved. It should be understood that the effects described herein are not necessarily limited, and other suitable properties relating to the present technology may be realized and as further described.

DETAILED DESCRIPTION

Figure 1:
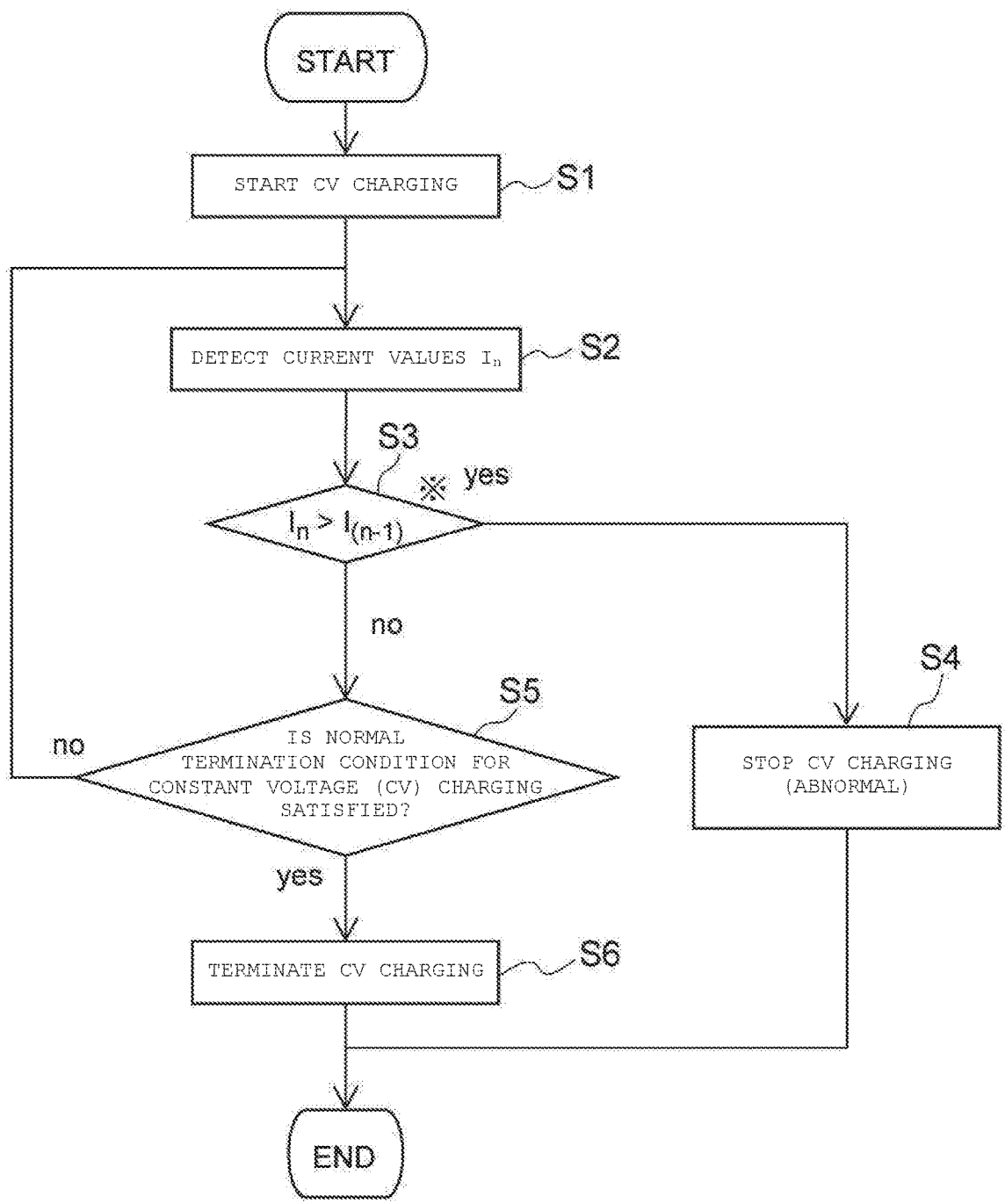
FIG. 1 is a flowchart showing an example of constant voltage (CV) charging according to an embodiment of the present disclosure.

The present technology generally relates to a charging control device and a charging unit, and more particularly to a charging control device, a charging unit, a vehicle, a power storage system, an electric power tool, and an electronic device.

As described herein, the present disclosure will be described based on examples with reference to the drawings, but the present disclosure is not to be considered limited to the examples, and various numerical values and materials in the examples are considered by way of example.

First, an overview of the present technology will be described.

There are various techniques for detecting abnormalities such as overcharge, overcurrent, and temperature abnormality of a battery, for example, a lithium ion battery that is a secondary battery. For example, provided is a protection circuit technique in which the double protection IC includes a terminal for detecting the temperature of the secondary battery an overcharge detection circuit, and a voltage adjustment circuit, and even the double protection IC can execute the temperature protection of the secondary battery by adjusting the overcharge detection voltage in the overcharge detection circuit with the voltage adjustment circuit when the temperature of the secondary battery is out of the specified range. In this technique, an overcharge voltage is set and protection is performed by comparison with a threshold value. However, when local overcharge occurs, voltage abnormality may not be detected.

Moreover, provided is a battery pack technique in which the voltage of the secondary battery is measured every specified time, the amount of voltage fluctuation within a specified time is calculated, the amount of voltage fluctuation is compared with the upper limit value for the amount of voltage fluctuation stored in the storage unit in advance every specified time, and when the amount of voltage fluctuation is consecutively larger than the upper limit value a specified number of times, the voltage is determined to be abnormal, or the amount of voltage fluctuation is compared with the lower limit value for the amount of voltage fluctuation stored in advance in the storage unit every specified time, and when the amount of voltage fluctuation is consecutively smaller than the lower limit value a specified number of times, the voltage is determined to be abnormal. This technique is designed to detect an abnormality with the amount of voltage fluctuation. However, when local overcharge occurs, voltage abnormality may not be detected.

The present technology is based on the above situation. In a battery, for example, in a lithium ion battery that is a secondary battery, reliability can be improved and maintained by stopping constant voltage charging at least when the value of the charging current per unit time is increased, when a predetermined temperature has been reached, or when a predetermined temperature change has occurred in the constant voltage charging region during the charging step. That is, according to the present technology, it is possible to suppress the occurrence of abnormality due to an internal short circuit when an overcharge locally occurs during constant voltage charging. Compared with the prior art, in the present technology, the temperature change and current change are detected even when an overcharge occurs locally during constant voltage charging to generate an internal short circuit, so that an abnormality due to the overcharge occurring locally can be detected, and charging of a battery (for example, a secondary battery) can be safely stopped.

The charging control device of the first embodiment (example 1 of the charging control device) according to the present technology includes a current detector, an abnormal current determination unit, and a charging stop unit. The current detector detects the charging current. The abnormal current determination unit determines whether the charging current is attenuated and/or increased in the constant voltage charging region, and further determines whether the value of the charging current per unit time is increasing. The charging stop unit stops the constant voltage charging when the value of the charging current per unit time is increased.

According to the charging control device of the first embodiment according to the present technology, it is possible to improve reliability. More specifically, according to the charging control device of the first embodiment according to the present technology, it is possible to suppress the occurrence of abnormality due to an internal short circuit when an overcharge locally occurs during constant voltage charging.

The current detector may detect the smoothed charging current value using a moving average method. Data used in the moving average method may be the raw value of the charging current, may be the difference between the raw values of the charging current, or may be the ratio of the raw values of the charging current. The moving average method is preferably an exponential moving average method.

Hereinafter, the charging control device of the first embodiment according to the present technology will be described in more detail with reference to FIGS. 1 to 6.

FIGS. 1 to 6 are flowcharts showing an example of constant voltage (CV) charging.

First, the charging control device of the first embodiment according to the present technology will be described with reference to the flowchart shown in FIG. 1.

In step S1, constant voltage (CV) charging is started, and in step S2, current values $I_n$ (n=1, 2, . . . ) are detected.

In step S3, if $I_n > I_{(n-1)}$ is satisfied, the value is abnormal and the process proceeds to step S4 to stop the constant voltage (CV) charging. If $I_n > I_{(n-1)}$ is not satisfied, the process proceeds to step S5. In step S5, it is determined whether a normal termination condition for constant voltage (CV) charging is satisfied. When the normal termination condition for constant voltage (CV) charging is satisfied, the process proceeds to step S6 and the constant voltage (CV) charging is terminated. When the normal termination condition of constant voltage (CV) charging is not satisfied, the process returns to step S2 again, and the processes after step S2 are repeated.

In step S3, as the current values $I_n$ and $I_{(n-1)}$, $Ima_n$ and $Ima_{(n-1)}$ obtained by applying a moving average, preferably an exponential moving average may be used.

Figure 2:
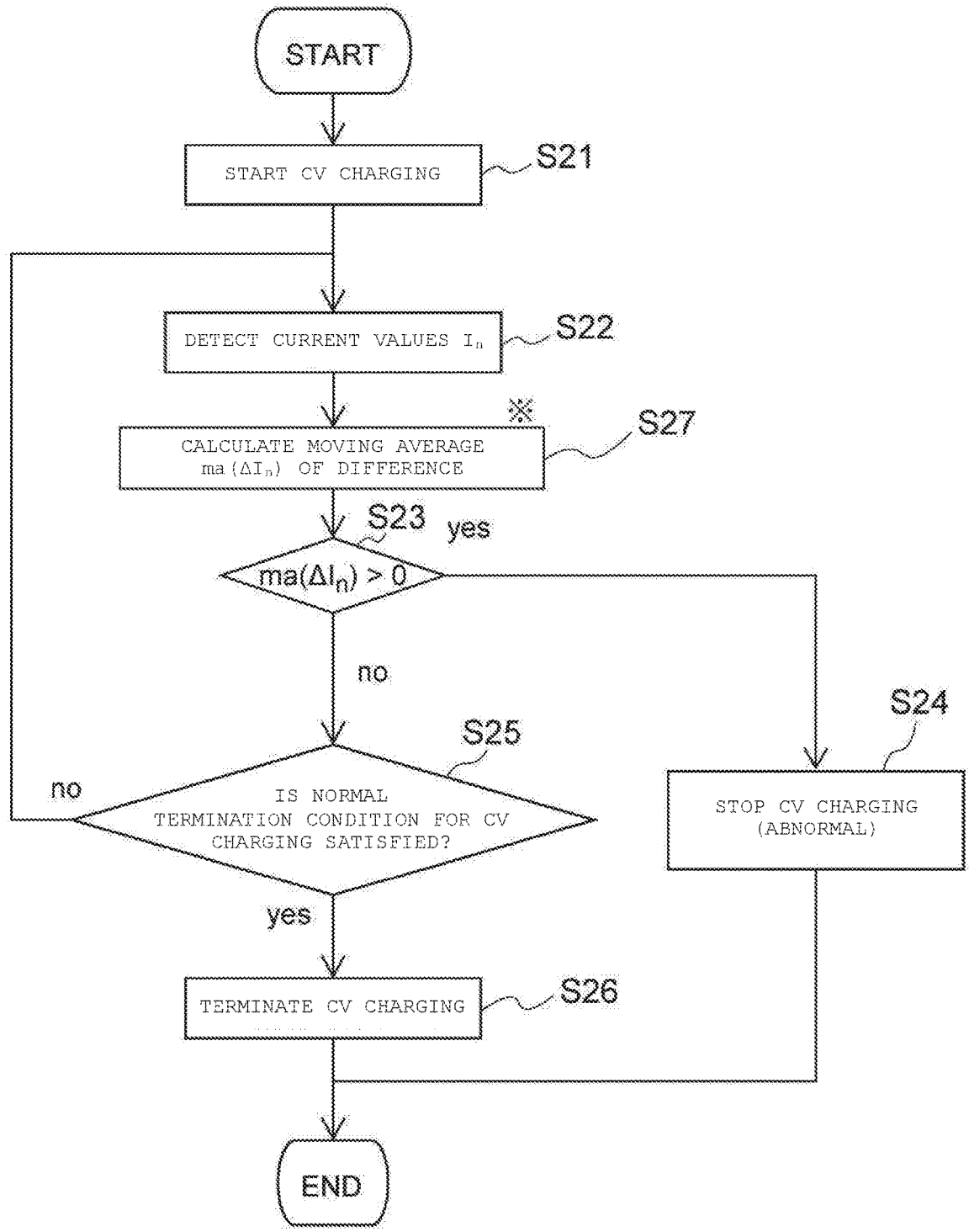
FIG. 2 is a flowchart showing an example of constant voltage (CV) charging according to an embodiment of the present disclosure.

The charging control device of the first embodiment according to the present technology will be described with reference to the flowchart shown in FIG. 2.

In step S21, constant voltage (CV) charging is started, and in step S22, current values $I_n$ (n=1, 2, . . . ) are detected. Subsequently, in step S27, the moving average $ma(\Delta I_n)$ of the difference is calculated.

In step S23, if $ma(\Delta I_n) > 0$ is satisfied, the value is abnormal and the process proceeds to step S24 to stop constant voltage (CV) charging. If $ma(\Delta I_n) > 0$ is not satisfied, the process proceeds to step S25. In step S25, it is determined whether a normal termination condition for constant voltage (CV) charging is satisfied. When the normal termination condition for constant voltage (CV) charging is satisfied, the process proceeds to step S26, and constant voltage (CV) charging is terminated. When the normal termination condition of constant voltage (CV) charging is not satisfied, the process returns to step S22 again, and the processes after step S22 are repeated.

In step S27, the difference is defined as $\Delta I_n = I_n - I_{(n-1)}$.

Figure 3:
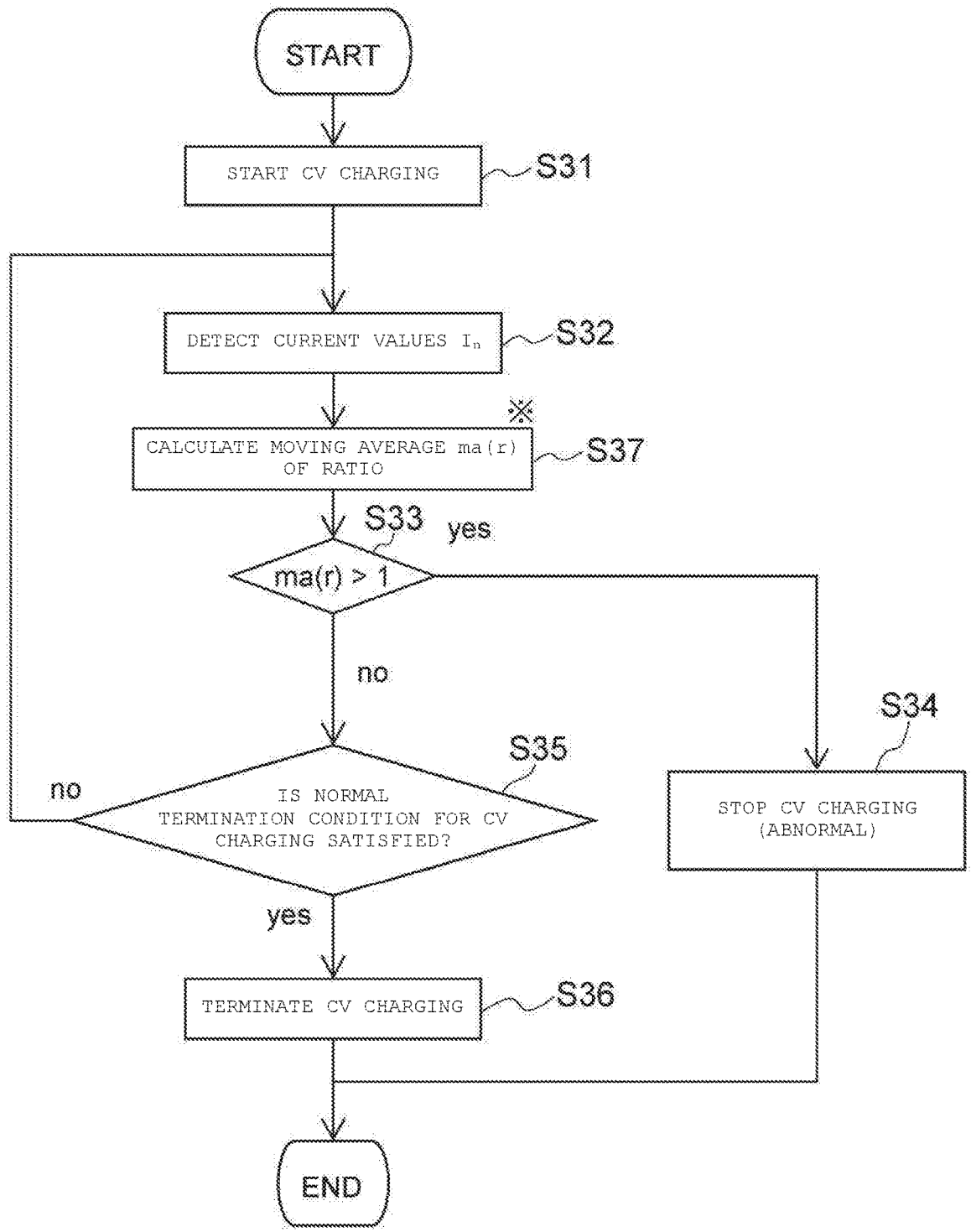
FIG. 3 is a flowchart showing an example of constant voltage (CV) charging according to an embodiment of the present disclosure.

The charging control device of the first embodiment according to the present technology will be described with reference to the flowchart shown in FIG. 3.

In step S31, constant voltage (CV) charging is started, and in step S32, current values $I_n$ (n=1, 2, . . . ) are detected. Subsequently, in step S37, the moving average $ma(r)$ of the ratio is calculated.

In step S33, if $ma(r) > 1$ is satisfied, the value is abnormal, and the process proceeds to step S34 to stop the constant voltage (CV) charging. If $ma(r) > 1$ is not satisfied, the process proceeds to step S35. In step S35, it is determined whether a normal termination condition for constant voltage (CV) charging is satisfied. When the normal termination condition for constant voltage (CV) charging is satisfied, the process proceeds to step S36 and the constant voltage (CV) charging is terminated. When the normal termination condition of constant voltage (CV) charging is not satisfied, the process returns to step S32 again, and the processes after step S32 are repeated.

In step S37, the ratio is defined as $r = I_n / I_{(n-1)}$.

Figure 4:
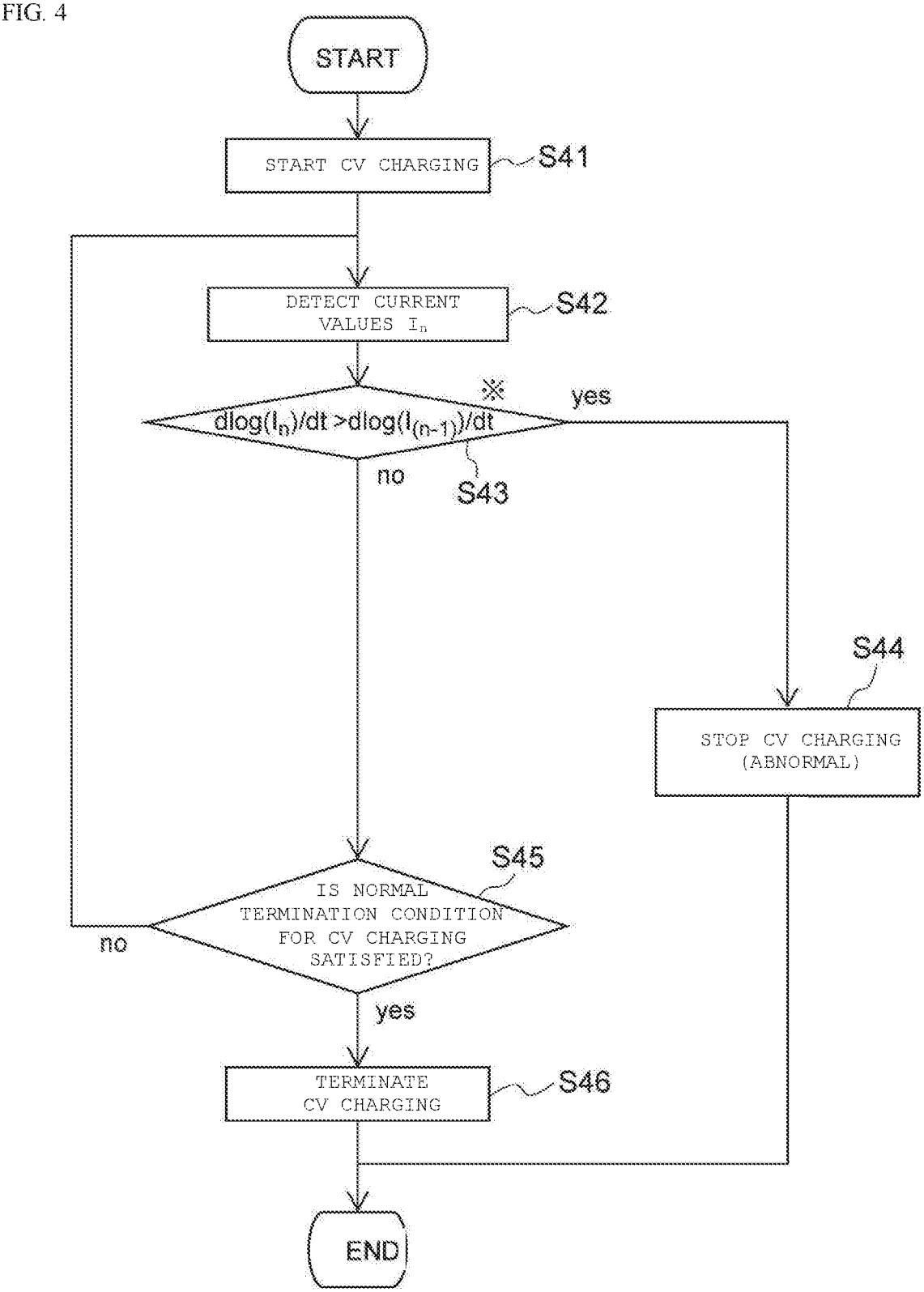
FIG. 4 is a flowchart showing an example of constant voltage (CV) charging according to an embodiment of the present disclosure.

The charging control device of the first embodiment according to the present technology will be described with reference to the flowchart shown in FIG. 4.

In step S41, constant voltage (CV) charging is started, and in step S42, current values $I_n$ (n=1, 2, . . . ) are detected.

In step S43, if $d \log(I_n)/dt > d \log(I_{(n-1)})/dt$ is satisfied, the value is abnormal and the process proceeds to step S44 to stop constant voltage (CV) charging. If $d \log(I_n)/dt > d \log(I_{n-1})/dt$ is not satisfied, the process proceeds to step S45. In step S45, it is determined whether a normal termination condition for constant voltage (CV) charging is satisfied. When the normal termination condition for constant voltage (CV) charging is satisfied, the process proceeds to step S46 and the constant voltage (CV) charging is terminated. When the normal termination condition of constant voltage (CV) charging is not satisfied, the process returns to step S42 again, and the processes after step S42 are repeated.

In step S43, as the current values $d \log(I_n)/dt$ and $d \log(I_{(n-1)})/dt$, $ma(d \log(I_n)/dt)$ and $ma(d \log(I_{(n-1)})/dt)$ obtained by applying a moving average, preferably an exponential moving average may be used.

Figure 5:
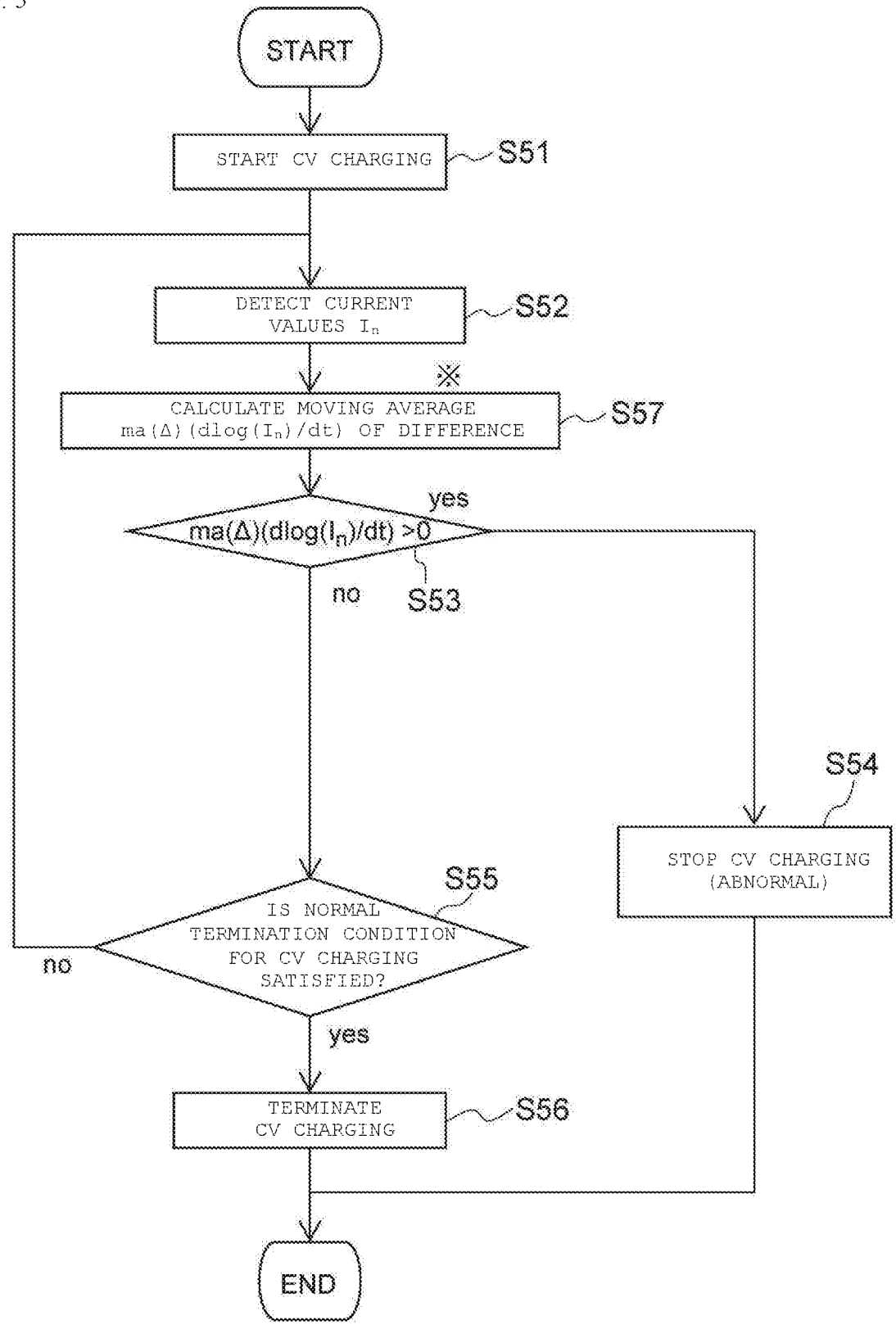
FIG. 5 is a flowchart showing an example of constant voltage (CV) charging according to an embodiment of the present disclosure.

The charging control device of the first embodiment according to the present technology will be described with reference to the flowchart shown in FIG. 5.

In step S51, constant voltage (CV) charging is started, and in step S52, current values $I_n$ (n=1, 2, . . . ) are detected. Subsequently, in step S57, the moving average $ma(\Delta)(d \log(In)/dt)$ of the difference is calculated.

In step S53, if $ma(\Delta)(d \log(I_n)/dt) > 0$ is satisfied, the value is abnormal and the process proceeds to step S54 to stop constant voltage (CV) charging. If $ma(\Delta)(d \log(I_n)/dt) > 0$ is not satisfied, the process proceeds to step S55. In step S55, it is determined whether a normal termination condition for constant voltage (CV) charging is satisfied. When the normal termination condition for constant voltage (CV) charging is satisfied, the process proceeds to step S56 and the constant voltage (CV) charging is terminated. When the normal termination condition of constant voltage (CV) charging is not satisfied, the process returns to step S52 again, and the processes after step S52 are repeated.

In step S57, the difference is defined as $\Delta(d \log(I_n)/dt) = d \log(I_n)/dt - d \log(I_{(n-1)})/dt$.

Figure 6:
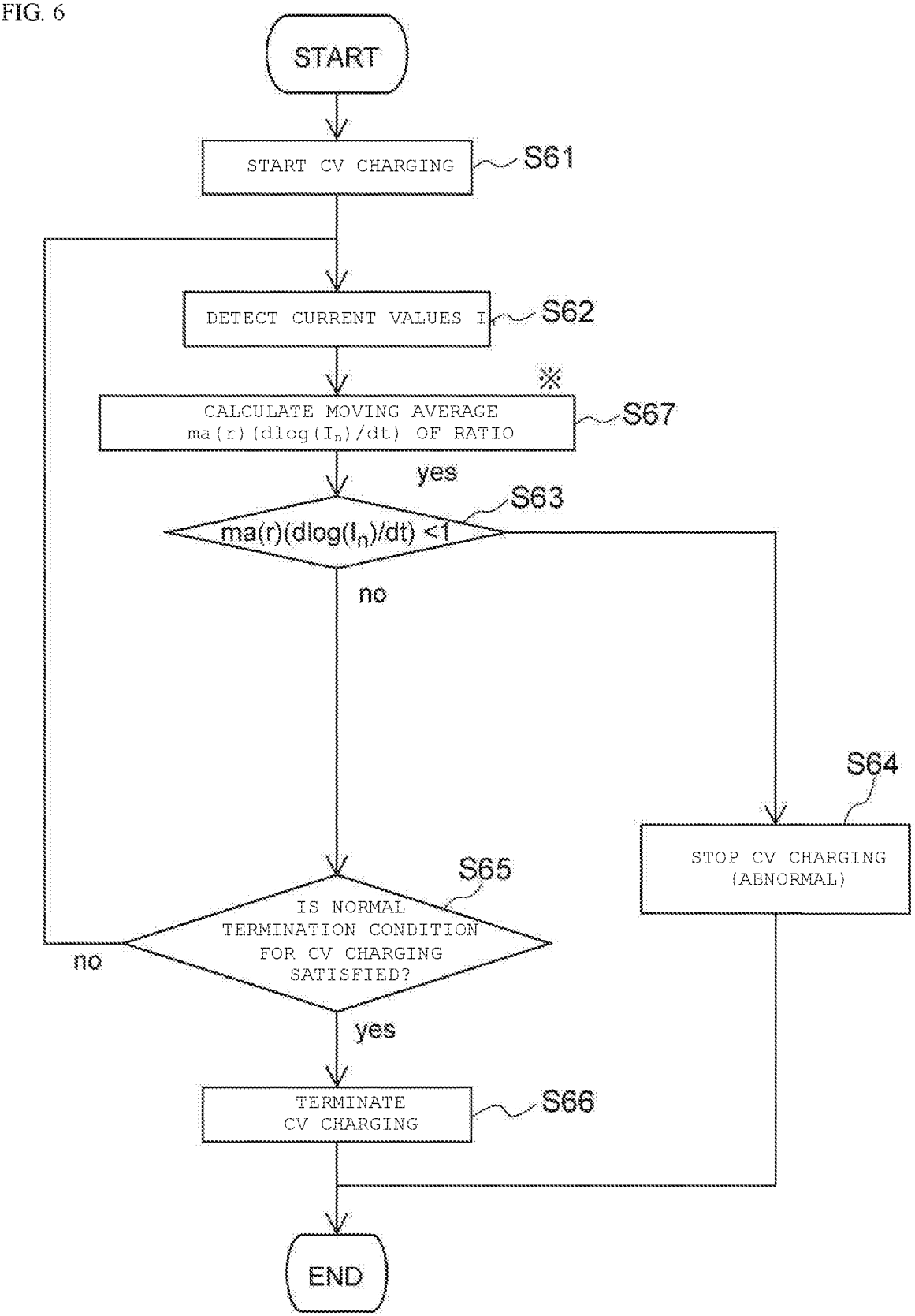
FIG. 6 is a flowchart showing an example of constant voltage (CV) charging according to an embodiment of the present disclosure.

The charging control device of the first embodiment according to the present technology will be described with reference to the flowchart shown in FIG. 6.

In step S61, constant voltage (CV) charging is started, and in step S62, current values $I_n$ (n=1, 2, . . . ) are detected. Subsequently, in step S67, the moving average $ma(r)(d \log(I_n)/dt)$ of the ratio is calculated.

If $ma(r)(d \log(I_n)/dt) < 1$ in step S63, the value is abnormal, and the process proceeds to step S64 to stop constant voltage (CV) charging. If $ma(r)(d \log(I_n)/dt) < 1$ is not satisfied, the process proceeds to step S65. In step S65, it is determined whether a normal termination condition for constant voltage (CV) charging is satisfied. When the normal termination condition for constant voltage (CV) charging is satisfied, the process proceeds to step S66 and the constant voltage (CV) charging is terminated. When the normal termination condition of constant voltage (CV) charging is not satisfied, the process returns to step S62 again, and the processes after step S62 are repeated.

In step S67, the ratio is defined as $r(d \log(I_n)/dt) = d \log(I_n)/dt / d \log(I_{(n-1)})/dt$.

Figure 15:
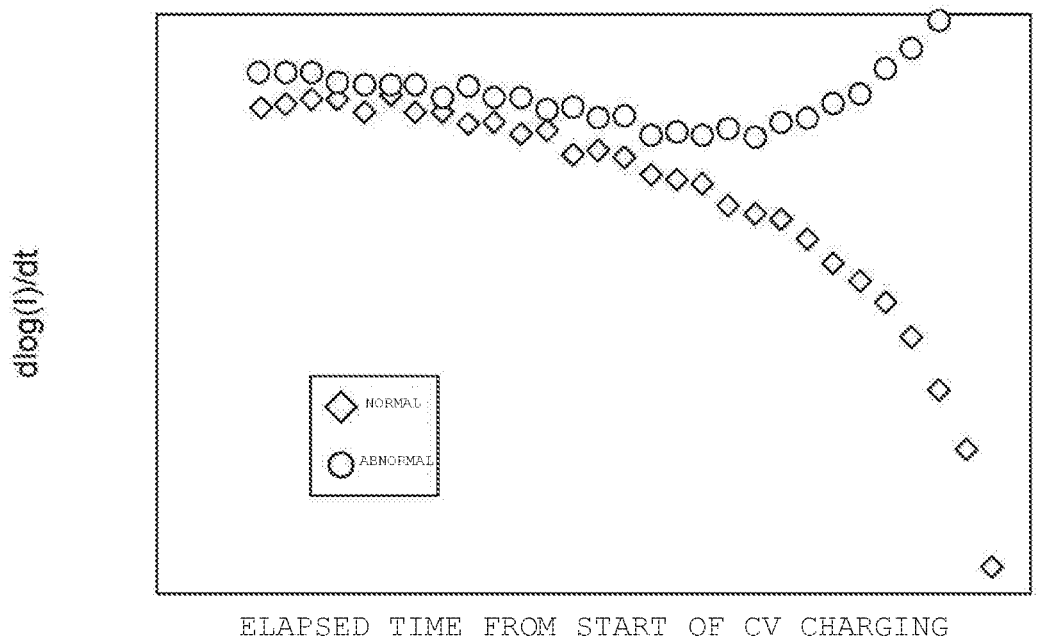
FIG. 15 is a diagram showing a relationship between an elapsed time after starting constant voltage (CV) charging and d log(I)/dt according to an embodiment of the present disclosure.
Figure 16:
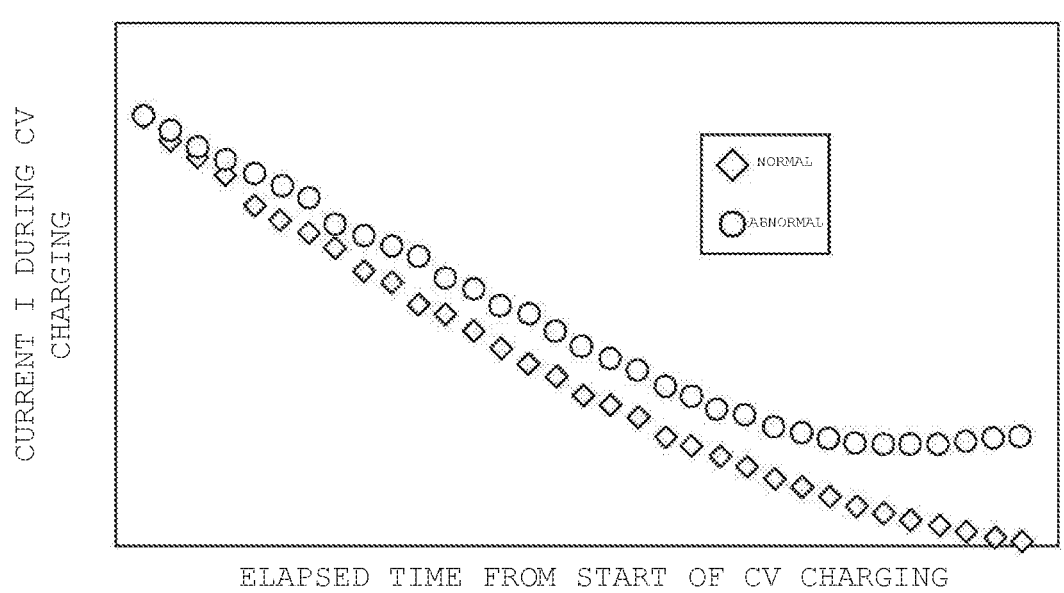
FIG. 16 is a diagram illustrating a relationship between an elapsed time after starting constant voltage (CV) charging and a current I during constant voltage (CV) charging according to an embodiment of the present disclosure.

The increase in the value of the charging current per unit time will be described with reference to FIGS. 15 and 16. FIG. 15 is a diagram showing the relationship between the elapsed time (horizontal axis) from the start of the constant voltage (CV) charging and d log(I)/dt (value of charging current per unit time) (vertical axis). FIG. 16 is a diagram showing the relationship between the elapsed time (horizontal axis) from the start of constant voltage (CV) charging and the current I (vertical axis) during constant voltage (CV) charging.

As shown in FIG. 15, in the case of a normal battery, d log(I)/dt (value of charging current per unit time) decreases with the elapsed time from the start of constant voltage charging. On the other hand, in the case of an abnormal battery, d log(I)/dt (value of charging current per unit time) decreases and then increases with the elapsed time from the start of constant voltage charging.

Also, as shown in FIG. 16, in the case of a normal battery, the reduction (attenuation) level of the current I is substantially constant even after a given time has elapsed since the start of constant voltage charging. On the other hand, in the case of an abnormal battery, the decrease (attenuation) level of the current I decreases with the elapsed time from the start of constant voltage charging. That is, in the case of an abnormal battery, the value of the current I apparently decreases with the elapsed time from the start of constant voltage charging, but the value of the current I per unit time (for example, d log(I)/dt), and the difference between the two consecutive values of the current I per unit time at a specified time interval (for example, $(\Delta)\text{d log}(I_n)/\text{dt}=\text{d log}(I_n)/\text{dt}-\text{d log}(I_{(n-1)})/\text{dt}$) increase with the elapsed time after the abnormality occurs from the start of constant voltage charging, and the ratio of the consecutive values of the current I per unit time at a specified time interval, $((r)\text{d log}(I_n)/\text{dt}=\text{d log}(I_n)/\text{dt}/\text{d log}(I_{(n-1)})/\text{dt})$, decreases with the elapsed time after the abnormality occurs from the start of constant voltage charging.

The charging control device of the second embodiment (example 2 of the charging control device) according to the present technology includes a current detector, an abnormal current determination unit, a charging stop unit, a battery temperature detector, and an abnormal temperature determination unit. The current detector detects the charging current. The abnormal current determination unit determines whether the charging current is attenuated and/or increased in the constant voltage charging region, and further determines whether the value of the charging current per unit time is increasing. The battery temperature detector detects the battery temperature. The battery temperature detector can include, for example, a thermistor whose resistance value varies with temperature, and can detect the temperature of the battery cell by measuring the voltage of the thermistor. In addition to the battery temperature detector, the charging control device of the second embodiment according to the present technology may further include another temperature detector in order to detect the temperature of another location and the like and the like in the charging control device or the charging unit. The battery temperature detector may be provided near the battery cell. Another temperature detector may be provided near the battery cell, or may be provided at the location away from the vicinity of the battery cell. The abnormal temperature determination unit determines whether the battery temperature in the constant voltage region is 45° C. or higher. The charging stop unit stops the constant voltage charging when the value of the charging current per unit time increases and the battery temperature is 45° C. or higher.

According to the charging control device of the second embodiment according to the present technology, it is possible to improve reliability. More specifically, according to the charging control device of the second embodiment according to the present technology, it is possible to suppress the occurrence of abnormality due to an internal short circuit when an overcharge locally occurs during constant voltage charging.

The current detector may detect the smoothed charging current value using the moving average method, as in the current detector provided in the charging control device of the first embodiment. The moving average method is preferably an exponential moving average method.

The abnormal temperature determination unit provided in the charging control device of the second embodiment according to the present technology can determine whether the battery temperature in the constant voltage region is higher than the battery temperature at the start of constant voltage charging, and can determine whether the rate of increase in the battery temperature in the constant voltage region is greater than the maximum value of the rate of increase in the battery temperature in the constant current charging region.

In this case, the charging stop unit stops constant voltage charging when the value of the charging current per unit time increases, further the battery temperature in the constant voltage region is higher than the battery temperature at the start of constant voltage charging, and the rate of increase in the battery temperature in the constant voltage region is greater than the maximum value of the rate of increase in the battery temperature in the constant current charging region.

The charging control device of the second embodiment according to the present technology may further include an outside air temperature detector. The outside air temperature detector detects the outside air temperature. As in the battery temperature detector, the outside air temperature detector can include, for example, a thermistor whose resistance value varies with temperature, and can detect the outside air temperature by measuring the voltage of the thermistor.

When the charging control device of the second embodiment according to the present technology includes the battery temperature detector and the outside air temperature detector, the battery temperature detector may be provided near the battery cell, and the outside air temperature detector may be provided near the outside air. In addition to the battery temperature detector and the outside air temperature detector, the charging control device of the second embodiment according to the present technology may further include another temperature detector in order to detect the temperature of another location and the like in the charging control device or the charging unit. Another temperature detector may be provided near the battery cell, or may be provided at the location away from the vicinity of the battery cell.

When the charging control device of the second embodiment according to the present technology includes the battery temperature detector and the outside air temperature detector, the abnormal temperature determination unit determines whether the rate of increase in the battery temperature in the constant voltage region is greater than the rate of increase in the outside air temperature. The charging stop unit stops the constant voltage charging when the value of the charging current per unit time increases and the rate of increase in the battery temperature in the constant voltage region is greater than the rate of increase in the outside air temperature.

Hereinafter, the charging control device of the second embodiment according to the present technology will be described in more detail with reference to FIGS. 7 to 12.

FIGS. 7 to 12 are flowcharts showing an example of constant voltage (CV) charging.

Figure 7:
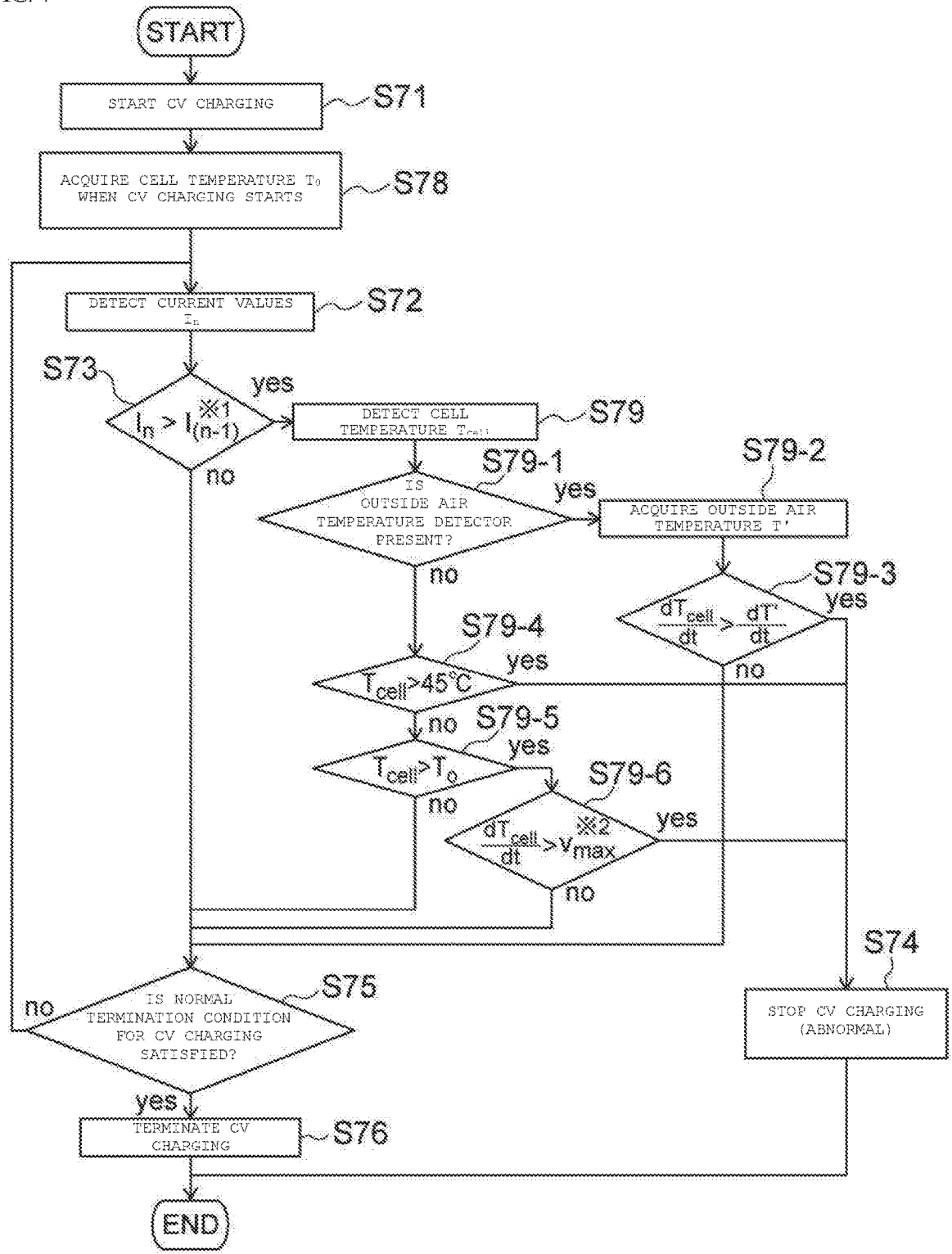
FIG. 7 is a flowchart showing an example of constant voltage (CV) charging according to an embodiment of the present disclosure.

First, the charging control device of the second embodiment according to the present technology will be described with reference to the flowchart shown in FIG. 7.

In step S71, constant voltage (CV) charging is started. Subsequently, in step S78, cell temperature (battery temperature) $T_0$ at the time of starting constant voltage (CV) charging is acquired. Next, in step S72, the current values $I_n$ (n=1, 2, . . . ) are detected.

In step S73, if $I_n > I_{(n-1)}$ is satisfied, the process proceeds to step S79. In step S79, a cell temperature (battery temperature) $T_{cell}$ is detected, and the process proceeds to step S79-1.

In step S79-1, when the outside air temperature detector is present (when the charging control device of the second embodiment includes the outside air temperature detector), the process proceeds to step S79-2 and an outside air temperature T' is acquired. Subsequently, in step S79-3, it is determined whether $dT_{cell}/dt > dT'/dt$ is satisfied. When it is determined that $dT_{cell}/dt > dT'/dt$ is satisfied, the value is abnormal and the process proceeds to step S74 to stop the constant voltage (CV) charging.

When it is determined that $dT_{cell}/dt > dT'/dt$ is not satisfied, the process proceeds to step S75. In step S75, it is determined whether a normal termination condition for constant voltage (CV) charging is satisfied. When the normal termination condition for constant voltage (CV) charging is satisfied, the process proceeds to step S76, and constant voltage (CV) charging is terminated. When the normal termination condition of constant voltage (CV) charging is not satisfied, the process returns to step S72 again, and the processes after step S72 are repeated.

In step S79-1, when the outside air temperature detector is not present (when the charging control device of the second embodiment does not include the outside air temperature detector), the process proceeds to step S79-4. In step S79-4, it is determined whether $T_{cell} > 45°$ C. is satisfied. When it is determined that $T_{cell} > 45°$ C. is satisfied, the value is abnormal, and the process proceeds to step S74 to stop constant voltage (CV) charging.

When it is determined that $T_{cell} > 45°$ C. is not satisfied, the process moves to step S79-5. In step S79-5, it is determined whether $T_{cell} > T_0$ is satisfied.

When it is determined that $T_{cell} > T_0$ is satisfied, the process proceeds to step S79-6. In step S79-6, it is determined whether $dT_{cell} > v_{max}$ is satisfied.

$v_{max}$ is the maximum value of the rate of temperature increase during constant current (CC) charging measured at room temperature under adiabatic conditions. When it is determined that $dT_{cell} > v_{max}$ is satisfied, the value is abnormal and the process proceeds to step S74 to stop the constant voltage (CV) charging.

When it is determined that $dT_{cell} > v_{max}$ is not satisfied, the process proceeds to step S75. In step S75, it is determined whether a normal termination condition for constant voltage (CV) charging is satisfied. When the normal termination condition for constant voltage (CV) charging is satisfied, the process proceeds to step S76, and constant voltage (CV) charging is terminated. When the normal termination condition of constant voltage (CV) charging is not satisfied, the process returns to step S72 again, and the processes after step S72 are repeated.

When it is determined that $T_{cell} > T_0$ is not satisfied, the process proceeds to step S75. In step S75, it is determined whether a normal termination condition for constant voltage (CV) charging is satisfied. When the normal termination condition for constant voltage (CV) charging is satisfied, the process proceeds to step S76, and constant voltage (CV) charging is terminated. When the normal termination condition of constant voltage (CV) charging is not satisfied, the process returns to step S72 again, and the processes after step S72 are repeated.

In step S73, if $I_n > I_{(n-1)}$ is not satisfied, the process proceeds to step S75. In step S75, it is determined whether a normal termination condition for constant voltage (CV) charging is satisfied. When the normal termination condition for constant voltage (CV) charging is satisfied, the process proceeds to step S76, and constant voltage (CV) charging is terminated. When the normal termination condition of constant voltage (CV) charging is not satisfied, the process returns to step S72 again, and the processes after step S72 are repeated.

In step S73, as the current values $I_n$ and $I_{(n-1)}$, $Ima_n$ and $Ima_{(n-1)}$ obtained by applying a moving average, preferably an exponential moving average may be used.

Figure 8:
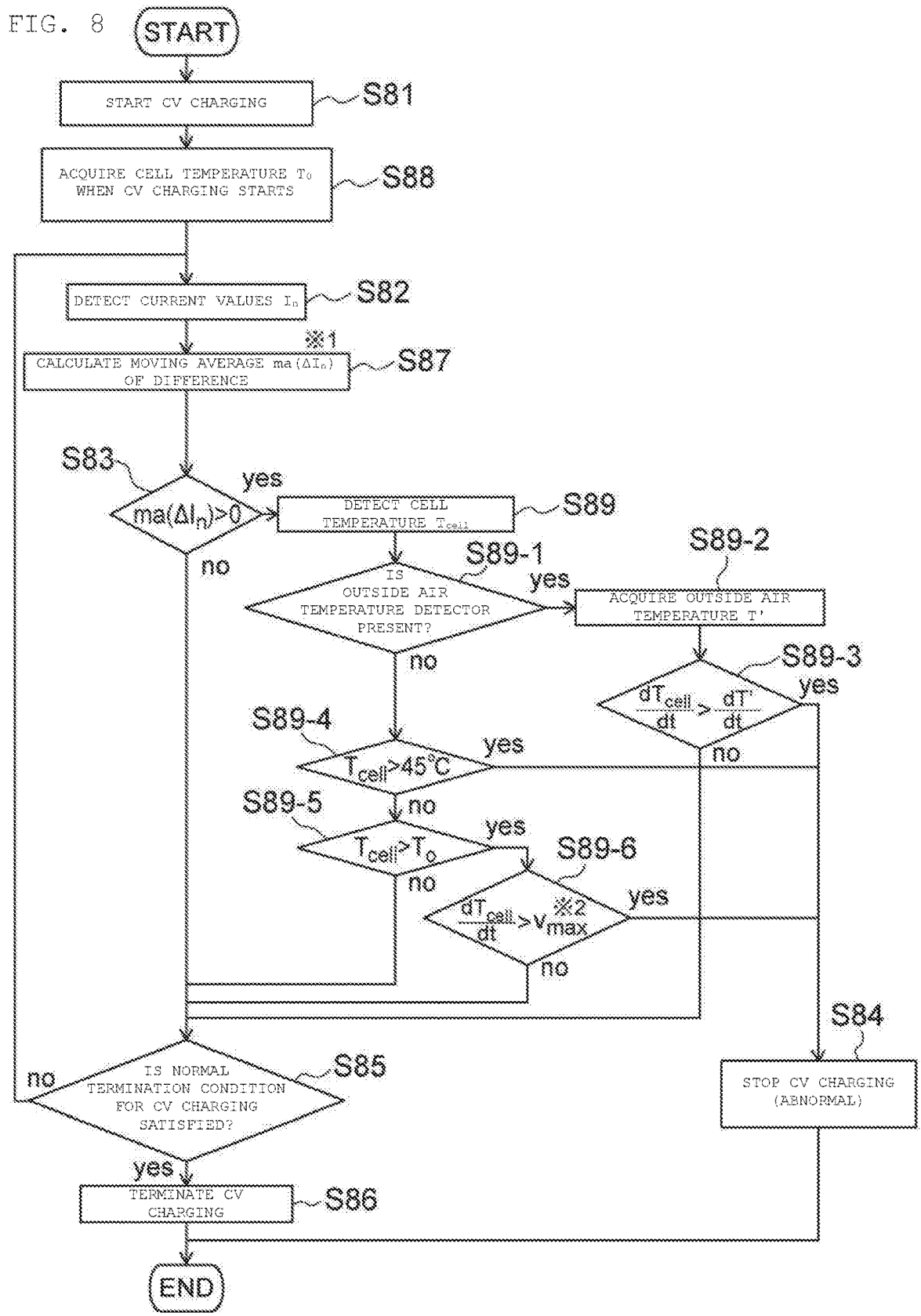
FIG. 8 is a flowchart showing an example of constant voltage (CV) charging according to an embodiment of the present disclosure.

The charging control device of the second embodiment according to the present technology will be described with reference to the flowchart shown in FIG. 8.

In step S81, constant voltage (CV) charging is started. Subsequently, in step S88, cell temperature (battery temperature) $T_0$ at the time of starting constant voltage (CV) charging is acquired. Next, in step S82, the current values $I_n$ (n=1, 2, . . . ) are detected. Subsequently, in step S87, the moving average $ma(\Delta I_n)$ of the difference is calculated.

In step S83, if $ma(\Delta I_n) > 0$ is satisfied, the process proceeds to step S89. In step S89, the cell temperature (battery temperature) $T_{cell}$ is detected, and the process proceeds to step S89-1.

In step S89-1, when the outside air temperature detector is present (when the charging control device of the second embodiment includes the outside air temperature detector), the process proceeds to step S89-2 and the outside air temperature T' is acquired. Subsequently, in step S89-3, it is determined whether $dT_{cell}/dt > dT'/dt$ is satisfied. When it is determined that $dT_{cell}/dt > dT'/dt$ is satisfied, the value is abnormal and the process proceeds to step S84 to stop the constant voltage (CV) charging.

When it is determined that $dT_{cell}/dt > dT'/dt$ is not established, the process proceeds to step S85. In step S85, it is determined whether a normal termination condition for constant voltage (CV) charging is satisfied. When the normal termination condition for constant voltage (CV) charging is satisfied, the process proceeds to step S86 and the constant voltage (CV) charging is terminated. When the normal termination condition of constant voltage (CV) charging is not satisfied, the process returns to step S82 again, and the processes after step S82 are repeated.

In step S89-1, when the outside air temperature detector is not present (when the charging control device of the second embodiment does not include the outside air temperature detector), the process proceeds to step S89-4. In step S89-4, it is determined whether $T_{cell} > 45°$ C. is satisfied. When it is determined that $T_{cell} > 45°$ C. is satisfied, the value is abnormal, and the process proceeds to step S84 to stop constant voltage (CV) charging.

When it is determined that $T_{cell} > 45°$ C. is not satisfied, the process moves to step S89-5. In step S89-5, it is determined whether $T_{cell} > T_0$ is satisfied.

When it is determined that $T_{cell} > T_0$ is satisfied, the process proceeds to step S89-6. In step S89-6, it is determined whether $dT_{cell} > v_{max}$ is satisfied.

$v_{max}$ is the maximum value of the rate of temperature increase during constant current (CC) charging measured at room temperature under adiabatic conditions. When it is determined that $dT_{cell} > v_{max}$ is satisfied, the value is abnormal and the process proceeds to step S84 to stop constant voltage (CV) charging.

When it is determined that $dT_{cell} > v_{max}$ is not satisfied, the process proceeds to step S85. In step S85, it is determined whether a normal termination condition for constant voltage (CV) charging is satisfied. When the normal termination condition for constant voltage (CV) charging is satisfied, the process proceeds to step S86 and the constant voltage (CV) charging is terminated. When the normal termination condition of constant voltage (CV) charging is not satisfied, the process returns to step S82 again, and the processes after step S82 are repeated.

When it is determined that $T_{cell} > T_0$ is not satisfied, the process proceeds to step S85. In step S85, it is determined whether a normal termination condition for constant voltage (CV) charging is satisfied. When the normal termination condition for constant voltage (CV) charging is satisfied, the process proceeds to step S86 and the constant voltage (CV) charging is terminated. When the normal termination condition of constant voltage (CV) charging is not satisfied, the process returns to step S82 again, and the processes after step S82 are repeated.

If ma($\Delta I_n$)>0 is not satisfied in step S83, the process proceeds to step S85. In step S85, it is determined whether a normal termination condition for constant voltage (CV) charging is satisfied. When the normal termination condition for constant voltage (CV) charging is satisfied, the process proceeds to step S86 and the constant voltage (CV) charging is terminated. When the normal termination condition of constant voltage (CV) charging is not satisfied, the process returns to step S82 again, and the processes after step S82 are repeated.

In step S87, the difference is defined as $\Delta I_n = I_n - I_{(n-1)}$.

Figure 9:
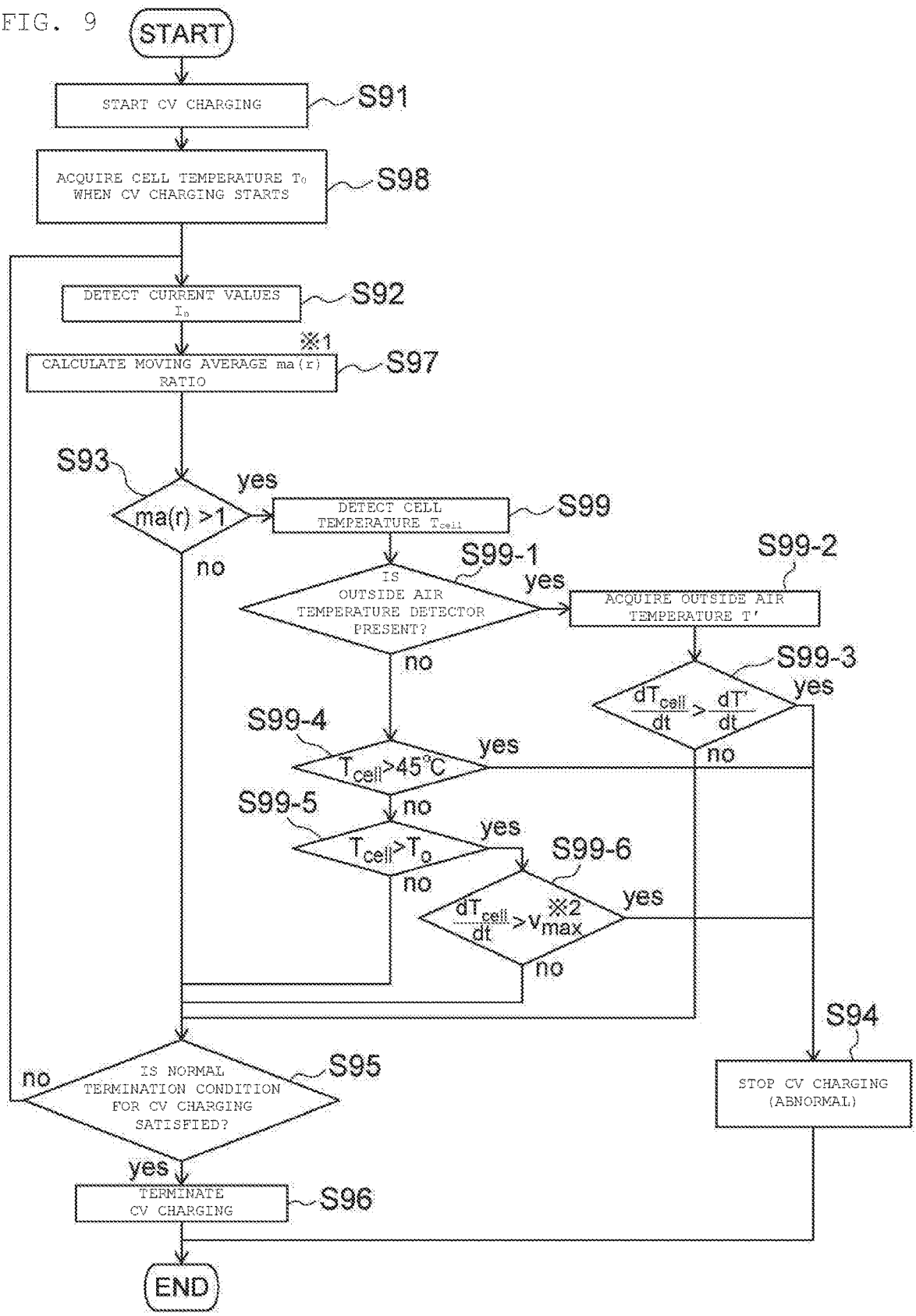
FIG. 9 is a flowchart showing an example of constant voltage (CV) charging according to an embodiment of the present disclosure.

The charging control device of the second embodiment according to the present technology will be described with reference to the flowchart shown in FIG. 9.

In step S91, constant voltage (CV) charging is started. Subsequently, in step S98, cell temperature (battery temperature) $T_0$ at the time of starting constant voltage (CV) charging is acquired. Next, in step S92, the current values $I_n$ (n=1, 2, . . . ) are detected. Subsequently, in step S97, the moving average ma(r) of the ratio is calculated.

In step S93, if ma(r)>1 is satisfied, the process proceeds to step S99. In step S99, the cell temperature (battery temperature) $T_{cell}$ is detected, and the process proceeds to step S99-1.

In step S99-1, when the outside air temperature detector is present (when the charging control device of the second embodiment includes the outside air temperature detector), the process proceeds to step S99-2 and the outside air temperature T' is acquired. Subsequently, in step S99-3, it is determined whether $dT_{cell}/dt > dT'/dt$ is satisfied. When it is determined that $dT_{cell}/dt > dT'/dt$ is satisfied, the value is abnormal and the process proceeds to step S94 to stop constant voltage (CV) charging.

When it is determined that $dT_{cell}/dt > dT'/dt$ is not established, the process proceeds to step S95. In step S95, it is determined whether a normal termination condition for constant voltage (CV) charging is satisfied. When the normal termination condition for constant voltage (CV) charging is satisfied, the process proceeds to step S96 and the constant voltage (CV) charging is terminated. When the normal termination condition of constant voltage (CV) charging is not satisfied, the process returns to step S92 again, and the processes after step S92 are repeated.

In step S99-1, when the outside air temperature detector is not present (when the charging control device of the second embodiment does not include the outside air temperature detector), the process proceeds to step S99-4. In step S99-4, it is determined whether $T_{cell} > 45°$ C. is satisfied. When it is determined that $T_{cell} > 45°$ C. is satisfied, the value is abnormal, and the process proceeds to step S94 to stop constant voltage (CV) charging.

When it is determined that $T_{cell} > 45°$ C. is not satisfied, the process proceeds to step S99-5. In step S99-5, it is determined whether $T_{cell} > T_0$ is satisfied.

When it is determined that $T_{cell} > T_0$ is satisfied, the process proceeds to step S99-6, it is determined whether $dT_{cell}/dt > v_{max}$ is satisfied. $v_{max}$ is the maximum value of the rate of temperature increase during constant current (CC) charging measured at room temperature under adiabatic conditions. When it is determined that $dT_{cell}/dt > v_{max}$ is satisfied, the value is abnormal and the process proceeds to step S94 to stop the constant voltage (CV) charging.

When it is determined that $dT_{cell}/dt > v_{max}$ is not satisfied, the process proceeds to step S95. In step S95, it is determined whether a normal termination condition for constant voltage (CV) charging is satisfied. When the normal termination condition for constant voltage (CV) charging is satisfied, the process proceeds to step S96 and the constant voltage (CV) charging is terminated. When the normal termination condition of constant voltage (CV) charging is not satisfied, the process returns to step S92 again, and the processes after step S92 are repeated.

When it is determined that $T_{cell} > T_0$ is not satisfied, the process proceeds to step S95. In step S95, it is determined whether a normal termination condition for constant voltage (CV) charging is satisfied. When the normal termination condition for constant voltage (CV) charging is satisfied, the process proceeds to step S96 and the constant voltage (CV) charging is terminated. When the normal termination condition of constant voltage (CV) charging is not satisfied, the process returns to step S92 again, and the processes after step S92 are repeated.

If ma(r)>1 is not satisfied in step S93, the process proceeds to step S95. In step S95, it is determined whether a normal termination condition for constant voltage (CV) charging is satisfied. When the normal termination condition for constant voltage (CV) charging is satisfied, the process proceeds to step S96 and the constant voltage (CV) charging is terminated. When the normal termination condition of constant voltage (CV) charging is not satisfied, the process returns to step S92 again, and the processes after step S92 are repeated.

In step S97, the ratio is defined as $r = I_n/I_{(n-1)}$.

Figure 10:
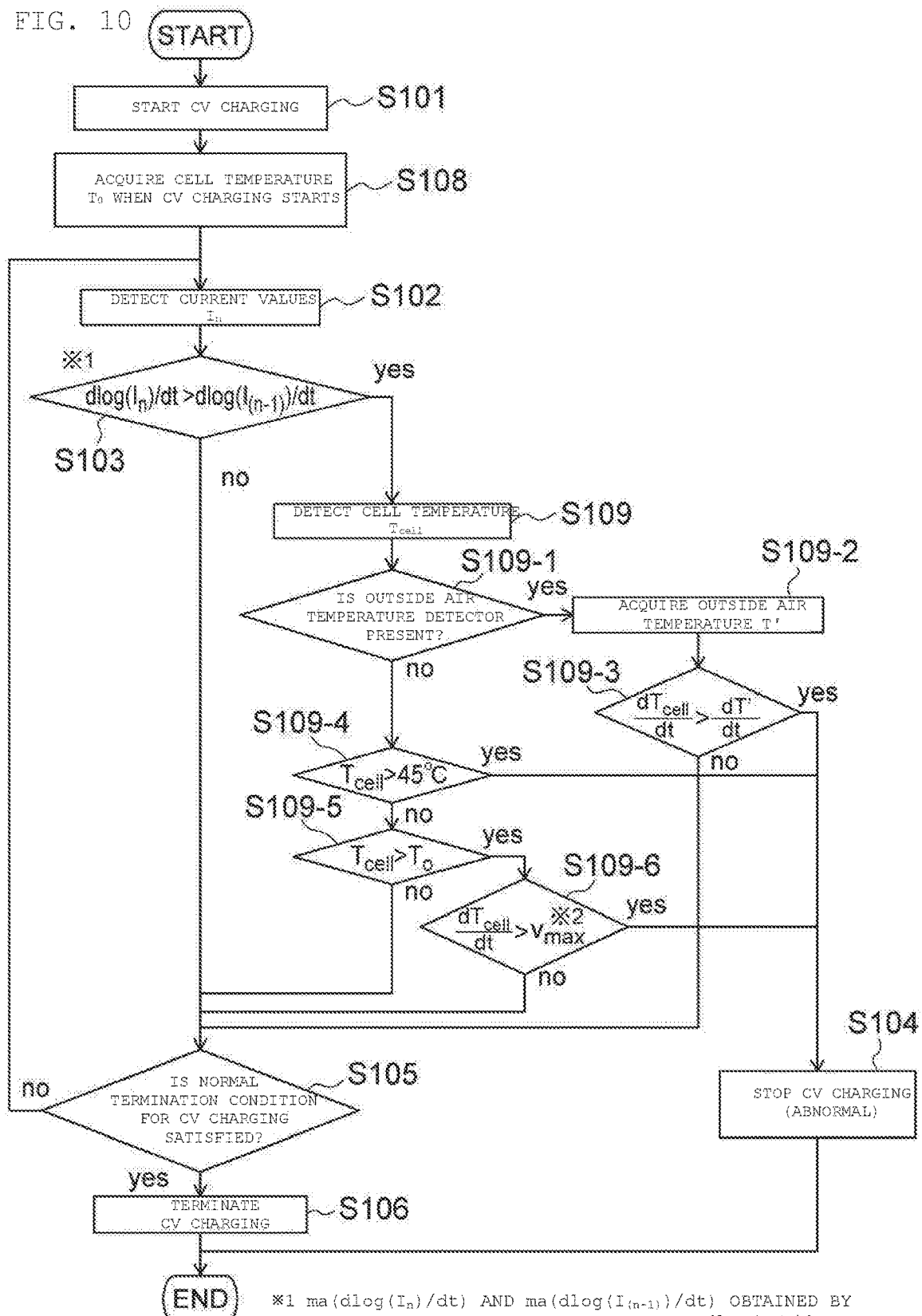
FIG. 10 is a flowchart showing an example of constant voltage (CV) charging according to an embodiment of the present disclosure.

The charging control device of the second embodiment according to the present technology will be described with reference to the flowchart shown in FIG. 10.

In step S101, constant voltage (CV) charging is started. Subsequently, in step S108, cell temperature (battery temperature) $T_0$ at the time of starting constant voltage (CV) charging is acquired. Next, in step S102, current values $I_n$ (n=1, 2, . . . ) are detected.

In step S103, if $d \log(I_n)/dt > d \log(I_{(n-1)})/dt$ is satisfied, the process proceeds to step S109. In step S109, the cell temperature (battery temperature) $T_{cell}$ is detected, and the process proceeds to step S109-1.

In step S109-1, when the outside air temperature detector is present (when the charging control device of the second embodiment includes the outside air temperature detector), the process proceeds to step S109-2 and the outside air temperature T' is acquired. Subsequently, in step S109-3, it is determined whether $dT_{cell}/dt > dT'/dt$ is satisfied. When it is determined that $dT_{cell}/dt > dT'/dt$ is satisfied, the value is abnormal and the process proceeds to step S104 to stop the constant voltage (CV) charging.

When it is determined that $dT_{cell}/dt > dT'/dt$ is not satisfied, the process proceeds to step S105. In step S105, it is determined whether a normal termination condition for constant voltage (CV) charging is satisfied. When the normal termination condition for constant voltage (CV) charging is satisfied, the process proceeds to step S106 and the constant voltage (CV) charging is terminated. When the normal termination condition of constant voltage (CV) charging is not satisfied, the process returns to step S102 again, and the processes after step S102 are repeated.

In step S9-1, when the outside air temperature detector is not present (when the charging control device of the second embodiment does not include the outside air temperature detector), the process proceeds to step S109-4. In step S109-4, it is determined whether $T_{cell}>45°$ C. is satisfied. When it is determined that $T_{cell}>45°$ C., the value is abnormal, and the process proceeds to step S104 to stop constant voltage (CV) charging.

When it is determined that $T_{cell}>45°$ C. is not satisfied, the process moves to step S109-5. In step S109-5, it is determined whether $T_{cell}>T_0$ is satisfied.

When it is determined that $T_{cell}>T_0$ is satisfied, the process proceeds to step S109-6.

In step S109-6, it is determined whether $dT_{cell}/dt>v_{max}$ is satisfied. $v_{max}$ is the maximum value of the rate of temperature increase during constant current (CC) charging measured at room temperature under adiabatic conditions. When it is determined that $dT_{cell}/dt>v_{max}$ is satisfied, the value is abnormal and the process proceeds to step S104 to stop constant voltage (CV) charging.

When it is determined that $dT_{cell}/dt>v_{max}$ is not satisfied, the process proceeds to step S105. In step S105, it is determined whether a normal termination condition for constant voltage (CV) charging is satisfied. When the normal termination condition for constant voltage (CV) charging is satisfied, the process proceeds to step S106 and the constant voltage (CV) charging is terminated. When the normal termination condition of constant voltage (CV) charging is not satisfied, the process returns to step S102 again, and the processes after step S102 are repeated.

When it is determined that $T_{cell}>T_0$ is not satisfied, the process proceeds to step S105. In step S105, it is determined whether a normal termination condition for constant voltage (CV) charging is satisfied. When the normal termination condition for constant voltage (CV) charging is satisfied, the process proceeds to step S106 and the constant voltage (CV) charging is terminated. When the normal termination condition of constant voltage (CV) charging is not satisfied, the process returns to step S102 again, and the processes after step S102 are repeated.

In step S103, if $d \log(I_n)/dt>d \log(I_{(n-1)})/dt$ is not satisfied, the process proceeds to step S105. In step S105, it is determined whether a normal termination condition for constant voltage (CV) charging is satisfied. When the normal termination condition for constant voltage (CV) charging is satisfied, the process proceeds to step S106 and the constant voltage (CV) charging is terminated. When the normal termination condition of constant voltage (CV) charging is not satisfied, the process returns to step S102 again, and the processes after step S102 are repeated.

In step S103, as the current values $d \log(I_n)/dt$ and $d \log(I_{(n-1)})/dt$, $ma(d \log(I_n)/dt)$ and $ma(d \log(I_{(n-1)})/dt)$ obtained by applying a moving average, preferably an exponential moving average may be used.

Figure 11:
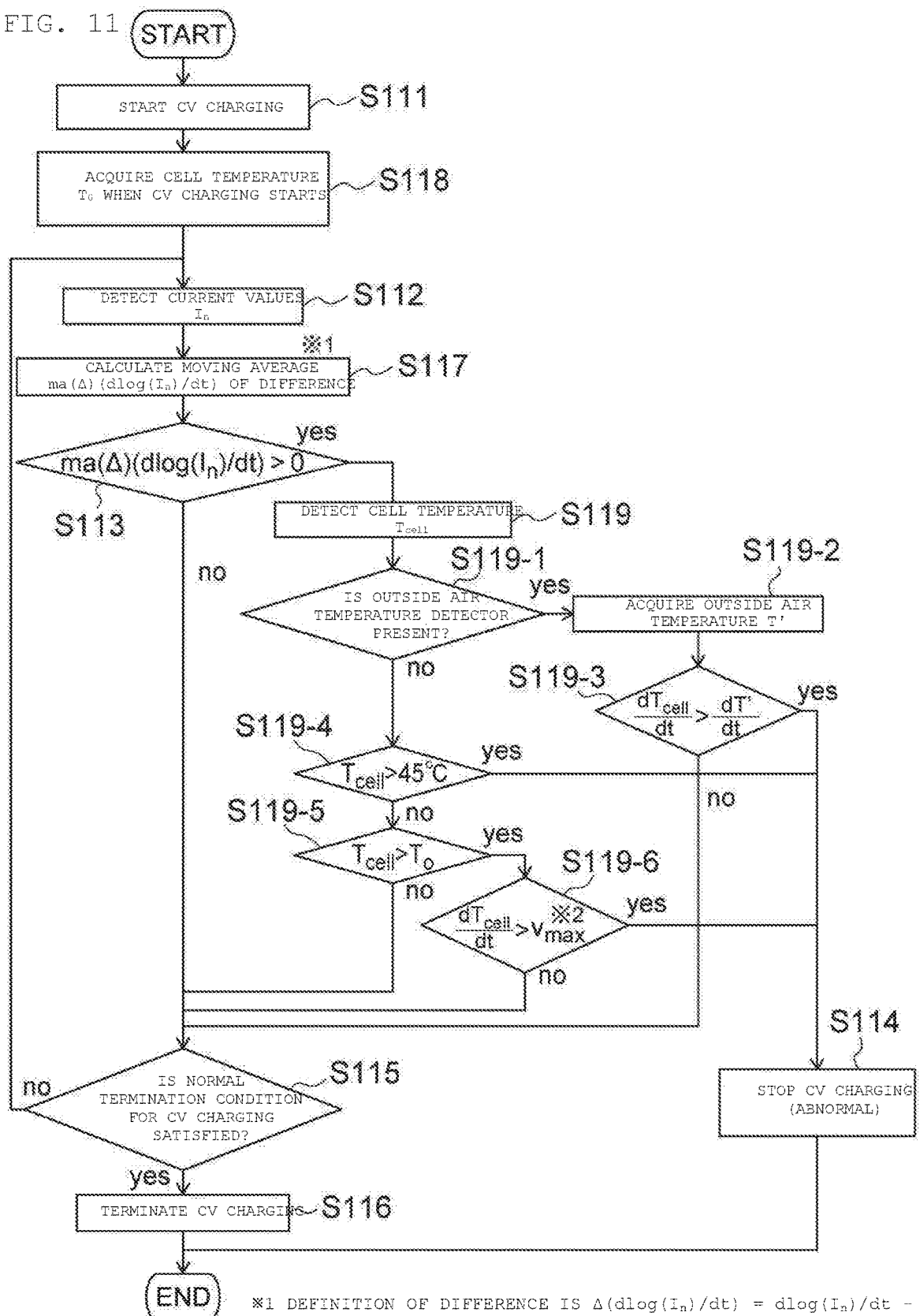
FIG. 11 is a flowchart showing an example of constant voltage (CV) charging according to an embodiment of the present disclosure.

The charging control device of the second embodiment according to the present technology will be described with reference to the flowchart shown in FIG. 11.

In step S111, constant voltage (CV) charging is started. Subsequently, in step S118, cell temperature (battery temperature) $T_0$ at the time of starting constant voltage (CV) charging is acquired. Next, in step S112, the current values $I_n$ (n=1, 2, . . . ) are detected. Subsequently, in step S117, the moving average $ma(\Delta)(d \log(I_n)/dt)$ of the difference is calculated.

In step S113, if $ma(\Delta)(d \log(I_n)/dt)>0$ is satisfied, the process proceeds to step S119. In step S119, the cell temperature (battery temperature) $T_{cell}$ is detected, and the process proceeds to step S119-1.

In step S119-1, when the outside air temperature detector is present (when the charging control device of the second embodiment includes the outside air temperature detector), the process proceeds to step S119-2 and the outside air temperature T' is acquired. Subsequently, in step S119-3, it is determined whether $dT_{cell}/dt>dT'/dt$ is satisfied. When it is determined that $dT_{cell}/dt>dT'/dt$ is satisfied, the value is abnormal and the process proceeds to step S114 to stop the constant voltage (CV) charging.

When it is determined that $dT_{cell}/dt>dT'/dt$ is not satisfied, the process proceeds to step S115. In step S115, it is determined whether a normal termination condition for constant voltage (CV) charging is satisfied. When the normal termination condition for constant voltage (CV) charging is satisfied, the process proceeds to step S116, and constant voltage (CV) charging is terminated. When the normal termination condition of constant voltage (CV) charging is not satisfied, the process returns to step S112 again, and the processes after step S112 are repeated.

In step S119-1, when the outside air temperature detector is not present (when the charging control device of the second embodiment does not include the outside air temperature detector), the process proceeds to step S119-4. In step S119-4, it is determined whether $T_{cell}>45°$ C. is satisfied. When it is determined that $T_{cell}>45°$ C. is satisfied, the value is abnormal and the process proceeds to step S114 to stop constant voltage (CV) charging.

When it is determined that $T_{cell}>45°$ C. is not satisfied, the process proceeds to step S119-5. In step S119-5, it is determined whether $T_{cell}>T_0$ is satisfied.

When it is determined that $T_{cell}>T_0$ is satisfied, the process proceeds to step S119-6.

In step S119-6, it is determined whether $dT_{cell}/dt>v_{max}$ is satisfied. $v_{max}$ is the maximum value of the rate of temperature increase during constant current (CC) charging measured at room temperature under adiabatic conditions. When it is determined that $dT_{cell}/dt>v_{max}$ is satisfied, the value is abnormal and the process proceeds to step S114 to stop the constant voltage (CV) charging.

When it is determined that $dT_{cell}/dt>v_{max}$ is not satisfied, the process proceeds to step S115. In step S115, it is determined whether a normal termination condition for constant voltage (CV) charging is satisfied. When the normal termination condition for constant voltage (CV) charging is satisfied, the process proceeds to step S116, and constant voltage (CV) charging is terminated. When the normal termination condition of constant voltage (CV) charging is not satisfied, the process returns to step S112 again, and the processes after step S112 are repeated.

When it is determined that $T_{cell}>T_0$ is not satisfied, the process proceeds to step S115. In step S115, it is determined whether a normal termination condition for constant voltage (CV) charging is satisfied. When the normal termination condition for constant voltage (CV) charging is satisfied, the process proceeds to step S116, and constant voltage (CV) charging is terminated. When the normal termination condition of constant voltage (CV) charging is not satisfied, the process returns to step S112 again, and the processes after step S112 are repeated.

If $ma(\Delta)(d \log(I_n)dt)>0$ is not satisfied in step S113, the process proceeds to step S115. In step S115, it is determined whether a normal termination condition for constant voltage (CV) charging is satisfied. When the normal termination condition for constant voltage (CV) charging is satisfied, the process proceeds to step S116, and constant voltage (CV)

charging is terminated. When the normal termination condition of constant voltage (CV) charging is not satisfied, the process returns to step S112 again, and the processes after step S112 are repeated.

In step S117, the difference is defined as $\Delta(d \log(I_n)/dt) = d \log(I_n)/dt - d \log(I_{(n-1)})/dt$.

Figure 12:
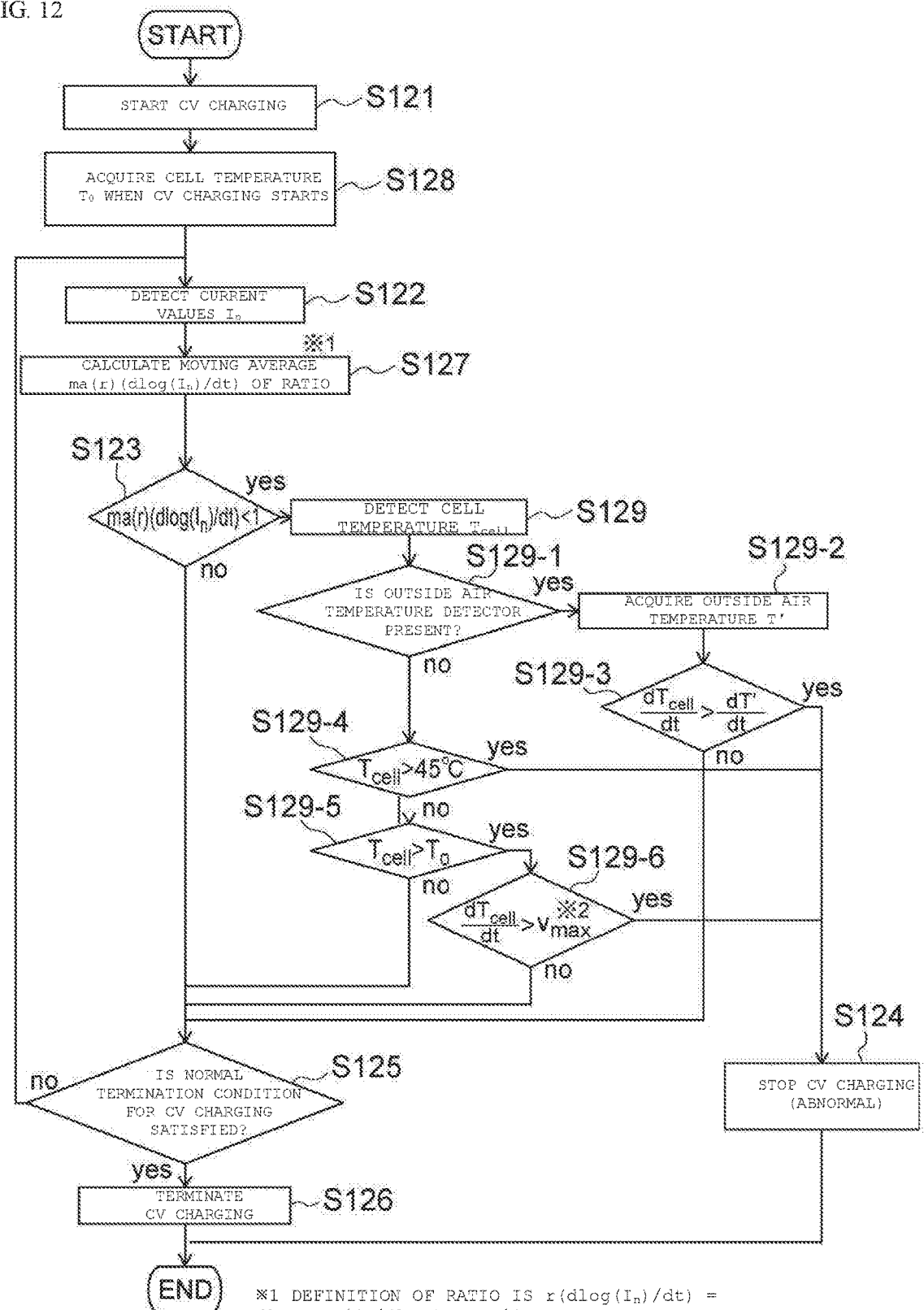
FIG. 12 is a flowchart showing an example of constant voltage (CV) charging according to an embodiment of the present disclosure.

The charging control device of the second embodiment according to the present technology will be described with reference to the flowchart shown in FIG. 12.

In step S121, constant voltage (CV) charging is started. Subsequently, in step S128, cell temperature (battery temperature) $T_0$ at the time of starting constant voltage (CV) charging is acquired. Next, in step S122, the current values $I_n$ (n=1, 2, ...) are detected. Subsequently, in step S127, the moving average $ma(r)(d \log(I_n)/dt)$ of the ratio is calculated.

In step S123, if $ma(r)(d \log(I_n)/dt) < 1$, the process proceeds to step S129. In step S129, the cell temperature (battery temperature) $T_{cell}$ is detected, and the process proceeds to step S129-1.

In step S129-1, when the outside air temperature detector is present (when the charging control device of the second embodiment includes the outside air temperature detector), the process proceeds to step S129-2 and the outside air temperature T' is acquired. Subsequently, in step S129-3, it is determined whether $dT_{cell}/dt > dT'/dt$ is satisfied. When it is determined that $dT_{cell}/dt > dT'/dt$ is satisfied, the value is abnormal, and the process proceeds to step S124 to stop constant voltage (CV) charging.

When it is determined that $dT_{cell}/dt > dT'/dt$ is not satisfied, the process proceeds to step S125. In step S125, it is determined whether a normal termination condition for constant voltage (CV) charging is satisfied. When the normal termination condition for constant voltage (CV) charging is satisfied, the process proceeds to step S126, and constant voltage (CV) charging is terminated. When the normal termination condition of constant voltage (CV) charging is not satisfied, the process returns to step S122 again, and the processes after step S122 are repeated.

In step S129-1, when the outside air temperature detector is not present (when the charging control device of the second embodiment does not include the outside air temperature detector), the process proceeds to step S129-4. In step S129-4, it is determined whether $T_{cell} > 45°$ C. is satisfied. When it is determined that $T_{cell} > 45°$ C. is satisfied, the value is abnormal, and the process proceeds to step S124 to stop constant voltage (CV) charging.

When it is determined that $T_{cell} > 45°$ C. is not satisfied, the process moves to step S129-5. In step S129-5, it is determined whether $T_{cell} > T_0$ is satisfied.

When it is determined that $T_{cell} > T_0$ is satisfied, the process proceeds to step S129-6.

In step S129-6, it is determined whether $dT_{cell}/dt > v_{max}$ is satisfied. $v_{max}$ is the maximum value of the rate of temperature increase during constant current (CC) charging measured at room temperature under adiabatic conditions. When it is determined that $dT_{cell}/dt > v_{max}$ is satisfied, the value is abnormal, and the process proceeds to step S124 to stop constant voltage (CV) charging.

When it is determined that $dT_{cell}/dt > v_{max}$ is not satisfied, the process proceeds to step S125. In step S125, it is determined whether a normal termination condition for constant voltage (CV) charging is satisfied. When the normal termination condition for constant voltage (CV) charging is satisfied, the process proceeds to step S126, and constant voltage (CV) charging is terminated. When the normal termination condition of constant voltage (CV) charging is not satisfied, the process returns to step S122 again, and the processes after step S122 are repeated.

When it is determined that $T_{cell} > T_0$ is not satisfied, the process proceeds to step S125. In step S125, it is determined whether a normal termination condition for constant voltage (CV) charging is satisfied. When the normal termination condition for constant voltage (CV) charging is satisfied, the process proceeds to step S126, and constant voltage (CV) charging is terminated. When the normal termination condition of constant voltage (CV) charging is not satisfied, the process returns to step S122 again, and the processes after step S122 are repeated.

If $ma(r)(d \log(I_n)/dt) < 1$ is not satisfied in step S123, the process proceeds to step S125. In step S125, it is determined whether a normal termination condition for constant voltage (CV) charging is satisfied. When the normal termination condition for constant voltage (CV) charging is satisfied, the process proceeds to step S126, and constant voltage (CV) charging is terminated. When the normal termination condition of constant voltage (CV) charging is not satisfied, the process returns to step S122 again, and the processes after step S122 are repeated.

In step S127, the ratio is defined as $r(d \log(I_n)/dt) = d \log(I_n)/dt / d \log(I_{(n-1)})/dt$.

Figure 17:
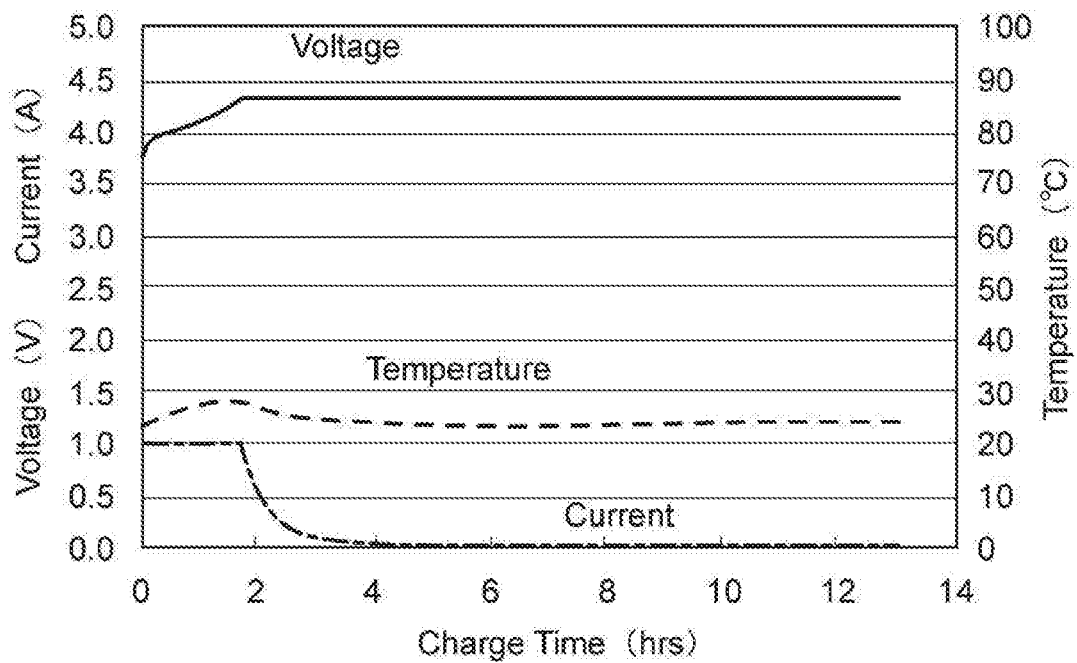
FIG. 17 is a diagram showing a relationship between a charge time, a voltage, a temperature, and a current according to an embodiment of the present disclosure.
Figure 18:
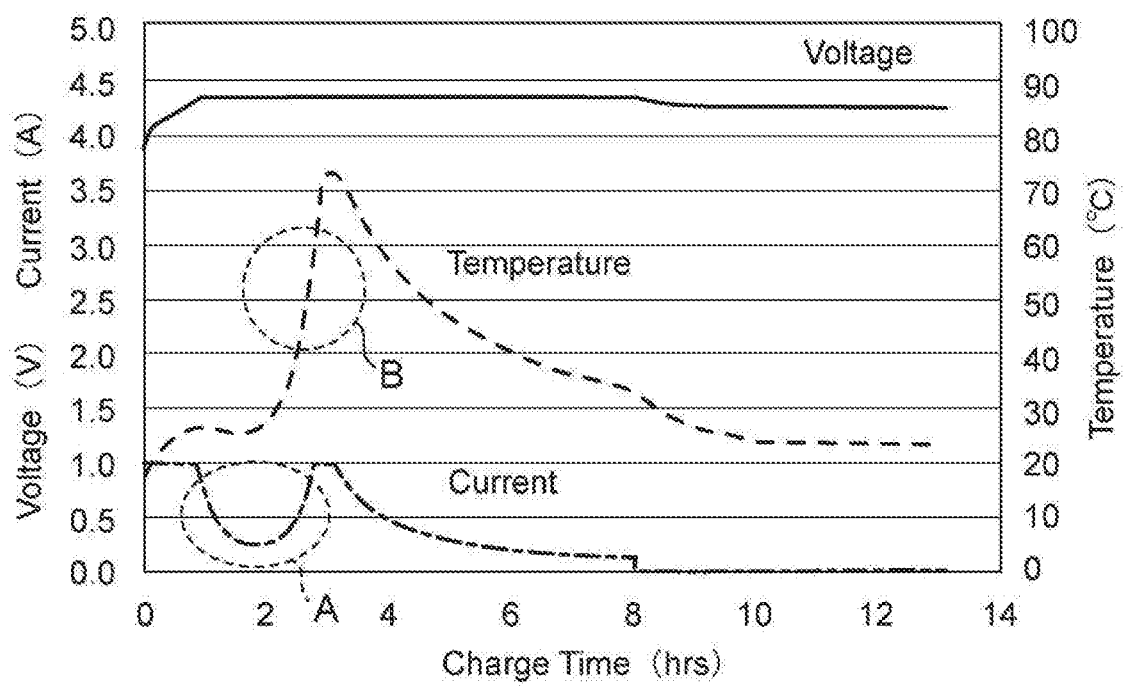
FIG. 18 is a diagram showing a relationship between a charge time, a voltage, a temperature, and a current according to an embodiment of the present disclosure.

A battery that does not need to stop constant voltage charging (normal) and a battery that needs to stop constant voltage charging (abnormal) will be described with reference to FIGS. 17 and 18. FIGS. 17 and 18 are diagrams showing the relationship between a charge time, a voltage, a temperature, and a current.

The battery shown in FIG. 17 is a battery in which no abnormality has occurred, that is, a battery that does not need to stop constant voltage charging (normal), and during constant voltage charging (voltage has a substantially constant value), the current decreases and the temperature does not increase.

On the other hand, the battery shown in FIG. 18 is a battery in which an abnormality that requires that constant voltage charging be stopped occurs. During constant voltage charging (voltage shows a substantially constant value), the current has turned from decreasing to increasing in a circular portion A in FIG. 18, and further, the temperature rises at a circular portion B in FIG. 18.

The charging unit of the third embodiment (example 1 of charging unit) according to the present technology includes the charging control device and the battery according to the first embodiment of the present technology. The charging unit of the third embodiment according to the present technology is, for example, a battery pack or a charging device. Although a battery is not specifically limited, for example, it is preferable that it is a secondary battery of a lithium ion battery. The number of batteries provided in the charging unit of the third embodiment according to the present technology is one or more, and in the case of more than one, the batteries may be connected in series and/or in parallel.

Figure 13:
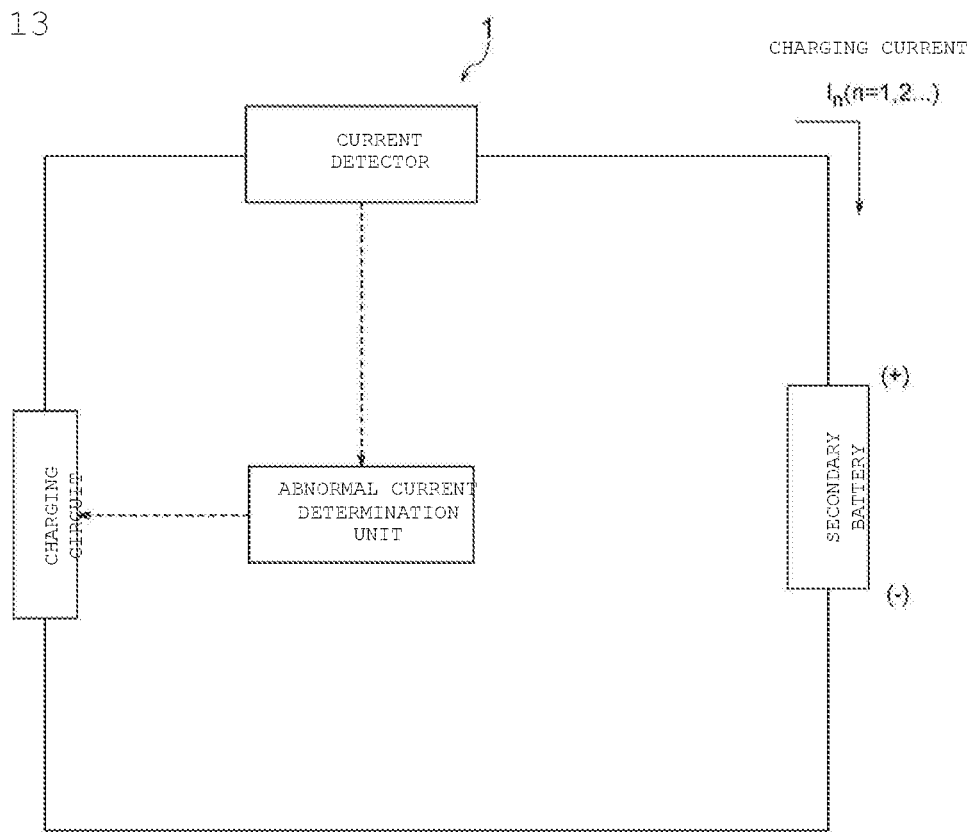
FIG. 13 is a block diagram illustrating a configuration example of a charging unit according to an embodiment of the present technology.

Hereinafter, the charging unit according to the third embodiment of the present technology will be further described with reference to FIG. 13. FIG. 13 is a block diagram illustrating a configuration example of the charging unit of the third embodiment according to the present technology.

As shown in FIG. 13, a charging unit 1 includes a current detector, an abnormal current determination unit, a charging circuit, and a secondary battery. Although not shown, the charging circuit includes a charging stop unit. The current detector detects the charging current $I_n$ (n=1, 2, ...), and the abnormal current determination unit determines whether the detected charging current $I_n$ (n=1, 2, . . . ) is attenuated and/or increased in the constant voltage charging region, and further determines whether the value of the charging current per unit time is increasing. Then, according to the determination result, the value is abnormal when the value of the charging current per unit time is increased, and the charging stop unit stops the constant voltage charging. In addition, the value is normal when the value of the charging current per unit time does not increase according to the determination result, and constant voltage charging is not stopped.

The charging unit of the fourth embodiment (example 2 of charging unit) according to the present technology includes the charging control device and the battery according to the second embodiment of the present technology. The charging unit of the fourth embodiment according to the present technology is, for example, a battery pack, a charging device, or the like. Although a battery is not specifically limited, for example, it is preferable that it is a secondary battery of a lithium ion battery. The number of batteries provided in the charging unit of the fourth embodiment according to the present technology is one or more, and in the case of more than one, the batteries may be connected in series and/or in parallel.

Figure 14:
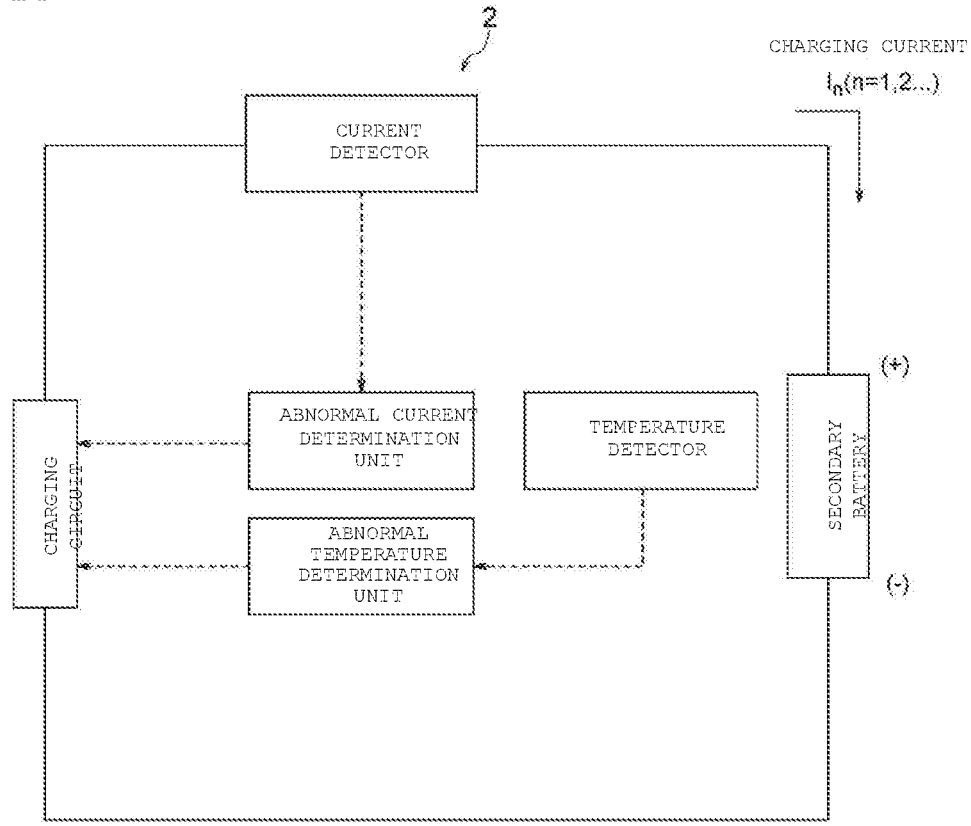
FIG. 14 is a block diagram illustrating a configuration example of a charging unit according to an embodiment of the present technology.

Hereinafter, the charging unit of the fourth embodiment according to the present technology will be further described with reference to FIG. 14. FIG. 14 is a block diagram illustrating a configuration example of the charging unit of the fourth embodiment according to the present technology.

As shown in FIG. 14, a charging unit 2 mainly includes a current detector, an abnormal current determination unit, a temperature detector, an abnormal temperature determination unit, a charging circuit, and a secondary battery. Although not shown, the charging circuit includes a charging stop unit. As described above, the temperature detector may be configured by only the battery temperature detector, or may be configured by the battery temperature detector and the outside air temperature detector. In addition to the battery temperature detector, the temperature detector may further include another temperature detector in order to detect the temperature of another location and the like in the charging control device or the charging unit. Furthermore, in addition to the battery temperature detector and the outside air temperature detector, the temperature detector may further include another temperature detector in order to detect the temperature of another location and the like in the charging control device or the charging unit. Another temperature detector may be provided near the battery cell, or may be provided at the location away from the vicinity of the battery cell.

The current detector detects the charging current $I_n$ (n=1, 2, . . . ). Then, the abnormal current determination unit determines whether the detected charging current $I_n$ (n=1, 2, . . . ) is attenuated and/or increased in the constant voltage charging region, and further determines whether the value of the charging current per unit time is increasing. As a first determination example, the abnormal temperature determination unit determines whether the battery temperature in the constant voltage region is 45° C. or higher. Then, when according to the determination result of the abnormal current determination unit, the value of the charging current per unit time is increased, and when according to the first determination example of the abnormal temperature determination unit, the battery temperature in the constant voltage region is 45° C. or higher, the value is abnormal, and the charging stop unit stops the constant voltage charging. When according to the determination result of the abnormal current determination unit, the value of the charging current per unit time does not increase, and/or when according to the first determination example of the abnormal temperature determination unit, the battery temperature in the constant voltage region is below 45° C., the value is normal and the constant voltage charging is not stopped.

In addition, as a second determination example, the abnormal temperature determination unit determines whether the battery temperature in the constant voltage region is higher than the battery temperature at the start of constant voltage charging, and determines whether the rate of increase in the battery temperature in the constant voltage region is greater than the maximum value of the rate of increase in the battery temperature in the constant current charging region. When according to the determination result of the abnormal current determination unit, the value of the charging current per unit time is increased, and when according to the second determination example of the abnormal temperature determination unit, the battery temperature in the constant voltage region is higher than the battery temperature at the start of constant voltage charging, and the rate of increase in the battery temperature in the constant voltage region is greater than the maximum value of the rate of increase in the battery temperature in the constant current charging region, the charging stop unit stops constant voltage charging. In addition, when according to the determination result of the abnormal current determination unit, the value of the charging current per unit time is not increased, and/or when according to the second determination example of the abnormal temperature determination unit, the battery temperature in the constant voltage region is not higher than the battery temperature at the start of constant voltage charging, and/or the rate of increase in the battery temperature in the constant voltage region is not greater than the maximum value of the rate of increase in the battery temperature in the constant current charging region, the value is normal, and the constant voltage charging is not stopped.

Furthermore, as a third determination example, the abnormal temperature determination unit determines whether the rate of increase in the battery temperature in the constant voltage region is greater than the rate of increase in the outside air temperature. When according to the determination result of the abnormal current determination unit, the value of the charging current per unit time is increased, and when according to the third determination example of the abnormal temperature determination unit, the rate of increase in the battery temperature in the constant voltage region is greater than the rate of increase in the outside air temperature, the value is abnormal, and the charging stop unit stops the constant voltage charging. When according to the determination result of the abnormal current determination unit, the value of the charging current per unit time is not increased, and when the rate of increase in the battery temperature in the constant voltage region is not greater than the rate of increase in the outside air temperature, the value is normal, and the charging stop unit does not stop the constant voltage charging.

The use of the charging unit will be described in detail below.

Use of the charging unit may be a machine, a device, an instrument, an apparatus, and a system (an assembly of a plurality of devices) that can use the charging unit as a driving power source or an electric power storage source for storing power, and is not particularly limited. The charging unit used as a power source may be a main power source (a power source used preferentially) or an auxiliary power source (a power source used in place of or switched from the main power source). When the charging unit is used as an auxiliary power source, the type of main power source is not limited to the charging unit.

Use of the charging unit are as follows, for example. Examples of use are electronic devices (including portable electronic devices) such as a notebook personal computer, a tablet computer, a mobile phone (for example, a smart phone), a personal digital assistant (PDA), an imaging device (for example, a digital still camera, a digital video camera), an audio device (for example, a portable audio player), a game device, a cordless phone, an electronic book, an electronic dictionary, a radio, a headphone, a navigation system, a memory card, a pacemaker, a hearing aid, a lighting device, a toy, a medical device, and a robot. Examples of use are portable household appliances such as an electric shaver. Examples of use are storage devices such as a backup power source and a memory card. Examples of use are electric power tools such as a power drill and a power saw. Examples of use are detachable power sources used for a notebook computer. Examples of use are medical electronic devices such as pacemakers and a hearing aid.

Examples of use are vehicles used for an electric car (including a hybrid automobile). Examples of use are power storage systems such as a home battery system for storing power in preparation for an emergency or the like. Of course, use other than the above may be made.

Especially, it is effective that the charging unit is used for a vehicle, a power storage system, an electric power tool, and an electronic device. This is because it is possible to improve the performance by using the charging unit of the present technology since excellent battery characteristics are required. The vehicle is a vehicle that operates (runs) using the charging unit as a driving power source. As described above, the vehicle may be an automobile (such as a hybrid automobile) provided with a driving source other than the charging unit. The power storage system is, for example, a residential power storage system, and uses the charging unit as an electric power storage source. In the power storage system, electric power is stored in a charging unit that is an electric power storage source, so that an electric power consuming device, for example, a household electric product can be used using the electric power. The electric power tool is a tool in which a movable unit (for example, a drill etc.) moves using the charging unit as a driving power source. The electronic device is a device that exhibits various functions by using the charging unit as a driving power source (power supply source).

Here, some application examples of the charging unit will be specifically described. The configuration of each application described below is merely an example, and can be changed as appropriate.

The vehicle of the fifth embodiment according to the present technology includes a charging unit according to the third embodiment or a charging unit according to the fourth embodiment according to the present technology, a driving force converter that converts electric power supplied from the charging unit into a driving force, a drive unit (driver) that is driven according to a drive force, and a vehicle control device. Since the vehicle of the fifth embodiment according to the present technology includes the charging unit of the third embodiment or the charging unit of the fourth embodiment according to the present technology having excellent battery characteristics and excellent reliability, performance and reliability of the vehicle are improved.

Hereinafter, the vehicle according to the fifth embodiment of the present technology will be described with reference to FIG. 19.

Figure 19:
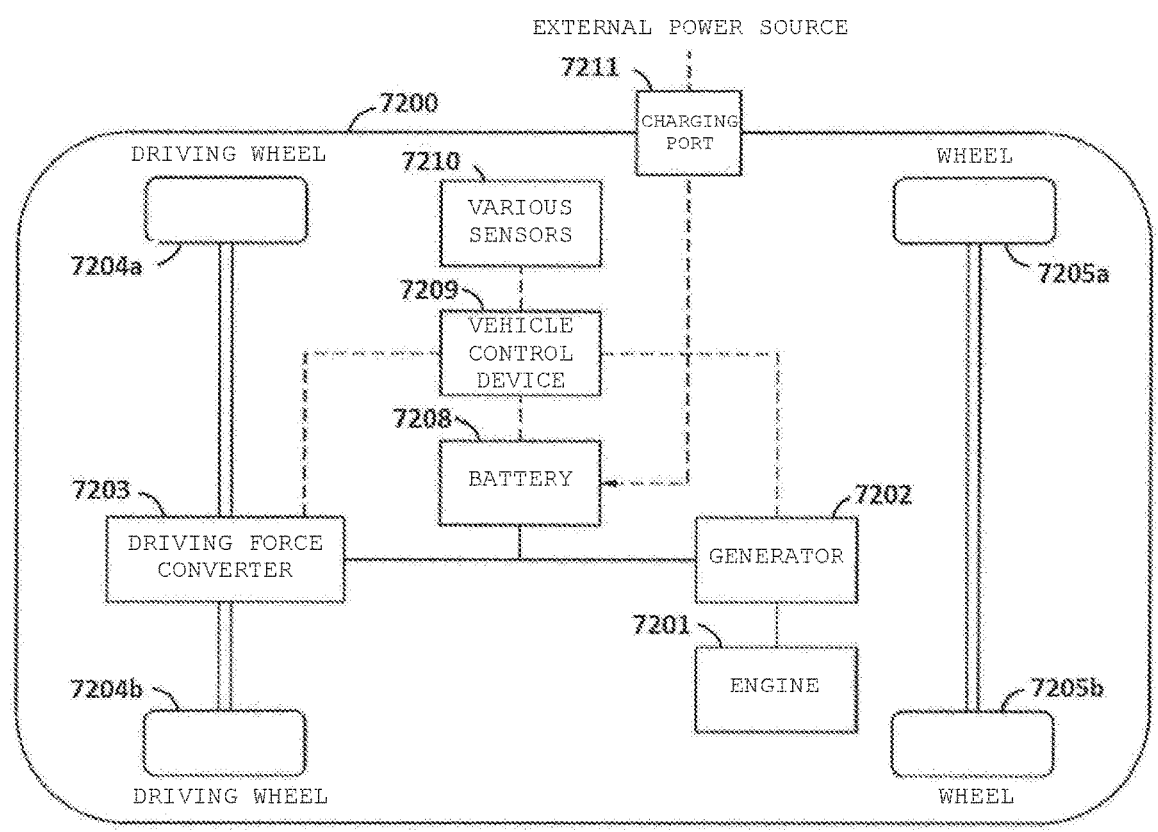
FIG. 19 is a block diagram illustrating a configuration of an application example (vehicle) of the charging unit according to an embodiment of the present technology.

FIG. 19 schematically shows an example of the configuration of a hybrid vehicle that employs a series hybrid system to which the present technology is applied. The series hybrid system is a car that travels by an electric power/driving force converter using power generated by a generator driven by an engine or power stored in a battery which stores temporarily the generated power.

A hybrid vehicle 7200 includes an engine 7201, a generator 7202, an electric power/driving force converter 7203, a driving wheel 7204a, a driving wheel 7204b, a wheel 7205a, a wheel 7205b, a battery 7208, a vehicle control device 7209, various sensors 7210, a charging port 7211. A power storage device (not shown) is applied to the battery 7208.

The hybrid vehicle 7200 travels using the electric power/driving force converter 7203 as a power source. An example of the electric power/driving force converter 7203 is a motor. The electric power/driving force converter 7203 is operated by the power of the battery 7208, and the rotational force of the electric power/driving force converter 7203 is transmitted to the driving wheels 7204a and 7204b. Note that by using direct current-alternating current (DC-AC) or reverse conversion (AC-DC conversion) where necessary, the electric power/driving force converter 7203 can be used as either an AC motor or a DC motor. The various sensors 7210 control the engine speed with the vehicle control device 7209 interposed therebetween and control the opening degree (throttle opening degree) of a throttle valve (not shown). The various sensors 7210 include a speed sensor, an acceleration sensor, an engine speed sensor, and the like.

The rotational force of the engine 7201 can be transmitted to the generator 7202, and the power generated by the generator 7202 by rotational force of the engine can be stored in the battery 7208.

When the hybrid vehicle is decelerated by a braking mechanism (not shown), a resistance at the time of deceleration is applied as a rotational force to the electric power/driving force converter 7203, and the regenerative electric power generated by the electric power/driving force converter 7203 by the rotational force is stored in the battery 7208.

The battery 7208 can be connected to a power source external to the hybrid vehicle to receive power from the external power source using the charging port 211 as an input port, and can store the received power.

Although not shown, an information processing apparatus that performs information processing related to vehicle control based on information related to the charging unit may be provided. The information processing apparatus includes, for example, an information processing apparatus that performs the remaining battery level display based on information on a remaining battery level.

In the above, the series hybrid vehicle traveling by the motor using the power generated by the generator driven by the engine or the power stored in the battery which stores temporarily the generated power has been described as an example. However, the present disclosure is also effective for a parallel hybrid vehicle in which the engine and motor outputs are both driving sources, and three ways of travel by only the engine, travel by only the motor, and travel by the engine and the motor are appropriately switched for use. Furthermore, the present technology can be effectively applied to a so-called electric vehicle that travels by only the driving motor without using an engine.

The power storage system of the sixth embodiment according to the present technology includes a power storage device including the charging unit of the third embodiment according to the present technology or the charging unit of the fourth embodiment according to the present technology, a power consuming device to which power is supplied from the charging unit, a control device (controller) that controls power supply from the charging unit to the power consuming device, and a power generation device that charges the charging unit. Since the power storage system of the sixth embodiment according to the present technology includes the charging unit of the first embodiment according to the present technology or the charging unit of the second embodiment according to the present technology having excellent battery characteristics and excellent reliability, performance and reliability of the power storage system are improved.

Figure 20:
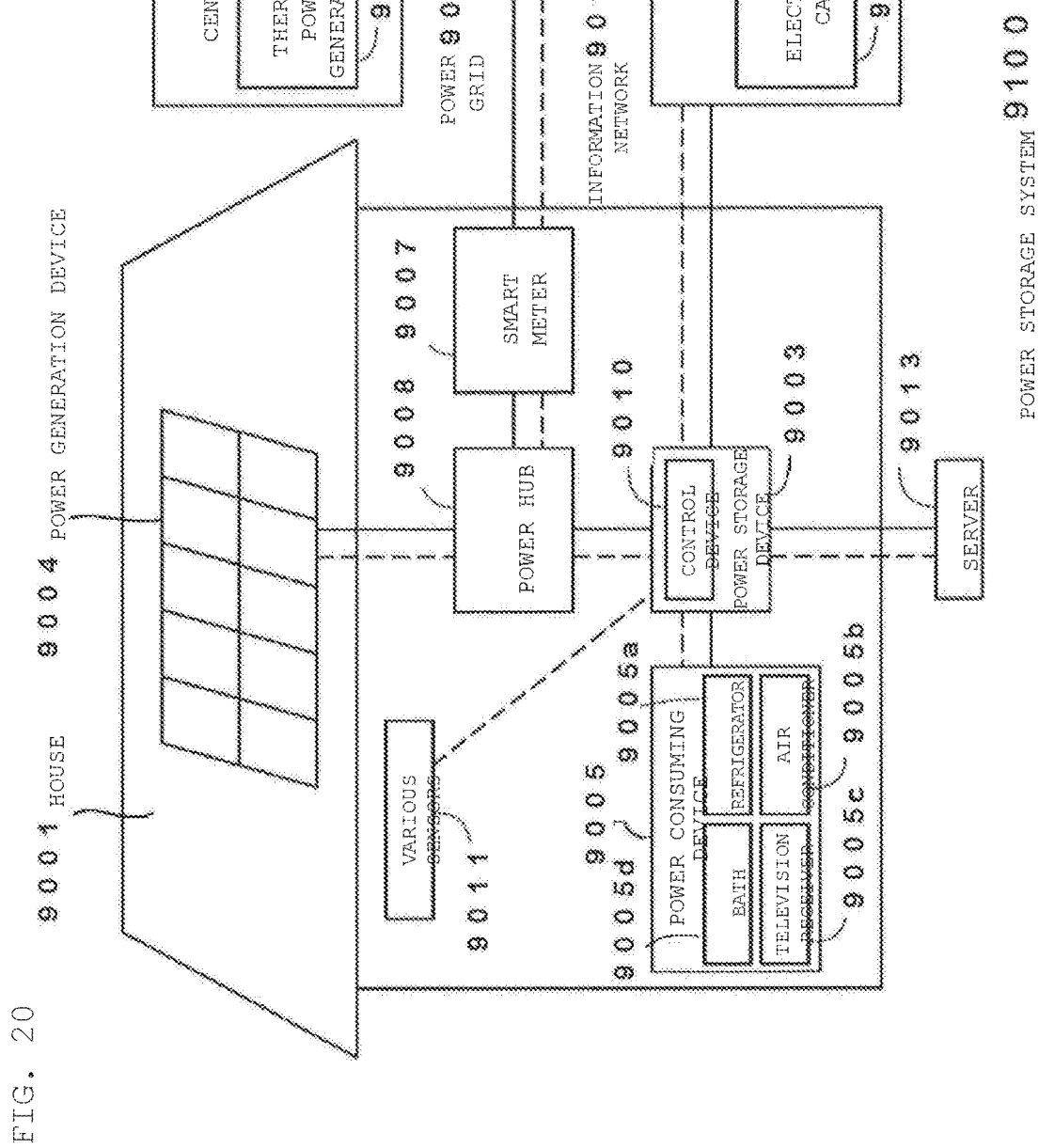
FIG. 20 is a block diagram showing a configuration of an application example (power storage system) of the charging unit according to an embodiment of the present technology.

Hereinafter, a residential power storage system that is an example of the power storage system of the sixth embodiment according to the present technology will be described with reference to FIG. 20.

For example, in a power storage system 9100 for a house 9001, electric power is supplied to a power storage device 9003 from a centralized electric power system 9002 such as a thermal power generation 9002a, a nuclear power generation 9002b, a hydroelectric power generation 9002c with a power grid 9009, an information network 9012, a smart meter 9007, a power hub 9008, etc. interposed therebetween. At the same time, power is supplied to the power storage device 9003 from an independent power source such as a home power generation device 9004. Power supplied to power storage device 9003 is stored. Power storage device 9003 is used to supply power used in the house 9001. The same power storage system can be used not only for the house 9001 but also for the building.

The house 9001 is provided with the power generation device 9004, a power consuming device 9005, the power storage device 9003, a control device 9010 that controls each device, the smart meter 9007, and sensors 9011 for acquiring various information. The respective devices are connected by the power grid 9009 and the information network 9012. A solar cell, a fuel cell, or the like is used as the power generation device 9004, and the generated electric power is supplied to the power consuming device 9005 and/or the power storage device 9003. The power consuming device 9005 is, for example, a refrigerator 9005a, an air conditioner 9005b, a television receiver 9005c, and a bath 9005d. Furthermore, the power consuming device 9005 includes an electric vehicle 9006. The electric vehicle 9006 is an electric car 9006a, a hybrid car 9006b, and an electric motorcycle 9006c.

The above-described charging unit according to the present technology is applied to the power storage device 9003. The power storage device 9003 is composed of a charging unit or a capacitor. For example, it is composed of a lithium ion battery. The lithium ion battery may be a stationary type or may be used in the electric vehicle 9006.

The smart meter 9007 has a function of measuring the usage amount of commercial power and transmitting the measured usage amount to the power company. The power grid 9009 may combine any one or more of direct current feeding, alternating current feeding, and non-contact feeding.

The various sensors 9011 are, for example, a human sensor, an illuminance sensor, an object detection sensor, a power consumption sensor, a vibration sensor, a contact sensor, a temperature sensor, an infrared sensor, and the like.

The information acquired by the various sensors 9011 is transmitted to the control device 9010. With the information from the sensors 9011, the state of the weather, the state of a person, etc. can be grasped, and the power consuming device 9005 can be automatically controlled to minimize energy consumption. Furthermore, the control device 9010 can transmit information on the house 9001 to an external power company or the like with the Internet interposed therebetween.

The power hub 9008 performs processing such as branching of power lines and DC/AC conversion. Examples of the communication method of the information network 9012 connected to the control device 9010 include a method using a communication interface such as a universal asynchronous receiver-transmitter (UART), and a method of using a sensor network according to a wireless communication standard such as Bluetooth (registered trademark), ZigBee, and Wi-Fi. The Bluetooth (registered trademark) system is applied to multimedia communication, and can perform one-to-many connection communication. ZigBee uses a physical layer of Institute of Electrical and Electronics Engineers (IEEE) 802.15.4. IEEE 802.15.4 is the name of a short-range wireless network standard called a personal area network (PAN) or a wireless (W) PAN.

The control device 9010 is connected to an external server 9013. The server 9013 may be managed by any one of the house 9001, a power company, and a service provider. The information transmitted and received by the server 9013 is, for example, power consumption information, life pattern information, power rates, weather information, natural disaster information, and information on power transactions. These pieces of information may be transmitted and received from a home power consuming device (for example, a television receiver), or may be transmitted and received from a device outside the home (for example, a cellular phone or the like). These pieces of information may be displayed on a device having a display function, for example, a television receiver, a cellular phone, a personal digital assistant (PDA) or the like.

The control device 9010 (controller) that controls each unit is composed of a CPU or a processor, a random access memory (RAM), a read only memory (ROM), and the like, and is stored in the power storage device 9003 in this example. The control device 9010 is connected to the power storage device 9003, the home power generation device 9004, the power consuming device 9005, the various sensors 9011, the server 9013 via the information network 9012, and has a function to adjust, for example, the usage amount of commercial power and the power generation amount. In addition, it may have the function of performing a deal of power exchange in an electric power market.

As described above, not only the power from the centralized electric power system 9002 such as the thermal power generation 9002a, the nuclear power generation 9002b, the hydroelectric power generation 9002c, but also the power generated by the home power generation device 9004 (solar power, wind power) can be stored in the power storage device 9003. Therefore, even when the power generated by the home power generation device 9004 fluctuates, control can be performed such that the amount of power to be transmitted to the outside can be made constant, or the necessary amount of discharge can be performed. For example, the control may be performed such that the power obtained by the solar power generation is stored in the power storage device 9003, and late-night power with low charge is stored in the power storage device 9003 at night, and the power stored by power storage device 9003 is discharged in a time zone where the charge in the daytime is high.

Although the example in which control device 9010 is stored in power storage device 9003 has been described, it may be stored in smart meter 9007 or may be configured alone. Furthermore, the power storage system 9100 may be used for a plurality of households in an apartment house, or may be used for a plurality of detached houses.

The electric power tool of the seventh embodiment according to the present technology includes the charging unit of the third embodiment according to the present technology or the charging unit of the fourth embodiment according to the present technology, and a movable unit to which power is supplied from the charging unit. Since the electric power tool of the seventh embodiment according to the present technology includes the charging unit of the third embodiment or the charging unit of the fourth embodiment according to the present technology having excellent battery characteristics and excellent reliability, performance and reliability of the electric power tool are improved.

Hereinafter, the electric power tool of the seventh embodiment according to the present technology will be described with reference to FIG. 21.

Figure 21:
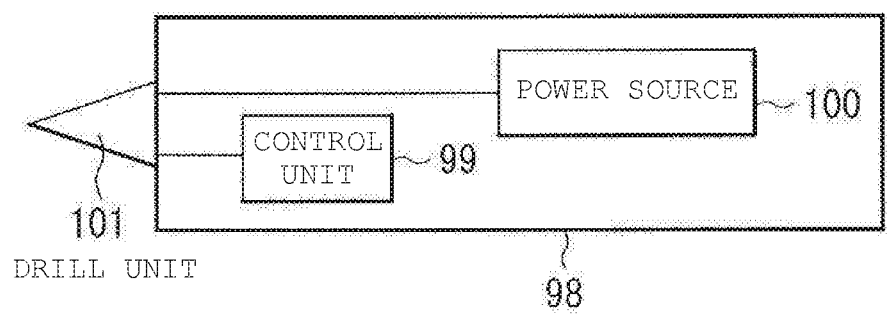
FIG. 21 is a block diagram illustrating a configuration of an application example (electric power tool) of the charging unit according to an embodiment of the present technology.

FIG. 21 shows a block configuration of the electric power tool. The electric power tool is, for example, an electric drill, and includes a control unit 99 (controller) and a power source 100 inside a tool body 98 formed of a plastic material or the like. For example, a drill unit 101, which is a movable unit, is attached to the tool body 98 so as to be operable (rotatable).

The control unit 99 controls the operation of the entire electric power tool (including the use state of the power source 100), and includes, for example, a CPU or processor. The power source 100 includes one or more charging units (not shown). The control unit 99 supplies power from the power source 100 to the drill unit 101 in response to the operation of an operation switch (not shown).

The electronic device of the eighth embodiment according to the present technology includes the charging unit of the third embodiment according to the present technology or the charging unit of the fourth embodiment according to the present technology, and receives supply of power from the charging unit. As described above, the electronic device of the eighth embodiment according to the present technology is a device that exhibits various functions using the charging unit as a driving power source (power supply source). Since the electronic device of the eighth embodiment according to the present technology includes the charging unit of the third embodiment according to the present technology or the charging unit of the fourth embodiment according to the present technology having excellent battery characteristics and excellent reliability, performance and reliability of the electronic device are improved.

Figure 22:
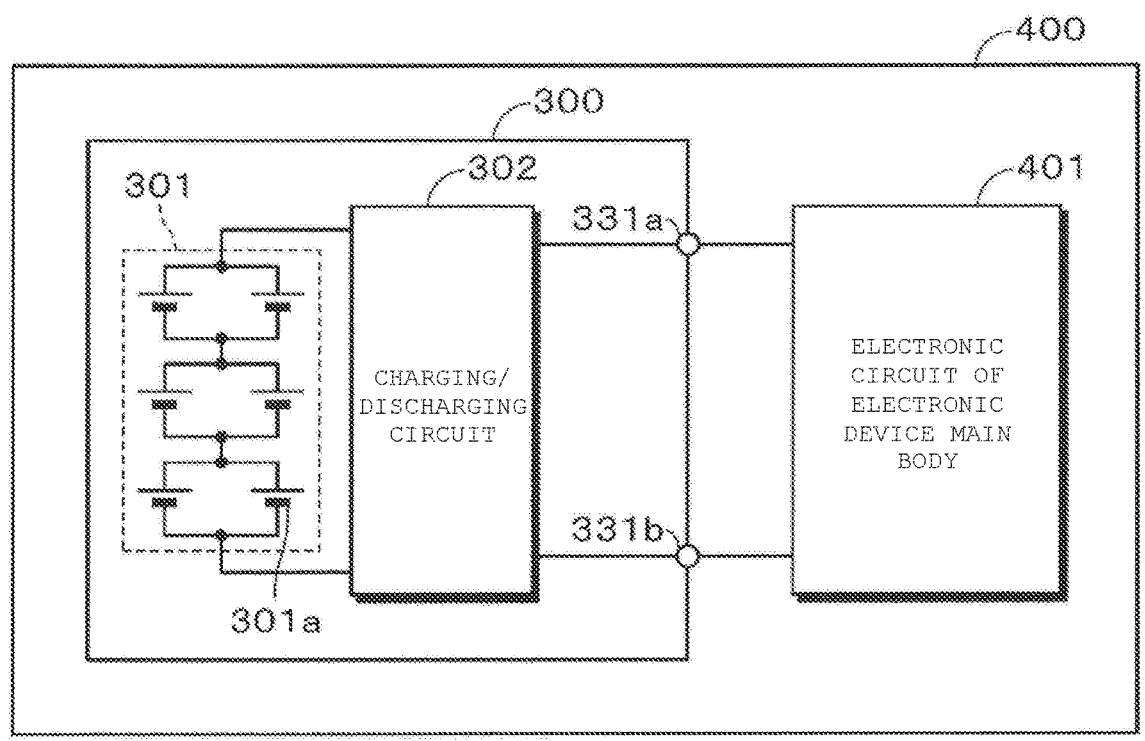
FIG. 22 is a block diagram illustrating a configuration of an application example (electronic device) of the charging unit according to an embodiment of the present technology.

Hereinafter, the electronic device of the eighth embodiment according to the present technology will be described with reference to FIG. 22.

An example of the configuration of an electronic device 400 according to the eighth embodiment of the present technology will be described. The electronic device 400 includes an electronic circuit 401 of the electronic device main body and a charging unit 300. The charging unit 300 is electrically connected to the electronic circuit 401 with a positive electrode terminal 331a and a negative electrode terminal 331b interposed therebetween. The electronic device 400 has a configuration in which the charging unit 300 can be detached by a user, for example. Note that the configuration of the electronic device 400 is not limited to this, and has a configuration in which the charging unit 300 is built in the electronic device 400 so that the user may not remove the charging unit 300 from the electronic device 400.

When the charging unit 300 is charged, the positive electrode terminal 331a and the negative electrode terminal 331b of the charging unit 300 are connected to the positive electrode terminal and the negative electrode terminal of a charger (not shown), respectively. On the other hand, when the charging unit 300 is discharged (when the electronic device 400 is used), the positive electrode terminal 331a and the negative electrode terminal 331b of the charging unit 300 are connected to the positive electrode terminal and the negative electrode terminal of the electronic circuit 401, respectively.

Examples of the electronic device 400 include a notebook personal computer, a tablet computer, a mobile phone (for example, a smart phone), a personal digital assistant (PDA), an imaging device (for example, a digital still camera, a digital video camera), an audio device (for example, a portable audio player), a game device, a cordless phone, an electronic book, an electronic dictionary, a radio, a headphone, a navigation system, a memory card, a pacemaker, a hearing aid, a lighting device, a toy, a medical device, and a robot, but are not limited to the above examples. As a specific example, with reference to a head-mounted display and a band-type electronic device, the head-mounted display includes an image display device, a mounting device for mounting the image display device on the viewer's head, and a mounting member for mounting the image display device to the mounting device, and is an electronic device using the secondary battery of the first embodiment according to the present technology or the secondary battery of the second embodiment according to the present technology as a driving power source. The band-type electronic device includes a plurality of segments connected in a band shape, a plurality of electronic components arranged in the plurality of segments, and a flexible circuit board connecting the plurality of electronic components in the plurality of segments and disposed in at least one segment in a serpentine shape, and is an electronic device in which for example, the secondary battery of the first embodiment according to the present technology or the secondary battery of the second embodiment according to the present technology as the above electronic component is arranged in the segment.

The electronic circuit 401 includes, for example, a CPU, a peripheral logic unit, an interface unit, a storage unit, and the like, and controls the entire electronic device 400.

The charging unit 300 includes at least an assembled battery (secondary battery) 301 and a charging/discharging circuit 302 including at least a charging control device (not shown). The assembled battery 301 is configured by connecting a plurality of secondary batteries 301a in series and/or in parallel. The plurality of secondary batteries 301a is connected to each other, for example, in n parallel and m series arrays (n and m are positive integers). FIG. 22 shows an example in which six secondary batteries 301a are connected to each other in two parallel and three series (2P3S) arrays.

At the time of charging, the charging/discharging circuit 302 controls charging of the assembled battery 301 by the charging control device. On the other hand, at the time of discharge (that is, when the electronic device 400 is used), the charging/discharging circuit 302 controls discharge to the electronic device 400.

Hereinafter, the present technology will be described in more detail with reference to application examples 1 to 5.

The charging unit of the third embodiment according to the present technology or the charging unit of the fourth embodiment according to the present technology can be applied to a print circuit board as the application example 1. Hereinafter, the print circuit board will be described in detail with reference to FIG. 23.

Figure 23:
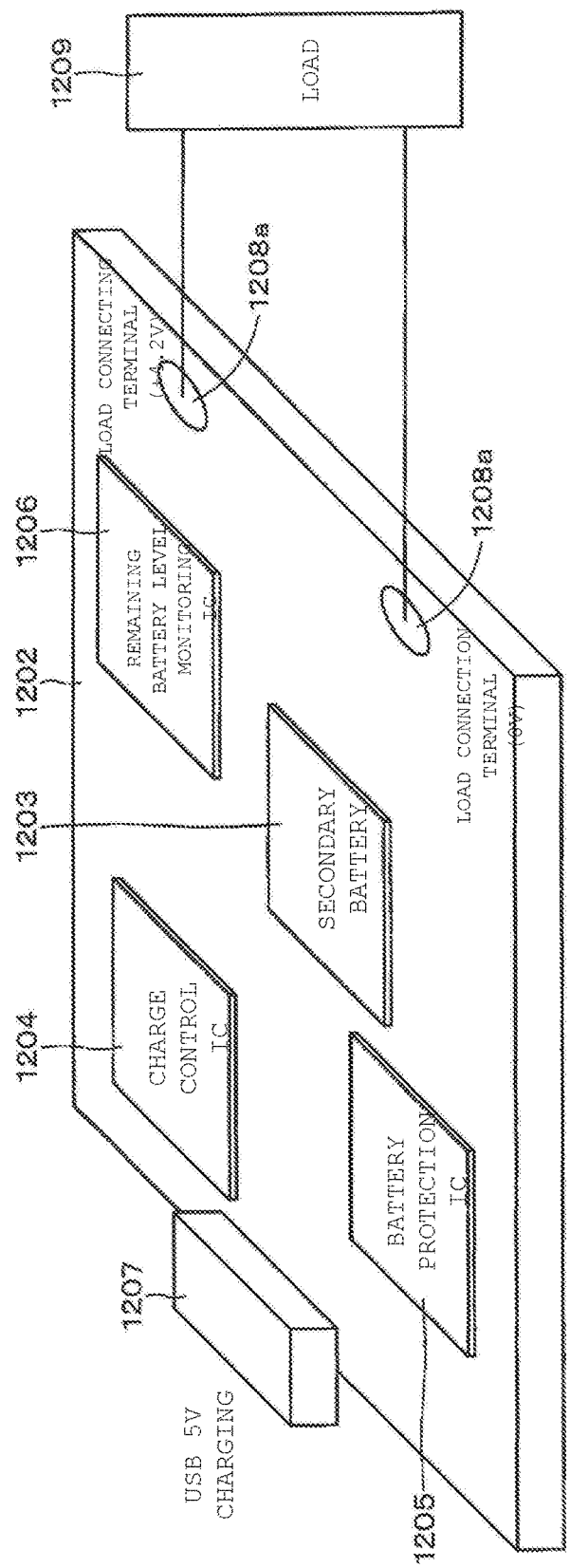
FIG. 23 is a diagram illustrating a configuration of an application example 1 (print circuit board) of the charging unit according to an embodiment of the present technology.

As shown in FIG. 23, the secondary battery provided in the charging unit of the third embodiment according to the present technology or the charging unit of the fourth embodiment according to the present technology can be mounted on a print circuit board 1202 (hereinafter referred to as PCB) together with a charging circuit or the like. For example, a secondary battery 1203 and an electronic circuit such as a charging circuit can be mounted on the PCB 1202 by a reflow process. A module in which the secondary battery 1203 and the electronic circuits such as the charging circuit are mounted on the PCB 1202 is referred to as a battery module 1201. The battery module 1201 is configured as a card type as needed, and can be configured as a portable card type mobile battery.

A charge control integrated circuit (IC) 1204, a battery protection IC 1205, and a remaining battery level monitoring IC 1206 are also formed on the PCB 1202. The battery protection IC 1205 controls the charge/discharge operation so as to suppress the problem that the charge voltage becomes excessive during charge/discharge, the overcurrent flows due to the load short circuit, or the overdischarge occurs.

A Universal Serial Bus (USB) interface 1207 is attached to the PCB 1202. The secondary battery 1203 is charged by the power supplied through the USB interface 1207. In this case, the charge control IC 1204 controls the charge operation. Further, predetermined power (for example, a voltage of 4.2 V) is supplied to a load 1209 from load connection terminals 1208a and 1208b attached to the PCB 1202. The remaining battery level of the secondary battery 1203 is monitored by the remaining battery level monitoring IC 1206 so that a display (not shown) indicating the remaining battery level can be seen from the outside. The USB interface 1207 may be used for load connection.

The specific example of the load 1209 described above is as follows.

A. Wearable device (a sports watch, a watch, a hearing aid, etc.)

B. IoT terminal (such as a sensor network terminal)

C. Amusement equipment (a portable game terminal, a game controller)

D. IC board built-in battery (a real-time clock IC)

E. Environmental power generation equipment (a storage element for a power generation element such as a solar power generation, a thermoelectric power generation, a vibration power generation)

The charging unit of the third embodiment according to the present technology or the charging unit of the fourth embodiment according to the present technology can be applied to a universal credit card as the application example 2. Hereinafter, the universal credit card will be described in detail with reference to FIG. 24.

Currently, many people carry multiple credit cards. However, as the number of credit cards increases, there is a problem that the risk of loss, theft or the like increases. Therefore, a card called a universal credit card has been put into practical use, in which functions such as a plurality of credit cards and point cards are integrated into one card. In this card, for example, it is possible to capture information such as various credit card and point card numbers, expiration date when putting the one card in the wallet, it is possible to select and use the functions of the credit cards when needed at any time.

Figure 24:
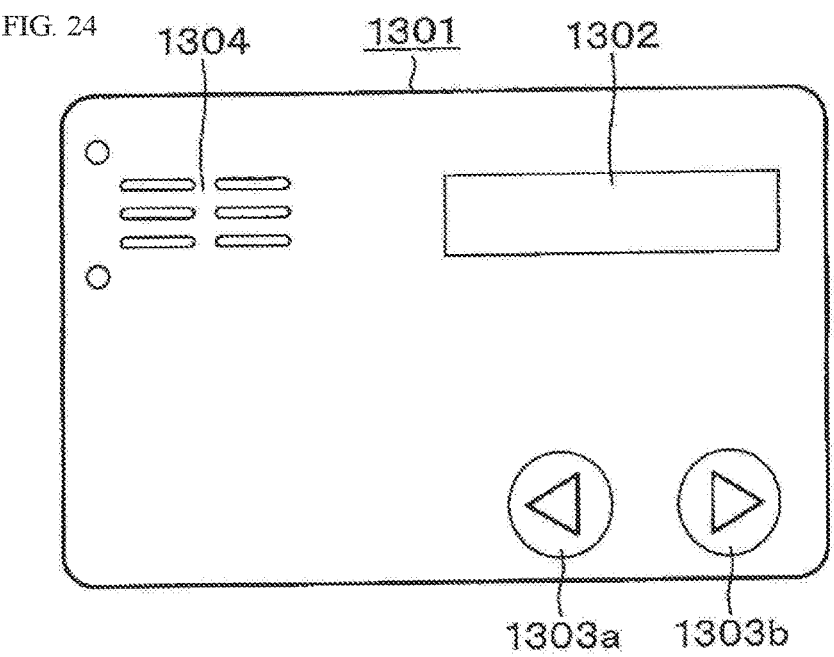
FIG. 24 is a diagram illustrating an example of a configuration of an application example (universal credit card) of the charging unit according to an embodiment of the present technology.

FIG. 24 shows an example of the configuration of a universal credit card 1301. It has a card shape and incorporates an IC chip and a charging unit according to the present technology. Furthermore, a low power consumption display 1302 and an operation unit such as direction keys 1303a and 1303b are provided. Furthermore, charging terminals 1304 are provided on the surface of the universal credit card 1301.

For example, the user can operate the direction keys 1303a and 1303b while looking at the display 1302 to identify a credit card etc. loaded in advance on the universal credit card 1301. When a plurality of credit cards is preloaded, information indicating respective credit cards is displayed on the display 1302, and the user can operate the direction keys 1303a and 1303b to designate a desired credit card. After that, it can be used in the same manner as a conventional credit card. Note that the above is an example, and it goes without saying that the charging unit according to the present technology can be applied to any electronic card in addition to the universal credit card 1301.

The charging unit of the third embodiment according to the present technology or the charging unit of the fourth embodiment according to the present technology can be applied to a wristband-type electronic device as the application example 3. Hereinafter, the wristband-type electronic device will be described in detail with reference to FIGS. 25 to 27.

An example of a wearable terminal includes a wristband-type electronic device. Among them, the wristband activity meter is also called a smart band, and it is possible to acquire data on human activity such as number of walk steps, movement distance, calories burned, amount of sleep, heart rate by simply winding it around the arm. Furthermore, acquired data can also be managed by a smartphone. Furthermore, it is also possible to provide a mail transmission/reception function. For example, it has a notification function of notifying the user of the arrival of a mail by means of a light emitting diode (LED) lamp and/or a vibration.

Figure 25:
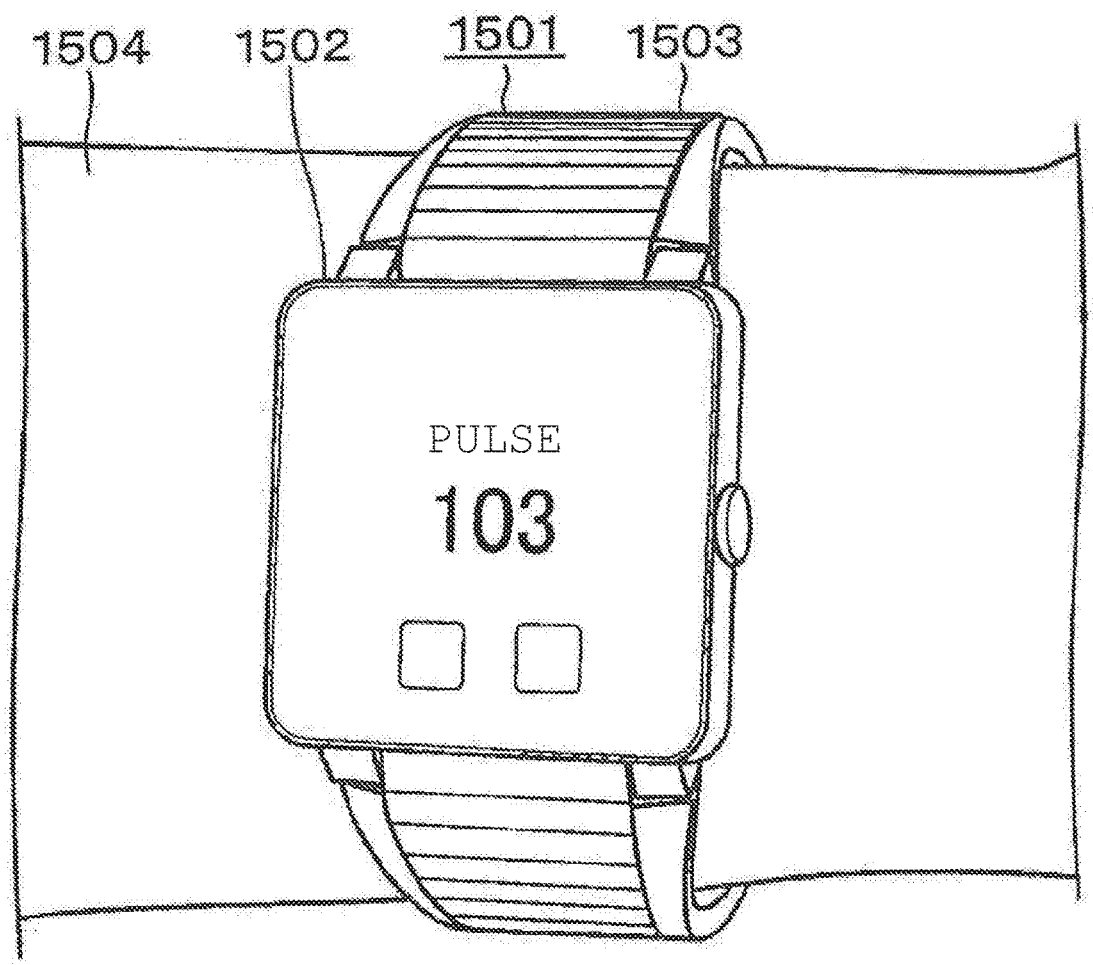
FIG. 25 is a diagram illustrating an example of a configuration of an application example (wristband activity meter) of the charging unit according to an embodiment of the present technology.
Figure 26:
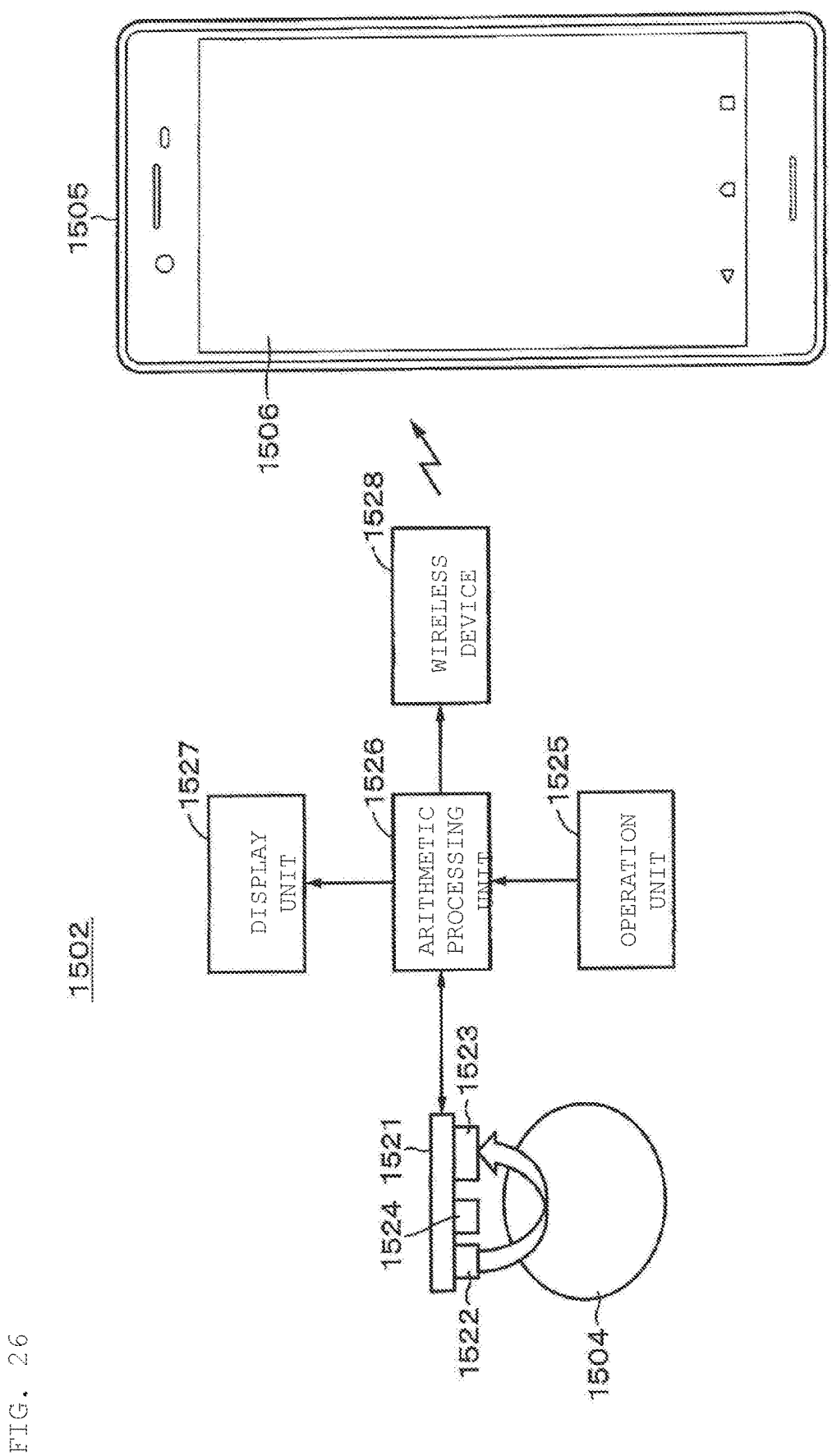
FIG. 26 is a diagram illustrating an example of a configuration of the application example (wristband activity meter) of the charging unit according to an embodiment of the present technology.

FIGS. 25 and 26 show an example of a wristband activity meter that measures, for example, a pulse. FIG. 25 shows an external configuration example of a wristband activity meter 1501. FIG. 26 shows a configuration example of a main unit 1502 of a wristband activity meter 1501.

The wristband activity meter 1501 is a wristband measurement device that measures, for example, the pulse of a subject by an optical method. As shown in FIG. 25, the wristband activity meter 1501 includes a main unit 1502 and a band 1503, and the band 1503 is attached to the arm (wrist) 1504 of the subject like a wristwatch. Then, the main unit 1502 irradiates the pulsed part of an arm 1504 of the subject with measurement light of a predetermined wavelength, and measures the pulse of the subject based on the intensity of the returned light.

The main unit 1502 is configured to include a substrate 1521, an LED 1522, a light receiving IC 1523, a light shielding body 1524, an operation unit 1525, an arithmetic processing unit 1526, a display unit 1527, and a wireless device 1528. The LED 1522, the light receiving IC 1523, and the light shielding body 1524 are provided on the substrate 1521. The LED 1522 radiates measurement light of a predetermined wavelength to a pulsed part of the arm 1504 of the subject under control of the light receiving IC 1523.

The light receiving IC 1523 receives the returned light after the measurement light is radiated to the arm 1504. The light receiving IC 1523 generates a digital measurement signal indicating the intensity of the returned light, and supplies the generated measurement signal to the arithmetic processing unit 1526.

The light shielding body 1524 is provided on the substrate 1521 between the LED 1522 and the light receiving IC 1523. The light shielding body 1524 suppresses the entry of measurement light from the LED 1522 into the light receiving IC 1523.

The operation unit 1525 is composed of, for example, various operation members such as a button, a switch, and is provided on the surface of the main unit 1502 or the like. The operation unit 1525 is used to operate the wristband activity meter 1501, and supplies a signal indicating the content of the operation to the arithmetic processing unit 1526.

The arithmetic processing unit 1526 performs an arithmetic process for measuring the pulse of the subject based on the measurement signal supplied from the light receiving IC 1523. The arithmetic processing unit 1526 supplies the measurement result of the pulse to the display unit 1527 and the wireless device 1528.

The display unit 1527 is configured by, for example, a display device such as a liquid crystal display (LCD), and is provided on the surface of the main unit 1502. The display unit 1527 displays the measurement result and the like of the pulse of the subject.

The wireless device 1528 transmits the measurement result of the pulse of the subject to an external device by wireless communication of a predetermined scheme. For example, as illustrated in FIG. 26, the wireless device 1528 transmits the measurement result of the pulse of the subject to a smartphone 1505 and causes a screen 1506 of the smartphone 1505 to display the measurement result. Furthermore, data of the measurement result is managed by the smartphone 1505, and the measurement result can be browsed through the smartphone 1505 or stored in a server on the network. Note that any method can be used as the communication method of the wireless device 1528. The light receiving IC 1523 can also be used in the case of measuring the pulse at a part other than the arm 1504 of the subject (for example, a finger, an earlobe, etc.).

The above-described wristband activity meter 1501 can accurately measure the pulse wave and the pulse of the subject by removing the influence of the body movement by the signal processing in the light receiving IC 1523. For example, even when the subject performs an exercise intensely such as running, it is possible to accurately measure the pulse wave and pulse of the subject. In addition, for example, even when the subject wears the wristband activity meter 1501 for a long time to perform measurement, it is possible to remove the influence of the subject's body movement and continue measuring the pulse wave and the pulse accurately.

In addition, the power consumption of the wristband activity meter 1501 can be reduced by reducing the amount of computation. As a result, for example, the measurement can be performed by mounting the wristband activity meter 1501 on the subject for a long time without charging or replacing the battery.

Note that, for example, a thin battery, as a power source, (for example, a secondary battery) is housed in the band 1503. The wristband activity meter 1501 includes an electronic circuit of the main body and a charging unit. For example, the charging unit can be freely detached by the user. The electronic circuit is a circuit included in the main unit 1502 described above.

Figure 27:
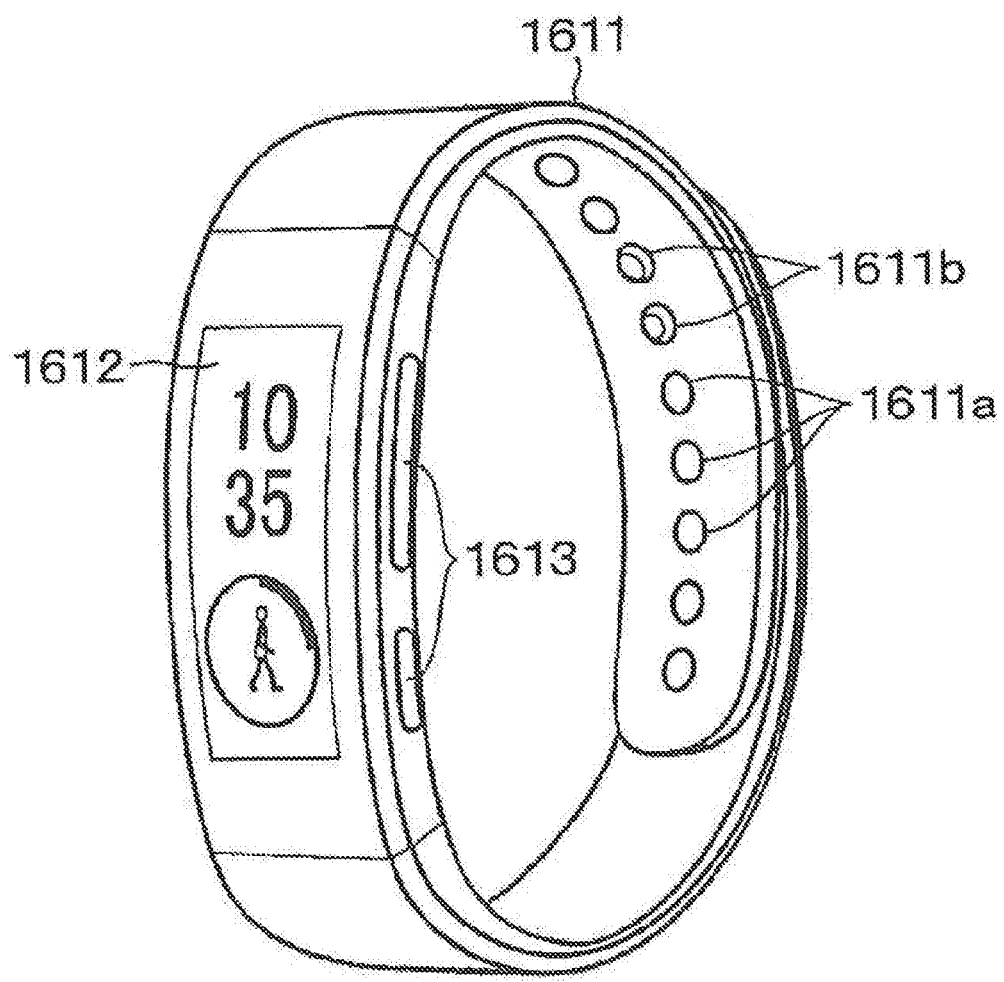
FIG. 27 is a diagram illustrating a configuration of the application example (wristband-type electronic device) of the charging unit according to an embodiment of the present technology.

FIG. 27 shows a configuration example of the appearance of a wristband-type electronic device 1601 (hereinafter simply referred to as an "electronic device 1601").

The electronic device 1601 is, for example, a so-called wearable device of a watch type that is detachable from the human body. The electronic device 1601 includes, for example, a band unit 1611 attached to an arm, a display device 1612 that displays numbers, characters, symbols, and the like, and an operation button 1613. The band unit 1611 has a plurality of holes 1611*a* and protrusions 1611*b* formed on the inner surface (surface on which the arm contacts when the electronic device 1601 is attached).

As shown in FIG. 27, electronic device 1601 is bent so that band unit 1611 is substantially circular when it is used, and attached to the arm with protrusions 1611*b* inserted into holes 1611*a*. By adjusting the position of the holes 1611*a* into which the protrusions 1611*b* is inserted, the size of the diameter can be adjusted according to the size of the arm. When the electronic device 1601 is not used, the protrusions 1611*b* are out from the holes 1611*a*, and the band unit 1611 is kept in a substantially flat state.

The charging unit of the third embodiment according to the present technology or the charging unit of the fourth embodiment according to the present technology can be applied to a smart watch as the application example 4. The smart watch will be described in detail below with reference to FIGS. 28 to 30.

The smart watch has the same or similar appearance as the already available wristwatch, and is used by being mounted on the user's arm like the wristwatch, and has functions of notifying the user of various messages such as the arrival of a call or email through the information displayed on the display. In addition, smart watches having functions such as an electronic money function and an activity meter have also been offered. The smart watch incorporates a display on the surface of the main body of the electronic device, and various information is displayed on the display. In addition, the smart watch can cooperate with the function, the content, and the like of the communication terminal or the like by performing short-distance wireless communication such as Bluetooth (registered trademark) with the communication terminal (smartphone or the like), for example.

A smart watch which includes a plurality of segments connected in a band shape, a plurality of electronic components disposed in the plurality of segments, and a flexible circuit board connecting a plurality of electronic components in the plurality of segments and disposed in at least one segment in a serpentine shape is offered. By having such a serpentine shape, the flexible circuit board is not subject to a stress even when the band is bent, and disconnection of the circuit is suppressed. In addition, it is possible to incorporate electronic circuit components in the band side segment attached to the watch body instead of the casing constituting the watch body, so that there is no need to make any change on the watch body, and it is possible to construct a smart watch having a design same as the design of the watch. In addition, the smart watch of this application example can make notification of the arrival of an email or the like, record a log of the user's action history, or have a phone call function. In addition, the smart watch has a function as a contactless IC card, and can perform payment, authentication, etc. without contact.

The smart watch of this application example incorporates circuit components for performing communication processing and notification processing in a metal band. In order to function as an electronic device while thinning a metal band, the band is configured to connect a plurality of segments, and a circuit board, a vibration motor, a battery, and an acceleration sensor are accommodated in each segment. Components such as a circuit board, a vibration motor, a battery, and an acceleration sensor of each segment are connected by a flexible print circuit board (FPC).

Figure 28:
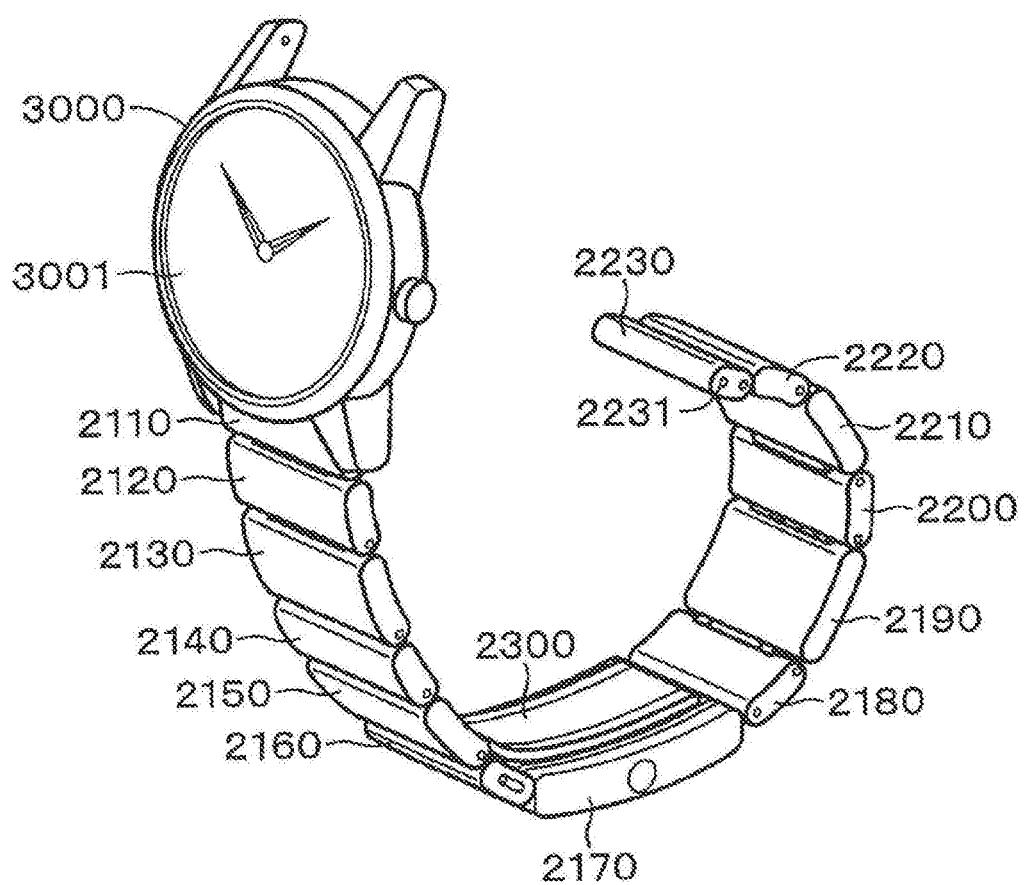
FIG. 28 is an exploded perspective view showing a configuration of an application example (smart watch) of the charging unit according to an embodiment of the present technology.

FIG. 28 shows the overall configuration (disassembled perspective view) of the smart watch. A band-type electronic device 2000 is a metal band attached to a watch main body 3000, and attached to the arm of the user. The watch main body 3000 includes a dial 3100 for displaying time. The watch main body 3000 may display the time electronically on a liquid crystal display or the like instead of the dial 3100.

The band-type electronic device 2000 has a configuration in which a plurality of segments 2110 to 2230 is connected. The segment 2110 is attached to one band attachment hole of the watch main body 3000, and the segment 2230 is attached to the other band attachment hole of the watch main body 3000. In this example, each of the segments 2110 to 2230 is made of metal.

Figure 29:
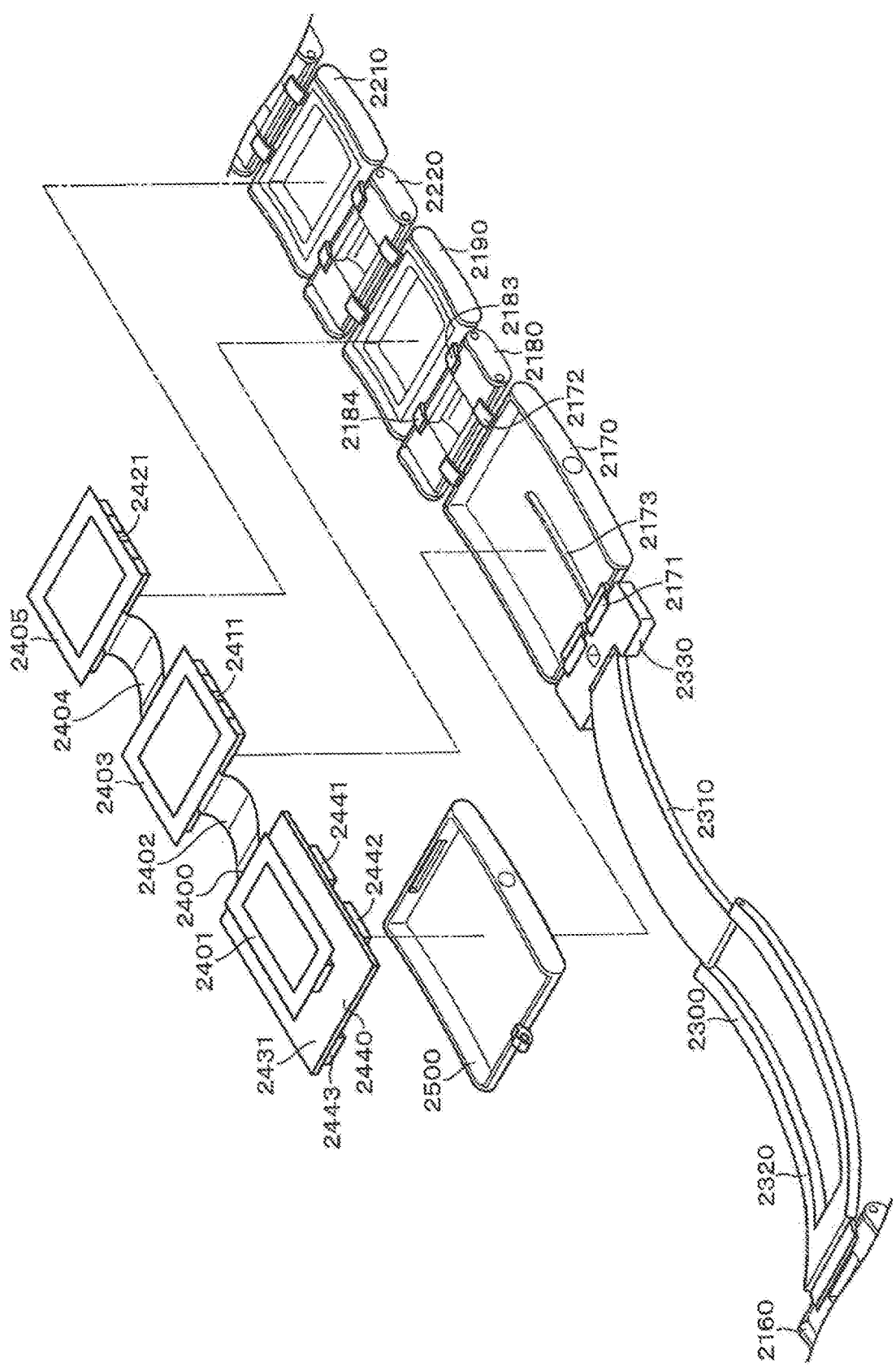
FIG. 29 is a diagram illustrating part of an internal configuration of an application example (band-type electronic device) of the charging unit according to an embodiment of the present technology.

FIG. 29 shows part of the internal configuration of the band-type electronic device 2000. For example, the inside of three segments 2170, 2180, 2190, 2200, and 2210 is shown. In the band-type electronic device 2000, a flexible circuit board 2400 is arranged inside five continuous segments 2170 to 2210. Various electronic components are disposed in the segment 2170, and batteries 2411 and 2421 according to the present technology are disposed in the segments 2190 and 2210, and these components are electrically connected by the flexible circuit board 2400. The segment 2180 between the segment 2170 and the segment 2190 is of relatively small size, and the flexible circuit board 2400 in a serpentine state is disposed.

Inside the segment 2180, the flexible circuit board 2400 is disposed in a state of being sandwiched by the waterproof members. The inside of the segments 2170 to 2210 has a waterproof structure.

Figure 30:
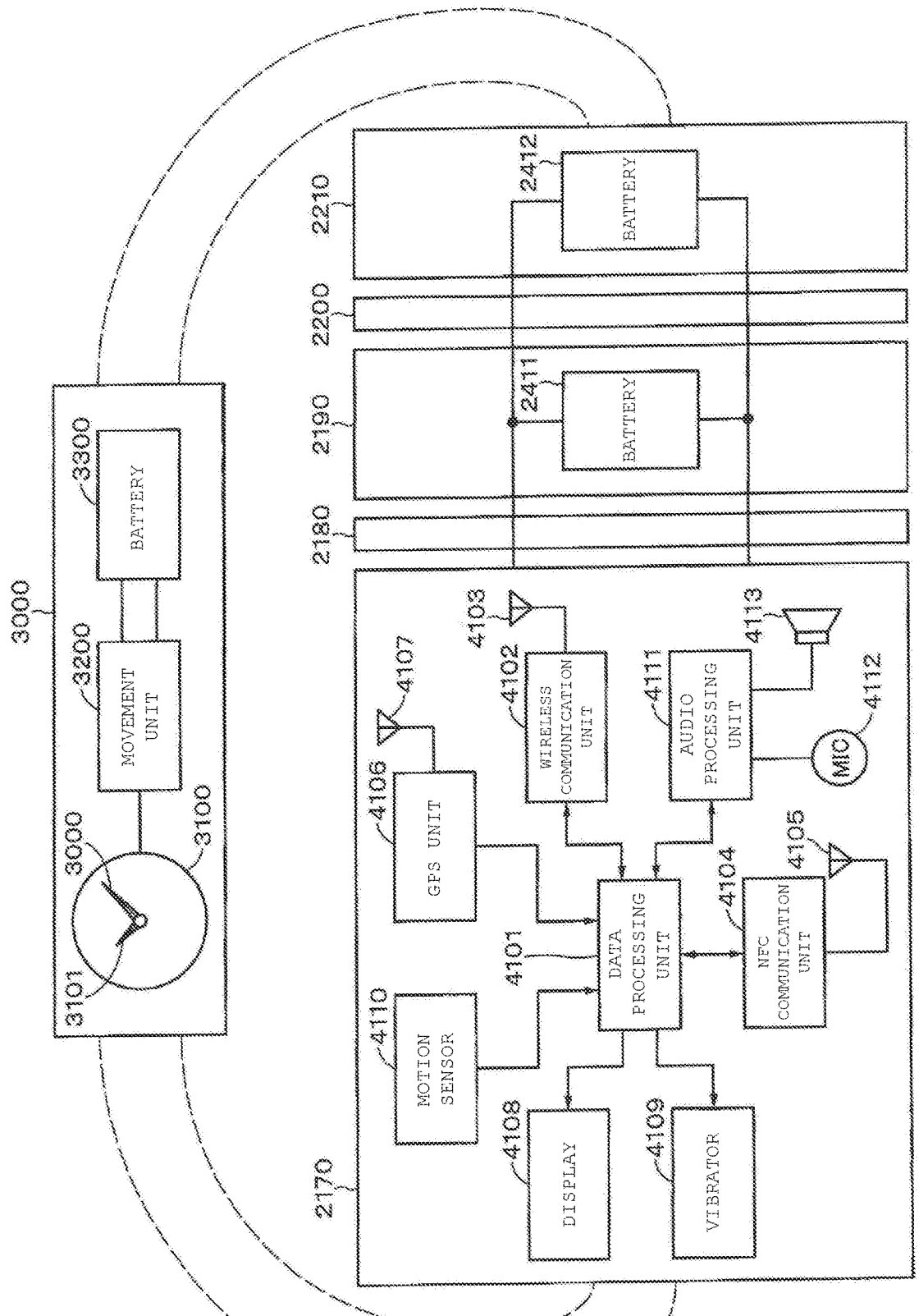
FIG. 30 is a block diagram showing a circuit configuration of an application example (band-type electronic device) of the charging unit according to an embodiment of the present technology.

FIG. 30 is a block diagram showing a circuit configuration of the band-type electronic device 2000. The internal circuit of the band-type electronic device 2000 has a configuration independent of the watch main body 3000. The watch main body 3000 includes a movement unit 3200 for rotating hands disposed on the dial 3100. A battery 3300 (for example, a charging unit according to the present technology or a secondary battery included in the charging unit according to the present technology) is connected to the movement unit 3200. The movement unit 3200 and the battery 3300 are built in the casing of the watch main body 3000.

In the band-type electronic device 2000 connected to the watch main body 3000, electronic components are arranged in three segments 2170, 2190 and 2210. A data processing unit 4101, a wireless communication unit 4102, an NFC communication unit 4104, and a GPS unit 4106 are arranged in the segment 2170. Antennas 4103, 4105, and 4107 are connected to the wireless communication unit 4102, the NFC communication unit 4104, and the GPS unit 4106, respectively. The respective antennas 4103, 4105, and 4107 are arranged in the vicinity of a slit 2173 of the segment 2170 described later.

The wireless communication unit 4102 performs short-distance wireless communication with other terminals based on, for example, the Bluetooth (registered trademark) standard. The NFC communication unit 4104 performs wireless communication with a reader/writer in proximity according to the NFC standard. The GPS unit 4106 is a positioning unit that receives radio waves from a satellite of a system called a global positioning system (GPS) and measures the current position. The data obtained by the wireless communication unit 4102, the NFC communication unit 4104, and the GPS unit 4106 are supplied to the data processing unit 4101.

A display 4108, a vibrator 4109, a motion sensor 4110, and an audio processing unit 4111 are disposed in the segment 2170. The display 4108 and the vibrator 4109 function as a notification unit that makes a notification to the wearer of the band-type electronic device 2000. The display 4108 is composed of a plurality of light emitting diodes, and makes a notification to the user by lighting or blinking the light emitting diodes. The plurality of light emitting diodes is disposed, for example, inside of the slit 2173 of the segment 2170 described later, and are notified of an incoming call, the arrival of an email, and the like by lighting or blinking. The display 4108 may be of a type that displays characters, numbers, and the like. The vibrator 4109 is a member for vibrating the segment 2170. The band-type electronic device 2000 makes a notification of an incoming call, the arrival of an email, and the like by vibration of the segment 2170 by the vibrator 4109.

The motion sensor 4110 detects the movement of the user wearing the band-type electronic device 2000. Examples of the motion sensor 4110 include an acceleration sensor, a gyro sensor, an electronic compass, and an atmospheric pressure sensor. The segment 2170 may also incorporate a sensor other than the motion sensor 4110. For example, a biosensor that detects a pulse of a user wearing the band-type electronic device 2000 may be incorporated. A microphone 4112 and a speaker 4113 are connected to the audio processing unit 4111, and the audio processing unit 4111 performs a process of a call with a party connected through wireless communication in the wireless communication unit 4102. Further, the audio processing unit 4111 can also perform a process for voice input operation.

The segment 2190 incorporates a battery 2411 (for example, the charging unit according to the present technology or the secondary battery included in the charging unit according to the present technology), and the segment 2210 incorporates a battery 2412 (for example, the charging unit according to the present technology or the secondary battery included in the charging unit according to the present technology). The batteries 2411 and 2412 can be configured by the secondary battery according to the present technology, and supply a driving power source to the circuit in the segment 2170. The circuit in the segment 2170 and the batteries 2411 and 2412 are connected to each other by the flexible circuit board 2400 (FIG. 25). Although not shown in FIG. 26, the segment 2170 includes terminals that charges the batteries 2411 and 2421. Further, electronic components other than the batteries 2411 and 2412 may be arranged in the segments 2190 and 2210. For example, the segments 2190 and 2210 may include a circuit that controls charging and discharging of the batteries 2411 and 2412.

The charging unit of the third embodiment according to the present technology or the charging unit of the fourth embodiment according to the present technology can be applied to an eyeglass terminal as the application example 5. Hereinafter, the eyeglass terminal will be described in detail with reference to FIG. 31.

The eyeglass terminal described below can display information such as text, symbols, and images superimposed on the scenery in front of the eyes. That is, a lightweight and thin image display device display module dedicated to a transmissive eyeglass terminal is mounted. A typical example is a head-mounted display (HMD).

This image display device includes an optical engine and a hologram light guide plate. The optical engine uses a microdisplay lens to emit image light such as images, text and the like. This image light is incident on the hologram light guide plate. The hologram light guide plate has hologram optical elements incorporated at both ends of the transparent plate, and the image light from the optical engine is propagated through a very thin transparent plate having a thickness of, for example, 1 mm to reach the eye of the viewer. With such a configuration, a lens having a thickness of 3 mm (including a protection plate before and after the light guide plate) having a transmittance of, for example, 85% is provided. Such an eyeglass terminal enables the user to see the player, the team's performance, etc. while watching a sport in real time, and can display a tourist guide on the travel destination.

Figure 31:
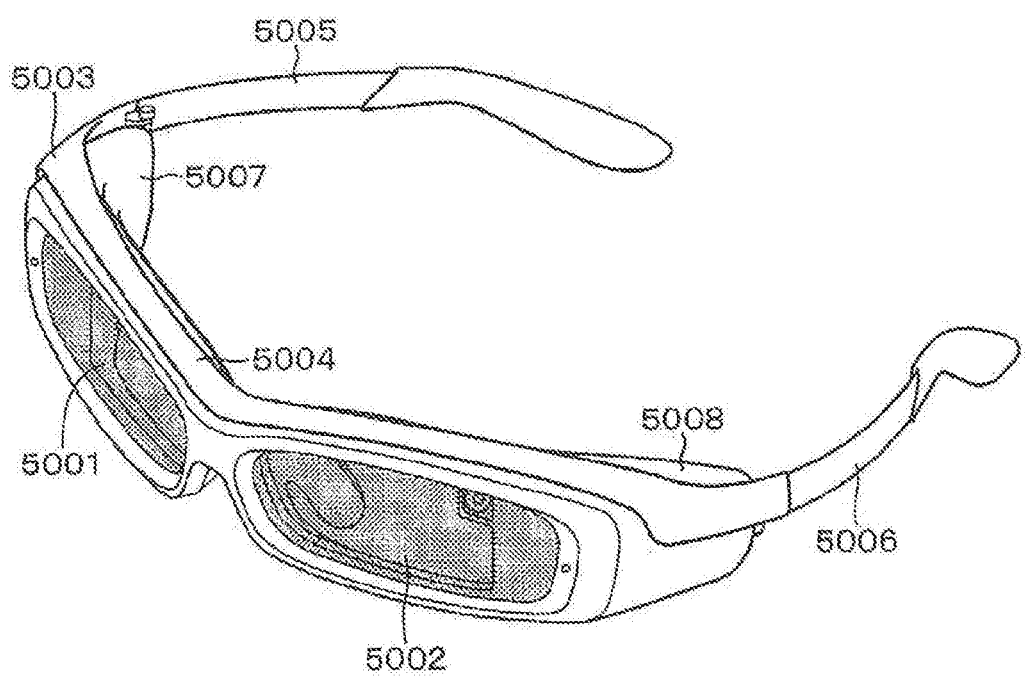
FIG. 31 is a diagram illustrating a specific example of a configuration of an application example (eyeglass terminal) of the charging unit according to an embodiment of the present technology.

In a specific example of the eyeglass terminal, as shown in FIG. 31, the image display unit has an eyeglass configuration. That is, as in the case of ordinary glasses, it has a frame 5003 for holding a right image display unit 5001 and a left image display unit 5002 in front of the eye. The frame 5003 includes a front portion 5004 disposed in front of the viewer, and two temple portions 5005 and 5006 rotatably attached to both ends of the front portion 5004 with hinges interposed therebetween. The frame 5003 is made of the material same as that of ordinary glasses, such as metal, alloy, plastic, or a combination thereof. A headphone unit may be provided.

The right image display unit 5001 and the left image display unit 5002 are arranged to be positioned in front of the right eye and in front of the left eye of the user, respectively. The temple portions 5005 and 5006 hold the image display units 5001 and 5002 on the head of the user. A right display drive unit 5007 is disposed inside the temple portion 5005 at the connection point between the front portion 5004 and the temple portion 5005. A left display drive unit 5008 is disposed inside the temple portion 5006 at the connection point between the front portion 5004 and the temple portion 5006.

Although omitted in FIG. 31, the charging unit according to the present technology, an acceleration sensor, a gyroscope, an electronic compass, a microphone/speaker, and the like are mounted on the frame 5003. Furthermore, an imaging device is attached, and it is possible to capture still images/moving images. Furthermore, it has a controller connected with the glasses unit, for example, by a wireless or wired interface. The controller is provided with a touch sensor, various buttons, a speaker, a microphone, and the like. Furthermore, it has a cooperation function with a smartphone. For example, it is possible to provide information according to the user's situation by utilizing the GPS function of the smartphone.

The present technology is not limited to each of the above-described embodiments and application examples, and can be changed without departing from the gist of the present technology.

Since the effect of the present technology can be obtained without depending on the type of the electrode reactants as long as it is an electrode reactant used in a battery, in particular, a secondary battery, the same effect can be obtained even when the type of the electrode reactants are changed. In addition, chemical formulas of compounds and the like are representative ones, and are not limited to the indicated valences and the like as long as they are common names of the same compounds.

Furthermore, the present technology is described below in further detail according to an embodiment of the present disclosure.

[1]
A charging control device including a current detector, an abnormal current determination unit, and a charging stop unit, wherein
the current detector detects a charging current, wherein
the abnormal current determination unit determines whether the charging current is attenuated and/or increased in a constant voltage charging region, and furthermore, determines whether a value of the charging current per unit time is increased, and wherein
the charging stop unit stops constant voltage charging when the value of the charging current per unit time is increased.

[2]
The charging control device according to [1], further including
a battery temperature detector and an abnormal temperature determination unit, wherein
the battery temperature detector detects a battery temperature, wherein
the abnormal temperature determination unit determines whether the battery temperature in a constant voltage region is 45° C. or higher, and wherein
the charging stop unit stops constant voltage charging when the battery temperature is 45° C. or higher.

[3]
The charging control device according to [1] or [2], further including
a battery temperature detector and an abnormal temperature determination unit, wherein
the battery temperature detector detects a battery temperature, wherein
the abnormal temperature determination unit determines whether the battery temperature in a constant voltage region is higher than the battery temperature at a start of constant voltage charging and determines whether a rate of increase in the battery temperature in the constant voltage region is greater than a maximum value of a rate of increase in the battery temperature in a constant current charging region, and wherein
the charging stop unit stops constant voltage charging when the battery temperature in a constant voltage region is higher than the battery temperature at a start of constant voltage charging, and the rate of increase in the battery temperature in the constant voltage region is greater than the maximum value of the rate of increase in the battery temperature in the constant current charging region.

[4]
The charging control device according to any one of [1] to [3], further including
a battery temperature detector, an outside air temperature detector, and an abnormal temperature determination unit, wherein
the battery temperature detector detects a battery temperature, wherein
the outside air temperature detector detects an outside air temperature, wherein the abnormal temperature determination unit determines whether a rate of increase in the battery temperature in a constant voltage region is greater than a rate of increase in an outside air temperature, and wherein
the charging stop unit stops constant voltage charging when the rate of increase in the battery temperature in the constant voltage region is greater than the rate of increase in the outside air temperature.

[5]

The charging control device according to any one of [1] to [4], wherein
the current detector detects a difference $(I_n-I_{(n-1)})$ between $I_n$ and $I_{(n-1)}$, which are at least two consecutive charging current values at a specified time interval, and wherein
the abnormal current determination unit determines that the difference $(I_n-I_{(n-1)})$ changes from a negative value to a positive value.

[6]

The charging control device according to any one of [1] to [4], wherein the current detector detects a difference $(Ima_n-Ima_{(n-1)})$ between $Ima_n$ obtained by applying a moving average to at least two consecutive charging current values at a specified time interval, and $Ima_{(n-1)}$ obtained by applying a moving average to at least two further consecutive charging current values at a specified time interval, and wherein
the abnormal current determination unit determines that the difference $(Ima_n-Ima_{(n-1)})$ changes from a negative value to a positive value.

[7]

The charging control device according to any one of [1] to [4], wherein
the current detector detects a difference $(Ia_n-Ia_{(n-1)})$ between $Ia_n$ and $Ia_{(n-1)}$, which are at least two consecutive charging current values at a specified time interval, further detects, at least once, a difference $(Ib_n-Ib_{(n-1)})$ between $Ib_n$ and $Ib_{(n-1)}$, which are at least two consecutive charging current values at a specified time interval, and detects a difference $(ma(\Delta I_n))$ obtained by applying a moving average to at least the difference $(Ia_n-Ia_{(n-1)})$ and the difference $(Ib_n-Ib_{(n-1)})$, and wherein
the abnormal current determination unit determines that the difference $(ma(\Delta I_n))$ obtained by applying the moving average changes from a negative value to a positive value.

[8]

The charging control device according to any one of [1] to [4], wherein
the current detector detects a ratio $(I_n/I_{(n-1)})$ between $I_n$ and $I_{(n-1)}$, which are at least two consecutive charging current values at a specified time interval, and wherein
the abnormal current determination unit determines that the ratio $(I_n/I_{(n-1)})$ changes from a value of 1 or less to a value of more than 1.

[9]

The charging control device according to any one of [1] to [4], wherein the current detector detects a ratio $(Ima_n/Ima_{(n-1)})$ between $Ima_n$ obtained by applying a moving average to at least two consecutive charging current values at a specified time interval, and $Ima_{(n-1)}$ obtained by applying a moving average to at least two further consecutive charging current values at a specified time interval, and wherein
the abnormal current determination unit determines that the ratio $(Ima_n/Ima_{(n-1)})$ changes from a value of 1 or less to a value of more than 1.

[10]

The charging control device according to any one of [1] to [4], wherein
the current detector detects a ratio $(Ia_n/Ia_{(n-1)})$ between $Ia_n$ and $Ia_{(n-1)}$, which are at least two consecutive charging current values at a specified time interval, further detects, at least once, a ratio $(Ib_n/Ib_{(n-1)})$ between $Ib_n$ and $Ib_{(n-1)}$, which are at least two consecutive charging current values at a specified time interval, and detects a ratio $(ma(r))$ obtained by applying a moving average to at least the ratio $(Ia_n/Ia_{(n-1)})$ and the ratio $(Ib_n/Ib_{(n-1)})$, and wherein
the abnormal current determination unit determines that the ratio $(ma(r))$ obtained by applying the moving average changes from a value of 1 or less to a value of more than 1.

[11]

The charging control device according to any one of [1] to [4], wherein
the current detector detects a difference $(d\ log(I_n)/dt - d\ log(I_{(n-1)})/dt)$ between $d\ log(I_n)/dt$ and $d\ log(I_{(n-1)})/dt$, which are log values per unit time of at least two consecutive charging currents at a specified time interval, and wherein
the abnormal current determination unit determines that the difference $(d\ log(I_n)/dt - d\ log(I_{(n-1)})/dt)$ changes from a negative value to a positive value.

[12]

The charging control device according to any one of [1] to [4], wherein
the current detector detects a difference $(ma(d\ log(I_n)/dt))-ma(d\ log(I_{(n-1)})/dt))$ between $ma(d\ log(I_n)/dt)$ obtained by applying a moving average to log values per unit time of at least two consecutive charging currents at a specified time interval, and $ma(d\ log(I_{(n-1)})/dt)$ obtained by applying a moving average to values of at least two further consecutive charging currents at a specified time interval, and wherein
the abnormal current determination unit determines that the difference $(ma(d\ log(I_n)/dt))-ma(d\ log(I_{(n-1)})/dt))$ changes from a negative value to a positive value.

[13]

The charging control device according to any one of [1] to [4], wherein
the current detector detects a difference $(d\ log(Ia_n)/dt - d\ log(Ia_{(n-1)})/dt)$ between $d\ log(Ia_n)/dt$ and $d\ log(Ia_{(n-1)})/dt$, which are log values per unit time of at least two consecutive charging currents at a specified time interval, further detects, at least once, a difference $(d\ log(Ib_n)/dt - d\ log(Ib_{(n-1)})/dt)$ between $d\ log(Ib_n)/dt$ and $d\ log(Ib_{(n-1)})dt$, which are log values per unit time of at least two consecutive charging currents at a specified time interval, and detects a difference $(ma(\Delta)(d\ log(I_n)/dt))$ obtained by applying a moving average to at least the difference $(d\ log(Ia_n)/dt - d\ log(Ia_{(n-1)})/dt)$ and the difference $(d\ log(Ib_n)/dt - d\ log(Ib_{(n-1)})/dt)$, and wherein
the abnormal current determination unit determines that the difference $(ma(\Delta)(d\ log(I_n)/dt))$ obtained by applying the moving average changes from a negative value to a positive value.

[14]

The charging control device according to any one of [1] to [4], wherein
the current detector detects a ratio $(d\ log(I_n)/dt/d\ log(I_{(n-1)})/dt)$ between $d\ log(I_n)/dt$ and $d\ log(I_{(n-1)})/dt$, which are log values per unit time of at least two consecutive charging currents at a specified time interval, and wherein
the abnormal current determination unit determines that the ratio $(d\ log(I_n)/dt/d\ log(I_{(n-1)})/dt)$ changes from a value of 1 or more to a value of less than 1.

[15]

The charging control device according to any one of [1] to [4], wherein the current detector detects a ratio $(ma(d\ log(I_n)/dt))/(ma(d\ log(I_{(n-1)})/dt))$ between $ma(d\ log(I_n)/dt)$ obtained by applying a moving average to log values per unit time of at least two consecutive charging currents at a specified time interval, and ma(d log($I_{(n-1)}$)/dt) obtained by applying a moving average to log values per unit time of at least two further consecutive charging currents at a specified time interval, and wherein the abnormal current determination unit determines that the ratio (ma(d log($I_n$)/dt))/(ma(d log($I_{(n-1)}$)/dt)) changes from a value of 1 or more to a value of less than 1.

[16]
The charging control device according to any one of [1] to [4], wherein the current detector detects a ratio (d log($Ia_n$)/dt/d log($Ia_{(n-1)}$)/dt) between d log($Ia_n$)/dt and d log($Ia_{(n-1)}$)/dt, which are log values per unit time of at least two consecutive charging currents at a specified time interval, further detects, at least once, a ratio (d log($Ib_n$)/dt/d log($Ib_{(n-1)}$)/dt) between d log($Ib_n$)/dt and d log($Ib_{(n-1)}$)/dt, which are log values per unit time of at least two consecutive charging currents at a specified time interval, and detects a difference (ma(r)(d log($I_n$)/dt)) obtained by applying a moving average to at least the ratio (d log($Ia_n$)/dt/d log($Ia_{(n-1)}$)/dt) and the ratio (d log($Ib_n$)/dt/d log($Ib_{(n-1)}$)/dt), and wherein the abnormal current determination unit determines that the difference (ma(r)(d log($I_n$)/dt)) obtained by applying the moving average changes from a value of 1 or more to a value of less than 1.

[17]
A charging unit including the charging control device according to any one of [1] to [16] and a battery.

[18]
A vehicle including:
the charging unit according to [17];
a driving force converter that receives supply of electric power from the charging unit and converts the received electric power into a driving force of the vehicle;
a drive unit that is driven according to the drive force; and
a vehicle control device.

[19]
A power storage system including:
a power storage device having the charging unit according to [17];
a power consuming device to which electric power is supplied from the charging unit,
a control device that controls supply of electric power from the charging unit to the power consuming device; and
a power generation device that charges the charging unit.

[20]
An electric power tool including:
the charging unit according to [17]; and
a movable unit to which electric power is supplied from the charging unit.

[21]
An electronic device including:
the charging unit according to [17], wherein
the electronic device receives supply of power from the charging unit.

[22]
The charging control device according to any one of [1] to [16], wherein
the current detector detects a charging current value smoothed by a moving average method.

[23]
The charging control device according to [22], wherein the moving average method is an exponential moving average method.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention claimed is:

1. A charging control device comprising a current detector, an abnormal current determination circuit, and a charging stop circuit,
wherein the current detector is configured to detect a difference (d log(In)/dt−d log(I(n−1))/dt) between d log(In)/dt and d log(I(n−1))/dt, which are log values per unit time of at least two consecutive charging currents at a specified time interval,
wherein the abnormal current determination circuit is configured to determine that the difference (d log(In)/dt−d log(I(n−1))/dt) changes from a negative value to a positive value and
wherein the charging stop circuit is configured to stop a constant voltage charging when the difference (d log(In)/dt−d log(I(n−1))/dt) changes from a negative value to a positive value.

2. The charging control device according to claim 1, further comprising
a battery temperature detector and an abnormal temperature determination circuit,
wherein the battery temperature detector is configured to detect a battery temperature,
wherein the abnormal temperature determination circuit is configured to determine whether the battery temperature in a constant voltage region is 45° C. or higher, and
wherein the charging stop circuit is configured to stop the constant voltage charging when the battery temperature is 45° C. or higher.

3. The charging control device according to claim 1, further comprising
a battery temperature detector and an abnormal temperature determination circuit,
wherein the battery temperature detector is configured to detect a battery temperature,
wherein the abnormal temperature determination circuit is configured to determine whether the battery temperature in the constant voltage region is higher than the battery temperature at a start of the constant voltage charging and to determine whether a rate of increase in the battery temperature in the constant voltage region is greater than a maximum value of a rate of increase in the battery temperature in the constant current charging region, and
wherein the charging stop circuit is configured to stop the constant voltage charging when the battery temperature in the constant voltage region is higher than the battery temperature at a start of the constant voltage charging, and the rate of increase in the battery temperature in the constant voltage region is greater than the maximum value of the rate of increase in the battery temperature in the constant current charging region.

4. The charging control device according to claim 1, further comprising
a battery temperature detector, an outside air temperature detector, and an abnormal temperature determination circuit, wherein
the battery temperature detector is configured to detect a battery temperature, wherein the outside air temperature detector is configured to detect an outside air temperature, wherein the abnormal temperature determination circuit is configured to determine whether a rate of increase in the battery temperature in the constant voltage region is greater than a rate of increase in an outside air temperature, and wherein the charging stop circuit is configured to stop the constant voltage charging when the rate of increase in the battery temperature in the constant voltage region is greater than the rate of increase in the outside air temperature.

5. The charging control device according to claim 1, wherein the current detector is configured to detect a difference $(I_n-I_{(n-1)})$ between $I_n$ and $I_{(n-1)}$, which are at least two consecutive charging current values at a specified time interval, and wherein the abnormal current determination circuit is configured to determine that the difference $(I_n-I_{(n-1)})$ changes from a negative value to a positive value.

6. The charging control device according to claim 1, wherein the current detector is configured to detect a difference $(Ima_n-Ima_{(n-1)})$ between $Ima_n$ obtained by applying a moving average to at least two consecutive charging current values at a specified time interval, and $Ima_{(n-1)}$ obtained by applying a moving average to at least two further consecutive charging current values at a specified time interval, and wherein the abnormal current determination circuit is configured to determine that the difference $(Ima_n-Ima_{(n-1)})$ changes from a negative value to a positive value.

7. The charging control device according to claim 1, wherein the current detector is configured to detect a first difference $(Ia_n-Ia_{(n-1)})$ between $Ia_n$ and $Ia_{(n-1)}$, which are at least two consecutive charging current values at a specified time interval, and to detect a second difference $(Ib_n-Ib_{(n-1)})$ between $Ib_n$ and $Ib_{(n-1)}$, which are at least two consecutive charging current values at a specified time interval, and to detect a third difference $(ma(\Delta I_n))$ obtained by applying a moving average to at least the first difference $(Ia_n-Ia_{(n-1)})$ and the second difference $(Ib_n-Ib_{(n-1)})$, and wherein the abnormal current determination circuit is configured to determine that the third difference $(ma(\Delta I_n))$ obtained by applying the moving average changes from a negative value to a positive value.

8. The charging control device according to claim 1, wherein the current detector is configured to detect a ratio $(I_n/I_{(n-1)})$ between $I_n$ and $I_{(n-1)}$, which are at least two consecutive charging current values at a specified time interval, and wherein the abnormal current determination circuit is configured to determine that the ratio $(I_n/I_{(n-1)})$ changes from a value of 1 or less to a value of more than 1.

9. The charging control device according to claim 1, wherein the current detector to detect a ratio $(Ima_n/Ima_{(n-1)})$ between $Ima_n$ obtained by applying a moving average to at least two consecutive charging current values at a specified time interval, and $Ima_{(n-1)}$ obtained by applying a moving average to at least two further consecutive charging current values at a specified time interval, and wherein the abnormal current determination circuit is configured to determine that the ratio $(Ima_n/Ima_{(n-1)})$ changes from a value of 1 or less to a value of more than 1.

10. The charging control device according to claim 1, wherein the current detector is configured to detect a first ratio $(Ia_n/Ia_{(n-1)})$ between $Ia_n$ and $Ia_{(n-1)}$, which are at least two consecutive charging current values at a specified time interval, and to detect a second ratio $(Ib_n/Ib_{(n-1)})$ between $Ib_n$ and $Ib_{(n-1)}$, which are at least two consecutive charging current values at a specified time interval, and to detect a third ratio $(ma(r))$ obtained by applying a moving average to at least the first ratio $(Ia_n/Ia_{(n-1)})$ and the second ratio $(Ib_n/Ib_{(n-1)})$, and wherein the abnormal current determination circuit is configured to determine that the third ratio $(ma(r))$ obtained by applying the moving average changes from a value of 1 or less to a value of more than 1.

11. The charging control device according to claim 1, wherein the current detector is configured to detect a difference $(ma(d\ log(I_n)/dt))-ma(d\ log(I_{(n-1)})/dt))$ between $ma(d\ log(I_n)/dt)$ obtained by applying a moving average to log values per unit time of at least two consecutive charging currents at a specified time interval, and $ma(d\ log(I_{(n-1)})/dt)$ obtained by applying a moving average to values of at least two further consecutive charging currents at a specified time interval, and wherein the abnormal current determination circuit is configured to determine that the difference $(ma(d\ log(I_n)/dt))-ma(d\ log(I_{(n-1)})/dt))$ changes from a negative value to a positive value.

12. The charging control device according to claim 1, wherein the current detector is configured to detect a first difference $(d\ log(Ia_n)/dt-d\ log(Ia_{(n-1)})/dt)$ between $d\ log(Ia_n)/dt$ and $d\ log(Ia_{(n-1)})/dt$, which are log values per unit time of at least two consecutive charging currents at a specified time interval, and to detect a second difference $(d\ log(Ib_n)/dt-d\ log(Ib_{(n-1)})/dt)$ between $d\ log(Ib_n)/dt$ and $d\ log(Ib_{(n-1)})/dt$, which are log values per unit time of at least two consecutive charging currents at a specified time interval, and to detect a third difference $(ma(\Delta)(d\ log(I_n)/dt))$ obtained by applying a moving average to at least the difference $(d\ log(Ia_n)/dt-d\ log(Ia_{(n-1)})/dt)$ and the difference $(d\ log(Ib_n)/dt-d\ log(Ib_{(n-1)})/dt)$, and wherein the abnormal current determination circuit is configured to determine that the third difference $(ma(\Delta)(d\ log(I_n)/dt))$ obtained by applying the moving average changes from a negative value to a positive value.

13. The charging control device according to claim 1, wherein the current detector is configured to detect a ratio $(d\ log(I_n)/dt/d\ log(I_{(n-1)})/dt)$ between $d\ log(I_n)/dt$ and $d\ log(I_{(n-1)})/dt$, which are log values per unit time of at least two consecutive charging currents at a specified time interval, and wherein the abnormal current determination circuit is configured to determine that the ratio $(d\ log(I_n)/dt/d\ log(I_{(n-1)})/dt)$ changes from a value of 1 or more to a value of less than 1.

14. The charging control device according to claim 1, wherein the current detector is configured to detect a ratio $(ma(d\ log(I_n)/dt))/(ma(d\ log(I_{(n-1)})/dt))$ between $ma(d\ log(I_n)/dt)$ obtained by applying a moving average to log values per unit time of at least two consecutive charging currents at a specified time interval, and ma(d log($I_{(n-1)}$)/dt) obtained by applying a moving average to values of at least two further consecutive charging currents at a specified time interval, and wherein
the abnormal current determination circuit is configured to determine that the ratio (ma(d log($I_n$)/dt))/(ma(d log($I_{(n-1)}$)/dt)) changes from a value of 1 or more to a value of less than 1.

15. The charging control device according to claim 1, wherein
the current detector is configured to detect a first ratio (d log($Ia_n$)/dt/d log($Ia_{(n-1)}$)/dt) between d log($Ia_n$)/dt and d log($Ia_{(n-1)}$)/dt, which are log values per unit time of at least two consecutive charging currents at a specified time interval, and to detect a second ratio (d log($Ib_n$)/dt/d log($Ib_{(n-1)}$)/dt) between d log($Ib_n$)/dt and d log($Ib_{(n-1)}$)/dt, which are log values per unit time of at least two consecutive charging currents at a specified time interval, and to detect a third difference (ma(r)(d log($I_n$)/dt)) obtained by applying a moving average to at least the ratio (d log($Ia_n$)/dt/d log($Ia_{(n-1)}$)/dt) and the ratio (d log($Ib_n$)/dt/d log($Ib_{(n-1)}$)/dt), and wherein
the abnormal current determination circuit is configured to determine that the third difference (ma(r)(d log($I_n$)/dt)) obtained by applying the moving average changes from a value of 1 or more to a value of less than 1.

16. A charging unit comprising the charging control device according to claim 1 and a battery.

17. A vehicle comprising:
the charging unit according to claim 16;
a driving force converter configured to receive supply of electric power from the charging unit and convert the received electric power into a driving force of the vehicle;
a driver configured to be driven according to the drive force; and
a vehicle control device.

18. A power storage system comprising:
a power storage device having the charging unit according to claim 16;
a power consuming device to which electric power is configured to be supplied from the charging unit;
a controller configured to control supply of electric power from the charging unit to the power consuming device; and
a power generation device configured to charge the charging unit.

19. An electric power tool comprising:
the charging unit according to claim 16; and
a movable unit to which electric power is configured to be supplied from the charging unit.

* * * * *